US012020674B2

(12) United States Patent
Baker

(10) Patent No.: US 12,020,674 B2
(45) Date of Patent: Jun. 25, 2024

(54) ELECTRIC STRINGED INSTRUMENT USING MOVABLE PICKUPS AND HUMBUCKING CIRCUITS

(71) Applicant: Donald L. Baker, Tulsa, OK (US)

(72) Inventor: Donald L. Baker, Tulsa, OK (US)

( * ) Notice: Subject to any disclaimer, the term of this patent is extended or adjusted under 35 U.S.C. 154(b) by 546 days.

(21) Appl. No.: 17/466,630

(22) Filed: Sep. 3, 2021

(65) Prior Publication Data

US 2021/0407486 A1 Dec. 30, 2021

Related U.S. Application Data

(63) Continuation of application No. 17/363,901, filed on Jun. 30, 2021, and a continuation-in-part of application No. 16/985,863, filed on Aug. 5, 2020, now Pat. No. 11,087,731, and a continuation-in-part of application No. 16/995,101, filed on Aug. 17, 2020, now Pat. No. 11,011,146, and a continuation-in-part of application No. 16/840,644, filed on Apr. 6, 2020, now Pat. No. 10,810,987, and a continuation-in-part of application No. 16/139,027, filed on Sep. 22, 2018, now Pat. No. 10,380,986, and a continuation-in-part of application No. 15/616,396, filed on Jun. 7, 2017, now Pat. No. 10,217,450, and a continuation-in-part of application No. 14/338,373, filed on Jul. 23, 2014, now Pat. No. 9,401,134.

(60) Provisional application No. 63/220,358, filed on Jul. 9, 2021.

(51) Int. Cl.
*G10H 3/18* (2006.01)

(52) U.S. Cl.
CPC ....... *G10H 3/182* (2013.01); *G10H 2220/511* (2013.01); *G10H 2220/565* (2013.01)

(58) Field of Classification Search
CPC ............ G10H 3/182; G10H 2220/511; G10H 2220/565; G10H 2220/505; G10H 3/146; G10H 3/143
See application file for complete search history.

(56) References Cited

U.S. PATENT DOCUMENTS

| | | | |
|---|---|---|---|
| 1,861,717 | A | 6/1932 | Pfeil |
| 2,239,985 | A | 4/1941 | Benioff |
| 3,413,883 | A | 12/1968 | Helbourne |
| 3,657,462 | A | 4/1972 | Robinson |
| 3,771,408 | A | 11/1973 | Wright |

(Continued)

OTHER PUBLICATIONS

U.S. Appl. No. 17/363,901, filed Aug. 10, 2021, Baker.
U.S. Appl. No. 16/156,509, filed Oct. 10, 2018, Baker.
U.S. Appl. No. 15/917,389, filed Jul. 14, 2018, Baker.

*Primary Examiner* — Michael C Zarroli

(57) ABSTRACT

This invention discloses a hollow-body guitar with a large rectangular sound hole between the neck and bridge, with two pickup mounting slots on each side of the sound hole in removable top plates, including a system of top plates and mounting adapters for 7 different single-coil and dual-coil pickup types. The invention has a system humbucking pickup circuit mixing modules that can be cascaded in linear or tree form to mix all the types of pickups in the output, providing a much wider range of tones than current 3-way and 5-way switching systems. For example, three matched single-coil pickups and one humbucker can be mixed to provide 19 humbucking circuits and 18 circuits with hum. Mixed a different way, using switchless analog circuits, they can produce the tones of all 19 switched humbucking circuits, plus all the continuous variations in between.

8 Claims, 33 Drawing Sheets

© 2021 don baker dba android originals LC

(56) References Cited

U.S. PATENT DOCUMENTS

| | | | |
|---|---|---|---|
| 3,911,777 | A | 10/1975 | Rendell |
| 4,254,683 | A | 3/1981 | Nulman |
| 4,359,923 | A | 11/1982 | Brunet |
| 4,854,210 | A | 8/1989 | Palazzolo |
| 5,682,003 | A | 10/1997 | Jarowsky |
| 5,945,614 | A | 8/1999 | White |
| 5,994,633 | A | 11/1999 | Norton |
| 6,046,392 | A | 4/2000 | Saul |
| 6,111,184 | A | 8/2000 | Cloud et al. |
| 6,114,616 | A | 9/2000 | Naylor |
| 6,194,644 | B1 | 2/2001 | Hendrickson |
| 6,525,246 | B1 | 2/2003 | Erismann |
| 6,653,538 | B1 | 11/2003 | Wells |
| 6,809,245 | B2 | 10/2004 | Sawhney et al. |
| 7,060,888 | B2 | 6/2006 | Spalt |
| 7,084,336 | B2 | 8/2006 | Towers |
| 7,141,730 | B1 | 11/2006 | Wu |
| 7,151,210 | B2 | 12/2006 | Janes et al. |
| 7,442,865 | B2 | 10/2008 | Moghaddam |
| 7,507,885 | B2 | 3/2009 | Coke |
| 7,514,614 | B2 | 4/2009 | McGrew |
| 7,538,269 | B2 | 5/2009 | van Ekstrom |
| 7,705,223 | B2 | 4/2010 | Kirkland et al. |
| 8,008,558 | B2 | 8/2011 | Koentopp |
| 8,207,432 | B2 | 6/2012 | Fodera |
| 8,283,552 | B2 | 10/2012 | van Ekstrom |
| 9,401,134 | B2 | 7/2016 | Baker |
| 9,466,269 | B2 | 10/2016 | Brown |
| 9,697,807 | B2 | 7/2017 | Brown |
| 9,852,718 | B1 | 12/2017 | Kelly |
| 10,217,450 | B2 | 2/2019 | Baker |
| 10,276,142 | B2 | 4/2019 | Ma |
| 10,311,851 | B1 | 6/2019 | Stadnyk |
| 10,380,986 | B2 | 8/2019 | Baker |
| 10,810,987 | B2 | 10/2020 | Baker |
| 10,991,353 | B1 | 4/2021 | Baker |
| 11,011,146 | B2 | 5/2021 | Baker |
| 11,087,731 | B2 | 8/2021 | Baker |

© 2021 don baker dba android originals LC

© 2021 don baker dba android originals LC

© 2021 don baker dba android originals LC

© 2021 don baker dba android originals LC

© 2021 don baker dba android originals LC

© 2021 don baker dba android originals LC

© 2021 don baker dba android originals LC

© 2021 don baker dba android originals LC

© 2021 don baker dba android originals LC

© 2021 don baker dba android originals LC

© 2021 don baker dba android originals LC

© 2021 don baker dba android originals LC

© 2021 don baker dba android originals LC

© 2021 don baker dba android originals LC

© 2021 don baker dba android originals LC

© 2021 don baker dba android originals LC

© 2021 don baker dba android originals LC

© 2021 don baker dba android originals LC

© 2021 don baker dba android originals LC

© 2021 don baker dba android originals LC

© 2021 don baker dba android originals LC

© 2021 don baker dba android originals LC

© 2020 don baker dba android originals LC

© 2020 don baker dba android originals LC

© 2020 don baker dba android originals LC

© 2020 don baker dba android originals LC

© 2020 don baker dba android originals LC

© 2020 don baker dba android originals LC

© 2020 don baker dba android originals LC

© 2020 don baker dba android originals LC

© 2020 don baker dba android originals LC

© 2020 don baker dba android originals LC

© 2020 don baker dba android originals LC

ELECTRIC STRINGED INSTRUMENT USING MOVABLE PICKUPS AND HUMBUCKING CIRCUITS

This application claims the precedence of U.S. PPA 63/220,358, continues in part the guitar body, pickup mounting system and humbucking pair circuits in U.S. Pat. No. 9,401,134 (Baker, 2016), and continues in part the humbucking and humbucking pair circuits in U.S. Pat. No. 10,217,450 (Baker, 2019), U.S. Pat. No. 10,380,986 (Baker, 2019), U.S. Pat. No. 10,810,987 (Baker, 2020), U.S. Pat. No. 11,011,146 (Baker, 2021) and U.S. Pat. No. 11,087,731 (Baker, 2021) and the U.S. Non Provisional patent application Ser. No. 17/363,901 (Baker, 2021); and is related to U.S. Pat. No. 10,991,353 (Baker, 2021), and U.S. Pat. No. 10,878,785 (Baker, 2020) and U.S. Non-Provisional patent application Ser. No. 15/917,389 (Baker, 2018) and Ser. No. 16/156,509 (2018); filed by this inventor, Donald L. Baker dba android originals LC, Tulsa OK USA.

COPYRIGHT AUTHORIZATION

Left Blank

The entirety of this application, specification, claims, abstract, drawings, tables, formulae etc., is protected by copyright: © 2021 Donald L. Baker dba android originals LLC. The (copyright or mask work) owner has no objection to the fair-use facsimile reproduction by anyone of the patent document or the patent disclosure, as it appears in the Patent and Trademark Office patent file or records, but otherwise reserves all (copyright or mask work) rights whatsoever.

Application Publication Delay

N/A

DESCRIPTION

Title of Invention: Electric Stringed Instrument Using Movable Pickups and Humbucking Circuits

CROSS-REFERENCE TO RELATED APPLICATIONS

This invention is intended for use with will all pickups and pickup circuits, but especially those in U.S. Pat. Nos. 9,401,134; 10,217,450; 10,380,986; 10,810,987; 10,991,353; 11,011,146 and 11,087,731 and in U.S. Non-Provisional patent application Ser. Nos. 15/917,389, 16/156,509 and 17/363,901, filed by this inventor, Donald L. Baker dba android originals LC, Tulsa OK USA.

STATEMENT REGARDING FEDERALLY SPONSORED RESEARCH OR DEVELOPMENT

Not Applicable

NAMES OF THE PARTIES TO A JOINT RESEARCH AGREEMENT

Not Applicable

Incorporation-by-Reference of Material Submitted on a Compact Disc or as a Text File Via the Office Electronic Filing System (EFS-WEB)

Not Applicable

Statements Regarding Prior Disclosures by the Inventor or a Joint Inventor

Oblique reference to the invention has been made on the Twitter account @TSGaxe, regarding the purpose of the invention, but without details constituting a disclosure.

TECHNICAL FIELD

This invention describes a form of hollow-body electric stringed-instrument or guitar body, adaptable to many types of pickups, which pickups can be moved by the musician to facilitate tuning of string signal output tones, which uses the open space between mounted pickups as a sound hole, and which improves previously invented humbucking pickup circuits to better facilitate combining signals from different kinds of pickups on the same instrument.

U.S. REFERENCES

U.S. Pat. No. 1,861,717, Pfeil, 1932 Jun. 7, Musical instrument

U.S. Pat. No. 2,239,985, Benioff, 1941 Apr. 29, Electrical musical instrument

U.S. Pat. No. 3,413,883, Helbourne, 1968 Dec. 3, Stringed musical instrument

U.S. Pat. No. 3,657,462, Robinson, 1972 Apr. 18, Stringed musical instrument adapted for interchangeable bodies U.S. Pat. No. 3,771,408, Wright, 1973 Nov. 13, Guitar body U.S. Pat. No. 3,911,777, Rendell, 1975 Oct. 14, Electric guitar with slidable pickup beneath strings U.S. Pat. No. 4,254,683, Nulman, 1981 Mar. 10, Stringed electrical instrument U.S. Pat. No. 4,359,923, Brunet, 1982 Nov. 23, Unitary guitar construction U.S. Pat. No. 4,854,210, Palazzolo, 1989 Aug. 8, Detachable electric guitar pick-up system U.S. Pat. No. 5,682,003, Jarowsky, 1997 Oct. 28, Semi-acoustic electric guitar U.S. Pat. No. 5,945,614, White, 1999 Aug. 31, Modular guitar system U.S. Pat. No. 5,994,633, Norton, 1999 Nov. 30, Stringed musical instruments U.S. Pat. No. 6,046,392, Saul, 2000 Apr. 4, Stringed musical instrument frame having interchangeable sound-board and neck assembly U.S. Pat. No. 6,111,184, Cloud, et al, 2000 Aug. 29, Interchangeable pickup, electric stringed instrument and system for an electric stringed instrument U.S. Pat. No. 6,114,616, Naylor, 2000 Sep. 5, Guitar body U.S. Pat. No. 6,194,644, Hendrickson, 2001 Feb. 27, Modular electric guitar U.S. Pat. No. 6,525,246, Erismann, 2003 Feb. 25, Guitar or similar musical instrument comprising a detachable body support U.S. Pat. No. 6,653,538, Wells, 2003 Nov. 25, Modular creased soundboard construction U.S. Pat. No. 6,809,245, Sawhney, et al, 2004 Oct. 26, musical instrument having exchangeable components U.S. Pat. No. 7,060,888, Spalt, 2006 Jun. 13, Movable stringed instrument pickup system U.S. Pat. No. 7,084,336, Towers, 2006 Aug. 1, User-adjustable ergonomic stringed musical instrument U.S. Pat. No. 7,141,730, Wu, 2006 Nov. 28, Method of producing electric guitar body U.S. Pat. No. 7,151,210, Janes, et al, 2006 Dec. 19, Solid body acoustic guitar U.S. Pat. No. 7,442,865, Moghaddam, 2008 Oct. 28, Interchangeable and modular acoustic and electric guitar apparatus U.S. Pat. No. 7,507,885, Coke, 2009 Mar. 24, Structure for musical instrument body U.S. Pat. No. 7,514,614, McGrew, 2009 Apr. 7, Electro-acoustic guitar U.S. Pat. No. 7,705,223, Kirkland, et al, 2010 Apr. 27, Ergonomic guitar U.S. Pat. No. 8,008,558, Koentopp, 2011 Aug. 30, Focused input stringed instrument U.S. Pat. No. 8,207,432, Fodera, 2012 Jun. 12, Acoustic and semi-acoustic stringed instrument having a neck-to-body junction U.S. Pat. No. 8,283,552, van Ekstrom, 2012 Oct. 9, Docking system for pickups on electric guitar U.S. Pat. No. 9,401,134, Baker, 2016 Jul. 26, Acoustic-electric stringed instrument with improved body, electric pickup placement, pickup switching and electronic circuit U.S. Pat. No. 9,466,269, Brown, Jr., 2016 Oct. 22, Electric guitar system for quick changes U.S. Pat. No. 9,697,807, Brown, Jr., 2017 Jul. 4, Electric guitar system for quick changes U.S. Pat. No. 9,852,718, Kelly, 2017 Dec. 26, Modular guitar body U.S. Ser. No. 15/917,389, Baker, filed 2018 Jul. 14, Single-coil pickup with reversible magnet & pole sensor U.S. Ser. No. 16/156,509, Baker, filed 2018 Oct. 10, Means and methods for obtaining humbucking tones with variable gains U.S. Pat. No. 10,217,450, Baker, 2019 Feb. 26, Humbucking switching arrangements and methods for stringed instrument pickups U.S. Pat. No. 10,276,142, Ma, 2019 Apr. 30, Pickup system and electrically-amplifiable stringed instrument U.S. Pat. No. 10,311,851, Stadnyk, 2019 Jun. 4, Reconfigurable electric guitar pickup hot-swap cartridge system U.S. Pat. No. 10,380,986, Baker, 2019 Aug. 13, Means and methods for switching odd and even numbers of matched pickups to produce all humbucking tones Baker, Donald L., 2020, Sensor Circuits and Switching for Stringed Instruments, humbucking pairs, triples, quads and beyond, 2020, © Springer Nature Switzerland AG 2020, ISBN 978-3-030-23123-1, available at Springer dot com and Amazon dot com U.S. Pat. No. 10,810,987, Baker, 2020 Oct. 20, More embodiments for common-point pickup circuits in musical instruments U.S. Pat. No. 10,991,353, Baker, 2021 Apr. 27, Modular single-coil pickup U.S. Pat. No. 11,011,146, Baker, 2021 May 18, More embodiments for common-point pickup circuits in musical instruments—Part C U.S. Pat. No. 11,087,731, Baker, 2021 Aug. 10, Humbucking pair building block circuit for vibrational sensors U.S. Ser. No. 17/363,901, Baker, 2021 Jun. 30, A class of potentiometers and analog circuits for linearly mixing signals

NON-U.S. REFERENCES

CA 2,483,952, Small, 2005 Apr. 9, Stringed instrument with tonal control

GB 2,406,956, Small, 2005 Apr. 13, Stringed instrument with slidable pickups

KR 10-1674377, (unreadable in English), 2016 Nov. 3, (swappable pickups)

WO 2017/005461, Ma, 2017 Jan. 12, Pickup system and electrically-amplifiable stringed instrument

BACKGROUND, PRIOR AND RELATED ART

There are a great many patents for guitar bodies which are either modular, skeletal, hollow-bodied or some combination thereof, going all the way back to one of the first electrified stringed instrument patents, U.S. Pat. No. 1,861,717 (1932). They include U.S. Pat. Nos. 2,239,985; 3,413,883; 3,657,462; 3,771,408; 4,359,923; 5,582,003; 5,945,614; 5,994,663; 6,046,392; 6,114,616; 6,194,644; 6,525,246; 6,653,538; 6,809,245; 7,084,336; 7,141,730; 7,151,210; 7,442,865; 7,507,885; 7,514,614; 7,538,269; 7,705,223; 8,008,558; 8,207,432; 8,283,552; 9,466,269; 9,697,807; and 9,852,718. There are fewer patents for movable or changeable pickups. They include U.S. Pat. Nos. 3,911,777; 4,254,683; 4,854,210; 6,046,392; 6,111,184; 7,060,888; 10,276,142 and 10,311,851, and non-U.S. Patents CA 2,483,395; GB 2,406,956; KR 101674377 and WO 2017/005461. But none of those posit or show a guitar body with pickups mounted to parallel slots in the top face of the instrument, moving in a rectangular sound hole beneath the strings, said hole being connected to hollows within the instrument, with various embodiments for mounting a range of humbucking and non-humbucking pickups in size from a Jazzmaster pickup down to a small single-coil pickup. Nor do they integrate one or more types of matched single-coil pickups or one or more types of humbucking pickups, or any combination thereof, into humbucking circuits.

In U.S. Pat. No. 9,401,134 (2016), Baker disclosed a guitar with skeletal body with a removable soundboard and back, a pickup mounting system with adjustments for five degrees of freedom, a switching system with all-humbucking outputs using matched single-coil pickups, and other electronic circuits. The pickup mounting system attached pickup to a pair of tracks by means of screws, springs and sliding nuts in the tracks, the tracks being parallel to the strings, along which the pickups could slide and twist into any height, orientation and position between the neck and bridge.

In U.S. Pat. No. 10,217,450 (2019), Baker disclosed a complete survey of series-parallel circuits of matched single-coil pickups up to five per circuit, enumerating the number of possible circuits, then doubled the number of coils per position, up to three positions, to enumerate a number of humbucking circuits. Baker disclosed a number of electro-mechanical switching systems and their limitations, then exceeded those limitations by specifying a digital-analog cross-point switching system with analog signal processing, all driven by a programmable controller.

In U.S. Ser. No. 15/917,389 (2018), Baker disclosed a single-coil pickup with a removable magnet which could be reinstalled with the magnetic field reversed, allowing humbucking circuits of matched single-coil pickups to reverse the string signal phase without affecting the humbucking nature of the circuits. In U.S. Pat. No. 10,991,353 (2021), Baker disclosed a modular pickup, with one or more of the base, magnet-and-coil core, cover and pole modules replaceable, allowing for a range of pickup options, and for reversing the magnetic field without harming humbucking circuits.

In U.S. Pat. No. 10,380,986 (2019), Baker disclosed a simplified switching circuit which would produce all-humbucking circuits from two or more matched single-coil pickups. In U.S. Pat. No. 10,810,987 (2021) and U.S. Pat.

No. 11,011,146 (2021) Baker disclosed more specific embodiments for U.S. Pat. No. 10,380,986. With pickup coils matched in hum response, there are more humbucking tones possible, even with single-coil pickups and electro-mechanical switches, than the standard 3-way and 5-way switches provide.

In U.S. Ser. No. 16/156,509 (2018), Baker disclosed analog pickup circuits that linearly combined humbucking signals from matched pairs of pickups to produce not only all the possible switched humbucking circuit tones, but all of the continuous tones in between. In U.S. Pat. No. 11,087,731 (2021), Baker disclosed the continuation of Ser. No. 16/156,509. In Ser. No. 17/363,901, Baker improved upon analog mixing circuits in U.S. Pat. No. 11,087,731. All of this related art by Baker either can be used in this invention, or is advanced by it.

SUMMARY OF INVENTION

This invention is intended as both a new kind of electric guitar, and as a test bed for various types of pickups and circuits. It simplifies the pickup mounting system in U.S. Pat. No. 9,401,134, making it a pair of parallel slots in the musical instrument top, or sound board, on either side of a rectangular sound hole, which also connects directly to hollow spaces within the instrument. Screws passing through the slots hold one or more electromagnetic pickups between the slots and under the instrument strings. This allows one or more pickups to be moved under the strings, between the neck and bridge, to change the tone of string signal output. A solid backbone extends in the guitar body between the neck and bridge, and the top is removable.

This allows a wide variety of pickup types, both single-coil and dual-coil humbucking to be mounted to the instrument, either to the backbone or the slots in the top via adapters and different tops. Examples and designs are given for mounting Jazzmaster, P-90, Soapbar and Strat-type single-coil pickups, and dual-rail single-sized, mini Hofner-style and metal-cover Vintage humbucking pickups. Using the mean frequency of six strummed strings, derived from a spectral amplitude analysis, the effect on tone of moving a central P-90 pickup is shown, in three positions between P-90s at the neck and bridge, establishing the reason for movable pickups. Humbucking circuits in some of the other Baker patents are improved here to allow the combination, either by electro-mechanical switching humbucking modules, or by analog circuit humbucking modules, of more than one type of pickup in an output.

Technical Problems Found and Resolved

This invention was made first to demonstrate the capabilities of the 12-way switching system for 3 matched pickups found in FIG. 12 of U.S. Pat. No. 10,810,987, using a variety of pickups. The less-expensive commercial guitars first intended for modification were no longer available, making it necessary to buy necks and to design and build guitar bodies in home wood shop to fit the necks. This inventor had already been making prototype skeleton guitar bodies made of layered wood and plywood, with cavities routed out according to masonite templates, and had considered making bodies with a solid wood backbone between the neck and bridge, and with skeletal wings attached to affix the top and back sound plates. After deciding to simplify the track mounting system of U.S. Pat. No. 9,401,134 to a pair of slots in the top plate, it then became a matter of devising the adapters and attachments to fit a wide variety of pickups to either the backbone, the top plate or both.

With each additional type of pickup considered, the backbone had to be pared down and modified to make each type of pickup mountable, and easily accessible when the bottom plate is removed. The result became an almost universal body, with different top plates, and backbone reinforcement where necessary, to accommodate all the chosen pickup types. The space in which the pickups mount between the top plates and slide under the strings form a rectangular sound hole, which opens into the electronics cavities. The lute-like, inverted tulip body design both gives maximum access to the frets and uses a minimum of wood, limiting plywood or solid wood sizes to planks of 12 by 14 inches. With the hollow-body construction, this makes the instrument more compact and lightweight, compared to other electric guitars. Nevertheless, it is possible to add optional extensions to the body, such as to rest the picking forearm. And since the construction uses ordinary home shop power tools, the invention also lends itself to the possibility of a DIY kit guitar, added onto a commercial neck.

The amount of room in this invention to move, remove and replace pickups allowed consideration of combining different types of pickups into an all-humbucking output; one type of humbucker with another, one type of matched single-coil pickup with another, and humbuckers with single-coil pickups. In U.S. Pat. No. 11,087,731, which disclosed an analog humbucking pair mixing module, claimed and specified that different types of pickup could only be mixed together with the same type, with the output of the different types then combined at the final output. U.S. Ser. No. 17/363,901 improved the mixing circuit. This invention required the development of a humbucking pair module, either an electro-mechanical or an analog circuit, to mix different types of together within a cascade or tree connection of modules. Upon further consideration on how to combine humbucking pickups and pairs using electro-mechanical switches, it became clear that humbucking pair signals from different pickups can be mixed into a cascade of humbucking mixing modules. With electro-mechanical switches, different types may still interact to cross-couple tonality through impedance loading, but fully-differential, high-input-impedance amplifiers in the analog humbucking modules disclosed here, and in related art prevent, that.

BRIEF DESCRIPTION OF THE DRAWINGS

FIG. 15 is the lower body profile of 18 mm ply.

FIG. 16 is the upper body profile of 18 mm plywood, showing two P-90 pickups fixed to it at the neck and bridge.

FIG. 17 shows the body with the top plates of 3 mm plywood, and the middle P-90 mounted in a pair of short mounting slots.

FIG. 18 shows the bottom 3 mm ply plate with the access slot for the strings to pass to the bridge, and the neck screw plate.

FIG. 22, a standard Strat-type single-coil pickup; FIG. 23, a Musiclily model 533 single-sized dual rail humbucker; FIG. 24, a Hofner-style mini-humbucker, Allparts model PU-6430; FIG. 25, an Allparts PU-6459 chromed Vintage style humbucker; FIG. 26, an Allpart model PU-0436 Soapbar single-coil pickup; FIG. 27, an Allparts PU-0418 P-90 single-coil pickup; and FIG. 28, an Allparts PU-6193 Jazzmaster single-coil pickup, with an added mounting plate.

FIG. 48A shows the generic version of the circuit in FIG. 48B, where three single-coil pickups of any magnetic orientation are used, with the hum phase indicated.

DESCRIPTION OF THE INVENTION

Note regarding use of Allparts and Musiclily trademarks: Particulars of these companies, cited throughout this text, can be found at allparts_dot_com and musiclily_dot_com. These companies are identified because of the pickups that were bought from them and used for the Figures here. Other manufacturers may make similar pickups with similar names but slightly different dimensions. Other possibly trademarked terms, such as "Soapbar", "Hofner", "P-90" and "Jazzmaster" are used merely to identify styles and kinds of pickups as they were done in the Sellers' literature. These particular pickups are used here because they are inexpensive enough to be bought, used and tested in guitar prototypes, and in some cases modified. No endorsement is intended or implied.

A First Embodiment

Figure 1:
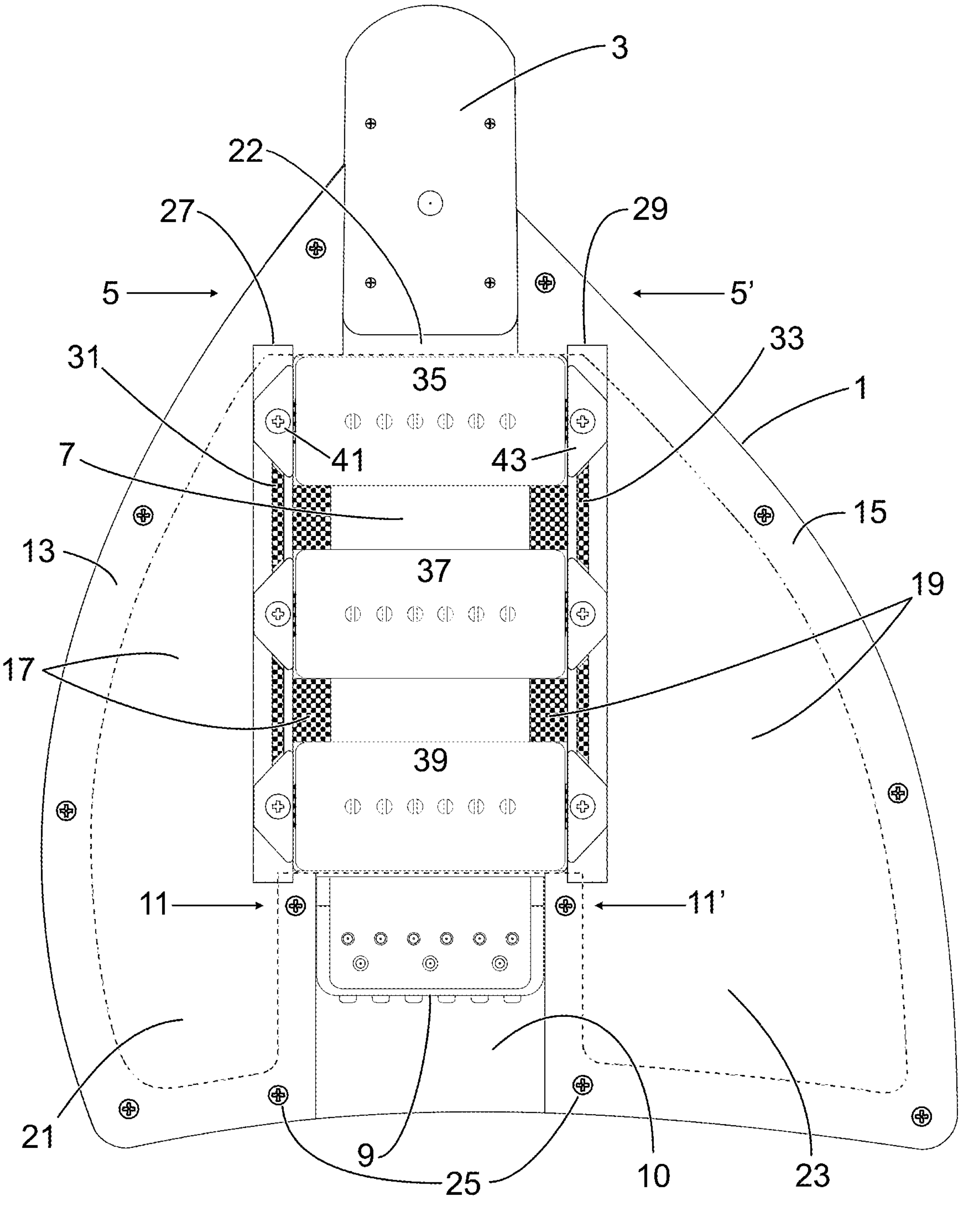
FIG. 1 shows the invented guitar with the neck, strings and bridge saddles removed, showing the backbone underneath three P-90 pickups, each movable and mounted in slots in the left and right top plates.

FIG. 1 shows an embodiment of the invention with its basic mechanical features, a hollow musical instrument body with large rectangular sound hole under the strings between the neck and bridge, with parallel slots on the sound hole edges for mounting pickups. This is not the only possible construction, but follows a previous prototype design, intended for use to test pickup electronics with a number of pickup types. This embodiment has a lute-shaped guitar body (1) with a mounting pad and socket (3) for a removable fretted neck (not shown). The line from 5 to 5' indicates the position of the 21 fret. The neck mounting pad is extended in an interior backbone (7) to the bottom of the instrument, where the bridge (9) is mounted on an elevated pad (10). Line 11-11' denotes the bridge line, the average position of the saddles (not shown) with properly intonation for standard EADGBE string tuning. For a neck with 12.75 inches between the nut and 12 fret, the distance from 5-5' and 11-11' is about 7.70 inches.

The backbone has left (13) and right (15) ribs extending above the backbone toward the viewer from the neck mounting pad to the bridge mounting pad. The bridge mounting pad is necessarily higher in elevation (towards the viewer) than the neck mounting pad. The ribs are denoted by a solid line at the outside of the body (1) and dashed lines inside. Between the dashed lines and the backbone (7), there is a cavity on the left (17) and on the right (19) denoted by the dashed lines and a checkerboard pattern next to the backbone. Covering these cavities are a left top plate (21) and a right top plate (23) fixed to the ribs (13, 15) by screws (25). This leaves a gap on top of the wall (not shown) at the toe of the neck, which can be filled with a small piece (22), glued to it. The back plate is not shown in this view, but can be taken to be the checkerboard pattern on either side of the backbone. For this embodiment, it screws to the ribs (13, 15) with the same kind of screws (25) in the same places on the back side.

The space between the top plates over the backbone forms a large rectangular sound hole (not numbered). Each top plate has an optional reinforcement area, 27 on the left and 29 on the right, with mounting slots 31 and 33. This embodiment show three P-90-style pickups mounted at the neck (35), the middle (37) and bridge (39), by mounting screws (41) tapping into the pickups, with trapezoidal washers (43) between them and the tops. The screws are tapped into adapters on the pickup tabs (not shown), and there is no spring between the pickups and the top plates; the pickups are hard-mounted to the top plates. The washers follow the contours of the pickup tabs, clamping the reinforced areas and slots between them and the pickups. This provides some strain relief on and support for the slots. Pickups electronics and controls (not shown) are to be mounted in the hollow cavities and on the right top plate (23).

Note that the backbone, which can be level with the bottom of the neck foot, must be below the bottoms of the pickups, and below the tops of the ribs. Note also that with full-length slots (31,33), the pickups can be placed anywhere between the neck and bridge that space allows. With a small enough bridge and a little adjustment of sound hole dimensions, four P-90 pickups can fit between the neck and bridge. In an alternative embodiment (previous prototype), the neck and bridge P-90s were mounted to the body, and the slots were shortened to the extent of movement allowed for the middle pickup between the others, which is about 1.61 inches. Either embodiment can allow the middle pickup to move between the neck and bridge pickups, thereby allowing the tone of the instrument to be adjusted. If full-length slots are used, then all the pickups can be moved.

On a standard strat-type guitar, the pickups and controls are mounted on the pick guard, which is mounted to the body, with the usual exception of the output jack, which is generally mounted on the body separately. The pick guard can generally be removed with all its parts intact by removing the mounting screws, loosening the strings and carefully working the pick guard assembly out from under the strings, with the wires to the output jack still attached. With the two top plates, 21 & 23, in FIG. 1, this is still possible, but the strings will likely have to have much more slack, in order to slide top plate 21 under them. In this embodiment, the pickup mounting tabs have extra material added and threaded for the mounting screws (41), with no mounting springs. So the pickups can be disconnected from the left-hand top plate first, allowing it to stay in place, if it has no electronics mounted to it. Alternatively, if the instrument has a removable back plate, the top plate 23 need not be removed to address the electronics.

In this invention, instead of f-holes, a regular hollow-body guitar can have the large rectangular sound hole and pickup mounting slots, between the neck and bridge under the strings. But a fixed design like this can only mount one type of pickup. A removable top plate or two removable top plates have the advantage of keeping the same underlying body, bridge, strings and neck, while changing the kinds of pickups that can be mounted by simply changing the top plates to those with different sound hole, slot dimensions and positions.

The Reason for Movable Pickups

Figure 2A:
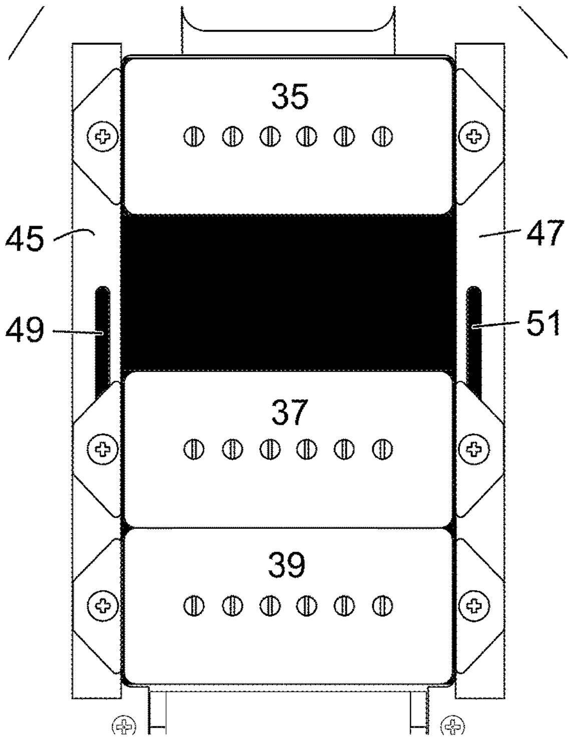
FIGS. 2A-C show three P-90s in a prototype with shorter mounting slots, with one pickup each near the neck and bridge, and the third pickup in three different positions between them.

FIG. 2ABC shows the pickup mounting portion of a similar embodiment of a lute-like guitar body, with left (45) and right (47) reinforcement areas on the top plates (not numbered), and shortened pickup mounting slots, 49 on the left and 51 on right. The neck P-90 pickup (35) and bridge P-90 pickup (39) are mounted in fixed holes in the reinforcement areas (45, 47), while the middle P-90 pickup (37) is mounted in the slots (49, 51), so that it can move from the lower position (FIG. 2A) to the center position (FIG. 2B) and the upper position (FIG. 2C). The middle P-90 can move in a range of about 1.61 inches (4.09 cm). The rest of the guitar body, parts and strings are not denoted or fully shown. In the actual prototype used for this measurement, the neck and bridge pickups were mounted directly to the body, and the middle pickup in a slots in a short lengths of aluminum plate, about 3.0 inches long by 0.75 inch wide by 0.048 inch thick, glued to the top surfaces of the top plates.

It's useful to do a short review on matched single-coil pickups in humbucking common-point connection circuits. FIG. 3 shows the basics of a humbucking triple circuit constructed from the three P-90-style pickups in FIG. 2, which have equal impedance, Z, equal responses to external hum, $V_H$, and are connected at a common point with voltage, $V_C$, by terminals with all the same hum phase (−). Two are connected to the output terminal, Vo, and the third is connected to the ground, GND. This follows the rules set down in U.S. Pat. No. 10,380,986 (Baker, 2019) for constructing humbucking common-point connection circuits of matched single-coil pickups. Math 1 shows the circuit equations and solution for FIG. 3. Effectively, the two Z impedances of the upper pickups each form a voltage divider of ½ for each of the hum voltages ($V_H$) in the upper pickups, which add to $V_H$. Since the hum voltage ($-V_H$) in the lower pickup is opposes the sum of voltages in the upper pair, the hum voltage cancels at the output.

Math 1

$$\frac{Vo - V_C - V_H}{Z} + \frac{Vo - V_C - V_H}{Z} = 0 \quad \text{eq 1}$$

$$\frac{V_C + V_H - Vo}{Z} + \frac{V_C + V_H - Vo}{Z} + \frac{V_C + V_H}{Z} = 0 \quad \text{eq 2}$$

solution: $V_C = -V_H$, $Vo = 0$

Figure 3:
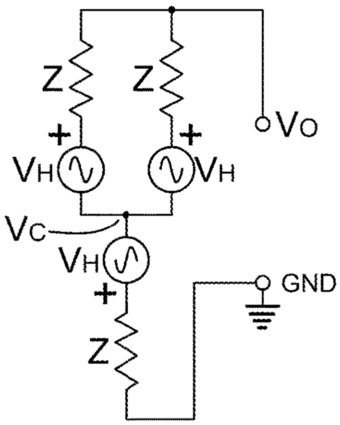
FIG. 3 shows how three matched single-coil pickups, connected with two in parallel, and the parallel pair in series with a single pickup, reject hum by connection the same hum phase where all three meet in the circuit.
Figure 4:
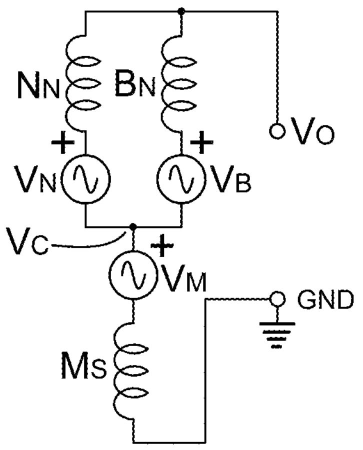
FIG. 4 shows how the same three matched pickups, connected as a parallel pair of a N-up neck pickup and a N-up bridge pickup, that pair connected in series with a S-up middle pickup, produce an output signal equal to $(N_N+B_N)/2+M_S$.

FIG. 4 shows the pickups with the coils, still at the same impedance (Z), identified as the neck pickup ($N_N$), with a North-up magnetic pole, and string signal voltage source, $V_N$, the bridge pickup ($B_N$) with a North-up magnetic pole and string signal voltage source, $V_B$, and the middle pickup ($M_S$), with a South-up magnetic pole and string signal voltage source, $V_M$. Because the middle pickup has the opposite pole up, its string signal has the opposite phase of the other two., which is denoted by the change in position of the (+)-sign next to the voltage source, $V_M$, as compared the to hum voltages in FIG. 3. Math 2 shows the circuit equations and solution.

Math 2

$$\frac{Vo - V_C - V_N}{Z} + \frac{Vo - V_C - V_B}{Z} = 0 \quad \text{eq 1}$$

$$\frac{V_C + V_N - Vo}{Z} + \frac{V_C + V_B - Vo}{Z} + \frac{V_C - V_M}{Z} = 0 \quad \text{eq 2}$$

solution: $V_C = V_M$, $Vo = V_M + (V_N + V_B)/2$

Figure 5:
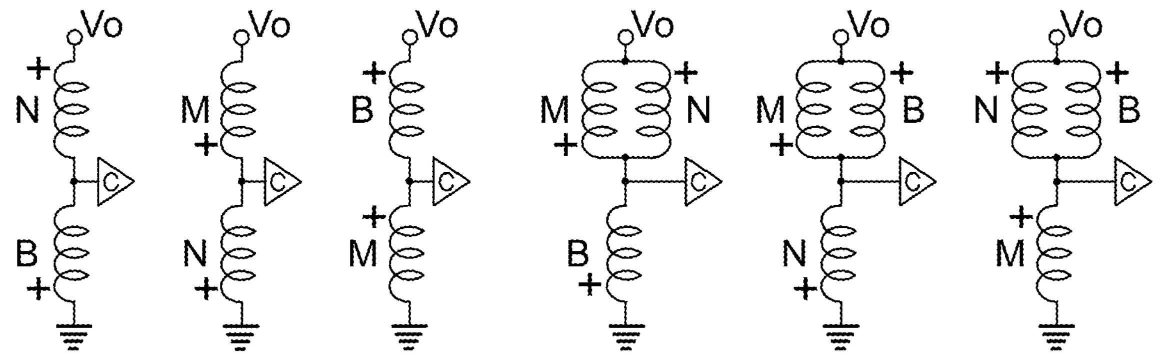
FIG. 5 shows how three matched single-coil pickups, N, M & B (for N-up neck, S-up middle & N-up bridge) can be configured as three humbucking pairs and three humbucking triples, using humbucking common-point connection circuits.

FIG. 5 shows three possible humbucking pairs and three possible humbucking triples, constructed from the neck, middle and bridge P-90s in FIG. 2, designated as N, M and B, respectively, connected to a common point (triangle-C). N and B are still North-up and M is still South-up. So the negative string signal phases of N and B are always connected to the common point, and the positive string signal phase of M is always connected to the common point. From left to right, the outputs, Vo, are respectively: (N−B), −(N+M), (B+M), −(B+(M−N)/2), −(N+(M−B)/2) and M+(N+B)/2, where N, M and B are also taken to represent the string signals from their respective pickups. In this case, we do not count (N+M) as a different tone from −(N+M), because it is not likely that any human ear can hear the difference. They will not likely become different tones unless and until a non-linearity, like a half-wave rectifier, is inserted between Vo and the ear. The nonlinearities of any amplifiers are not considered here. So we count just six possible tones from three matched single-coil pickups using common-point connection humbucking circuits.

Note that if the common point (triangle-C) is grounded, it shorts out the lower pickups in the circuit, leaving the six non-humbucking outputs: N, −M, B, (N−M)/2, (B−M)/2 and (N+B)/2. Note also that shorting the common point to the output, Vo, produces no new outputs or tones. These outputs correspond to those which can be obtained from FIG. 12 in U.S. Pat. No. 10,810,987 (Baker, 2020).

So, what happens to the tone of each of the 12 combined humbucking and non-humbucking circuits when the middle P-90 pickup is moved from the Low to the Center to the High positions in FIG. 2? For this we need a measurement of tone, even a crude one. Tone is commonly held to be very subjective in the human ear, and this inventor is not aware of any recognized physical measures. So here we will use the mean frequency of six strings on a prototype guitar, tuned to the standard EADGBE, and strummed individually in the sequence, 6-5-4-3-2-1-6-5-4-3-2-1, one-half to one second between strikes, open fret, midway between the neck and the bridge. The spectral amplitudes are obtained by feeding the circuit output into a computer microphone input while running a shareware Fast Fourier Transform (FFT) program, Simple Audio Spectrum Analyzer v3.97c, © W.A. Speer 2001-2016, www_dot_techmind_dot_org. The program was used with the following settings:

TABLE 1

| Settings for SpecAn_3.97c | |
|---|---|
| Amplitude scale | 135 db Logarithmic; Zero-weighted |
| Frequency scale | Logarithmic |
| Mixer | Mic input 100% |
| Visualization | Spectrograph with average |
| Sample rate | 16 kHz |
| FFT size | 4096 |
| FFT Window | Hanning (raised cosine) |

This produced 2048 frequency bins of about 4 Hz each, from 0 to 7996 Hz. The export files in MSDOS txt format had headers giving the sample rate, number of windows of 4096 samples and total length of the signal in seconds (i.e., 139 windows, 17.792 second), notation of the Hanning window used, and zero-weighting. There followed two columns of comma-separated data, the frequency of the FFT bin in Hz, $f_n$, and the average amplitude of the signal, $S_n$, in each bin in dBFS, or the decibels as related to the full scale of the computer sound board input at zero dB.

Figure 6:
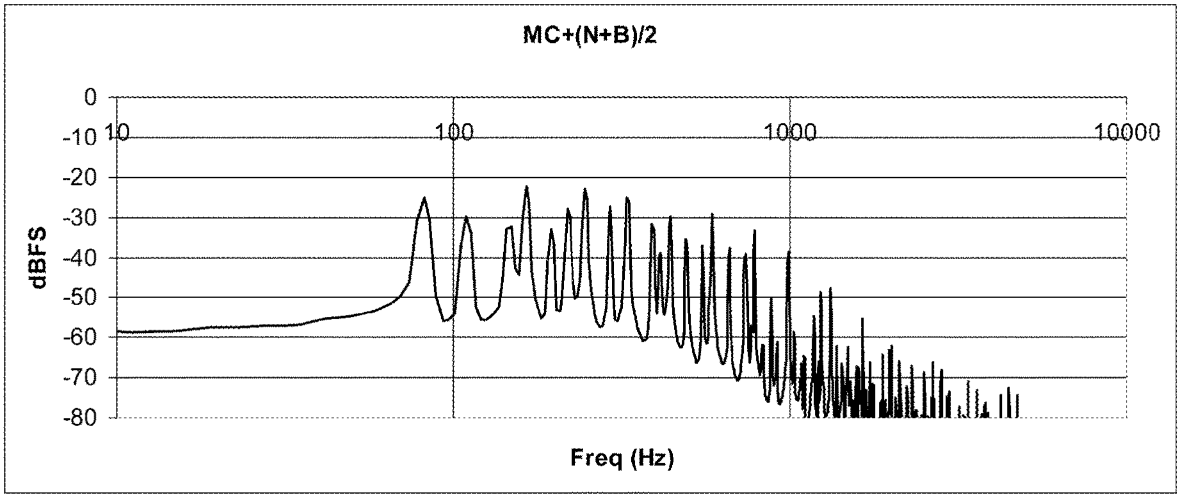
FIG. 6 shows the frequency spectrum output of six strummed strings for the P-90 pickups in FIG. 2B, for the MC+(N+B)/2 humbucking triple output, with the middle pickup in the center position.
Figure 7:
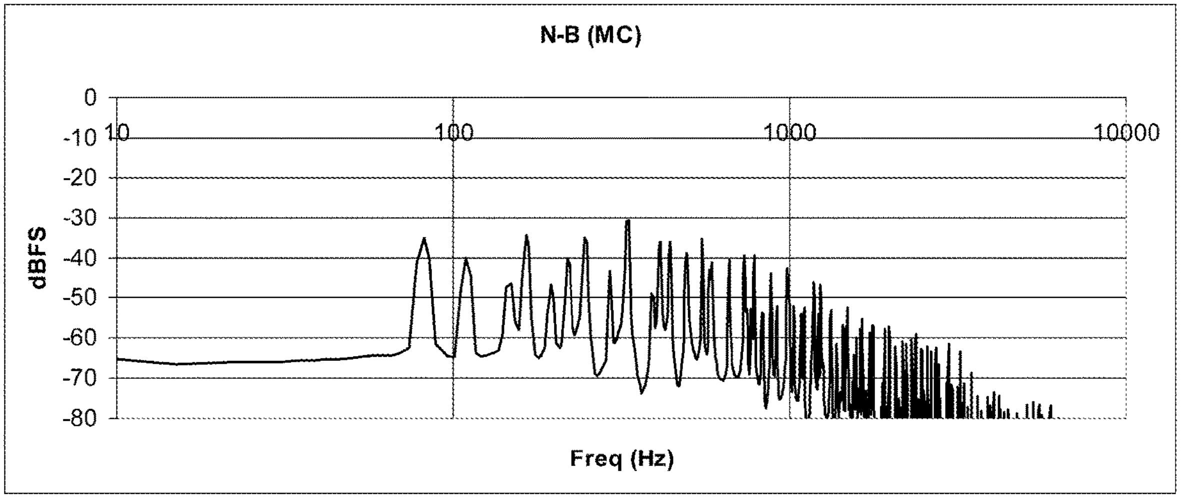
FIG. 7 shows the frequency spectrum output of six strummed strings for two P-90 pickups in FIG. 2B, for the N−B humbucking pair output, with the middle pickup in the center position (MC).

For an example, FIG. 6 shows a portion of the spectral output for the middle pickup in the center position, MC+(N+B)/2. FIG. 7 shows a portion of the spectral output for the neck and bridge humbucking pair, N−B (MC), with the middle pickup in the center position. For the middle pickup in any position, M+(N+B)/2 is commonly the warmest tone, and N−B is commonly the brightest tone, rivaling a bright single-coil pickup at the bridge. A careful looks shows that M−B has a lower output overall because of the phase cancellations, but higher relative peaks in the higher frequencies. From left to right, in both figures, the first several frequency peaks are in bins labeled: 82 Hz, 109 Hz, 148 Hz, 164 Hz, 195 Hz, 218 Hz, 246 Hz, 292 Hz, 328 Hz, 390 Hz, 414 Hz, 441 Hz, 492 Hz, 550 Hz, 589 Hz, 660 Hz, 742 Hz, 785 Hz and 988 Hz. All the higher peaks for MC+(N+B)/2 are below −20 dB. The fundamental frequencies of EADGBE are 82.4, 110.0, 146.8, 196.0, 246.9 and 329.6 Hz for a middle C of 261.6 Hz. So if $E_0$ is the fundamental unfretted harmonic and $E_1$ is the first harmonic, EADGBE can be written as: $E_0$ $A_0$ $D_0$ $G_0$ $B_0$ $E_4$. And approximate frequency peaks above can be written as: $E_0$, $A_0$, $D_0$, $E_1$, $G_0$, $A_1$, $B_0$, $D_1$, $A_2$, $G_1$, $E_4$, $A_3$, $B_1$, $A_4$, $G_2$, $A_4$, $B_2$, $G_3$ and $B_3$.

With no formal training in music theory, all this inventor can tell from FIG. 6 and FIG. 7, is that from $E_0$ to $B_0$, the signal in FIG. 7 is about −10 dB relative to FIG. 6, and above that the relative amplitudes of most of the higher harmonics in FIG. 7 are significantly higher compared to the fundamentals of FIG. 7 than the same comparison in FIG. 6. Recall that zero-weighting was used in the spectrum analysis program. The alternative, A-weighting, would have multiplied the spectral amplitude plot with a standard frequency response curve similar to the human ear, significantly reducing the amplitude spikes below and above about 2500 Hz. Using this would have reduced the peak for $E_0$ by about −21 dB and the peak at $B_0$ by about −9 dB, and would have affected the next calculation, Math 3.

Math 3

$$linV_n(f_n) = 10^{S_n/20},\ 1 \le n \le 2048$$

$$P_V(f_n) = \frac{linV_n}{\sum_{n=1}^{2048} linV_n}$$

$$\text{mean}\cdot f = \sum_{n=1}^{2048} f_n * P_V(f_n), \text{ explained below}$$

$$2nd\cdot\text{movement}\cdot f = \sum_{n=1}^{2048} (f_n - \text{mean}\cdot f)^2 * P_V(f_n)$$

$$3rd\cdot\text{movement}\cdot f = \sum_{n=1}^{2048} (f_n - \text{mean}\cdot f)^3 * P_V(f_n)$$

Recall that the spectrum analysis program produced a column of 2048 values of $(f_n, S_n)$, where $f_n$ is the frequency of the FFT bin in Hz, and $S_n$ is the strength of the signal in the bin in dBFS. Math 3 shows the calculations made in a spreadsheet program from those data. First $S_n$ is converted from exponential dB data to a linear relative voltage, $V_n$. Probability function of the spectrum, $P_V(f_n)$, is calculated by dividing each bin signal voltage by the total of all the bin voltages. Said another way, this is the relative strength of each bin signal compared to the total signal. Then the mean frequency, mean.f, is calculated by multiplying the frequency of each bin by the relative strength of each bin. Higher moments are calculated as shown, but are presented here as the square root of the second moment and the cube root of the third moment, so that both will be in dimensions of frequency (Hz). This was done for every humbucking and non-humbucking circuit for every position of the middle pickup, a total of 36 sets of numbers.

Recall the six humbucking outputs of three matched pickups, (N−B), (N+M), (B+M), (B+(M−N)/2), (N+(M−B)/2) and M+(N+B)/2, which for this purpose the preceding negative signs have been dropped. Table 2 shows the 18 outputs calculated by Math 3, for the low, center and high positions of the middle pickup, as in FIG. 2ABC, where the square root of the second moment and the cube root of the third moment are used instead. Recall also the six non-humbucking signals, N, M, B, (N−M)/2, (B−M)/2 and (N+B)/2, where the preceding negative sign on −M was dropped for this purpose. Table 3 shows the 18 outputs calculated for the low, center and high positions of the middle pickup, with the same headers as Table 2.

TABLE 2

Spectrum Analysis Outputs for Humbucking Signals, ordered by frequency in the center position, where H, C and L indicate the high (neck), center and low (bridge) positions of middle pickup in FIG. 2.

| Middle Pickup Position | Humbucking Signal | Relative Amplitude | Mean Freq (Hz) | Square Root of Second Moment | Cube Root Third Moment |
|---|---|---|---|---|---|
| H | M + (N + B)/2 | 1.57 | 531.0 | 630.8 | 1064.6 |
| H | N + M | 1.08 | 493.0 | 651.0 | 1148.7 |
| H | M + B | 1.52 | 602.7 | 706.1 | 1160.7 |
| H | N + (M − B)/2 | 0.99 | 605.3 | 690.1 | 1106.5 |
| H | B + (M − N)/2 | 1.22 | 711.8 | 730.4 | 1107.0 |
| H | N − B | 0.81 | 877.6 | 902.3 | 1310.9 |
| C | M + (N + B)/2 | 1.49 | 509.0 | 606.1 | 1057.6 |
| C | N + M | 1.11 | 518.7 | 709.1 | 1218.8 |
| C | M + B | 1.56 | 588.6 | 709.6 | 1185.4 |
| C | N + (M − B)/2 | 0.91 | 645.4 | 793.4 | 1221.5 |
| C | B + (M − N)/2 | 1.27 | 677.1 | 721.3 | 1125.3 |
| C | N − B | 0.80 | 862.3 | 929.4 | 1352.6 |
| L | M + (N + B)/2 | 1.74 | 525.4 | 627.3 | 1071.6 |
| L | N + M | 1.18 | 488.6 | 603.3 | 1050.8 |
| L | M + B | 1.48 | 555.4 | 623.7 | 1053.0 |
| L | N + (M − B)/2 | 0.86 | 607.3 | 768.8 | 1196.8 |
| L | B + (M − N)/2 | 1.29 | 673.5 | 723.8 | 1132.3 |
| L | N − B | 0.65 | 795.1 | 842.0 | 1249.4 |
| | Max = | 1.74 | 877.57 | 929.37 | 1352.62 |
| | Min = | 0.65 | 488.64 | 603.32 | 1050.76 |

TABLE 3

Spectrum Analysis Outputs for Non-Humbucking Signals, ordered by frequency in the center position, where H, C and L indicate the high (neck), center and low (bridge) positions of middle pickup in FIG. 2.

| Middle Pickup Position | Humbucking Signal | Relative Amplitude | Mean Freq (Hz) | Square Root of Second Moment | Cube Root Third Moment |
|---|---|---|---|---|---|
| H | N | 1.09 | 560.2 | 672.2 | 1087.1 |
| H | M | 1.30 | 545.3 | 649.2 | 1070.9 |
| H | (N + B)/2 | 2.01 | 688.5 | 771.1 | 1151.8 |
| H | B | 1.63 | 748.9 | 769.9 | 1136.8 |
| H | (N − M)/2 | 0.63 | 963.2 | 910.8 | 1254.5 |
| H | (M − B)/2 | 1.15 | 953.5 | 937.4 | 1290.6 |
| C | N | 1.20 | 573.3 | 705.5 | 1126.4 |
| C | M | 1.37 | 591.2 | 673.7 | 1072.9 |
| C | (N + B)/2 | 2.18 | 681.3 | 774.4 | 1152.0 |
| C | B | 1.38 | 716.2 | 731.7 | 1088.5 |
| C | (N − M)/2 | 0.97 | 875.0 | 825.4 | 1181.9 |
| C | (M − B)/2 | 0.98 | 1015.0 | 944.5 | 1238.0 |
| L | N | 0.89 | 583.6 | 737.8 | 1166.2 |
| L | M | 1.55 | 595.9 | 697.4 | 1115.6 |
| L | (N + B)/2 | 1.84 | 697.3 | 811.9 | 1207.6 |
| L | B | 1.37 | 759.0 | 811.0 | 1190.0 |
| L | (N − M)/2 | 1.04 | 803.8 | 785.7 | 1154.5 |
| L | (M − B)/2 | 0.96 | 1030.5 | 986.7 | 1280.5 |
| | Max = | 2.18 | 1030.5 | 986.7 | 1290.6 |
| | Min = | 0.63 | 545.3 | 649.2 | 1070.9 |

Figure 8:
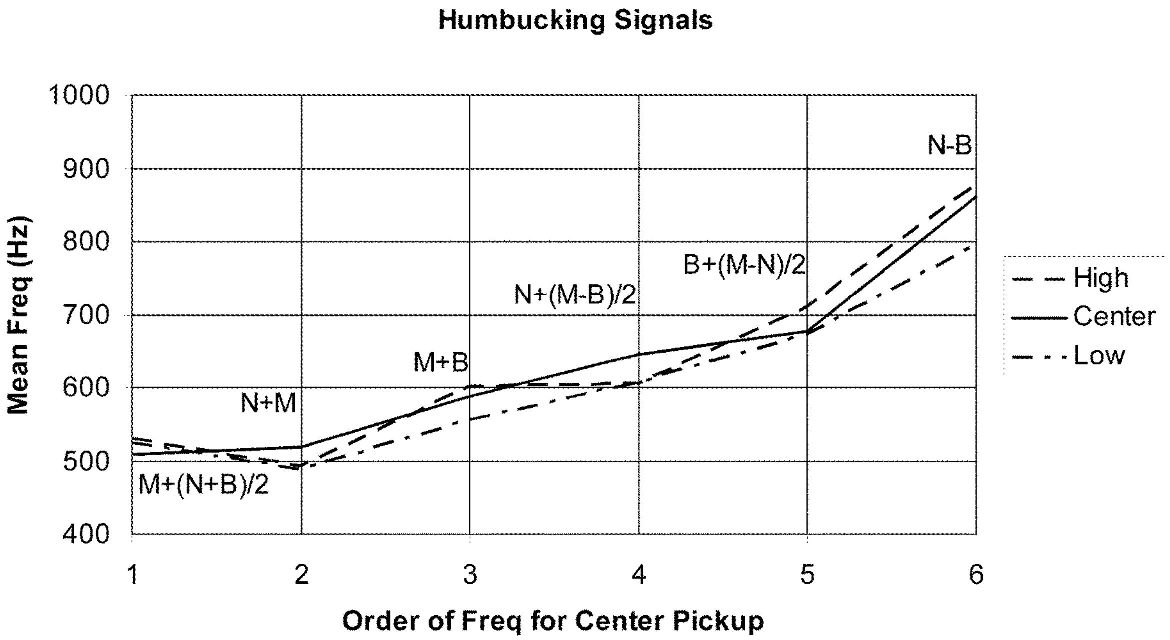
FIG. 8 shows the mean frequency of six strummed strings for the P-90 humbucking pairs and triples, according to FIG. 5, ordered from low to high mean frequency for the middle pickup in the FIG. 2B center position, with the dashed line, solid line and dotted-dashed line, respectively, showing the mean frequency plots for the middle pickup in the FIG. 2C High, FIG. 2B Center and FIG. 2A Low positions.

FIG. 8 shows a plot of humbucking signals in Table 2 for the low, center and high middle pickup positions, in mean frequency versus the order of increasing mean frequency for the center pickup position. We can see, for example, that for the (N+M) signal (2), there is change in moving the middle pickup from the center position to either the low or high positions. For the (M+B) signal (3), there is more change in moving the center pickup from center to low than from center to high. There is more change in the (B+M−N)/2) signal (5) in moving the middle pickup from center to high than from center to low.

Figure 9:
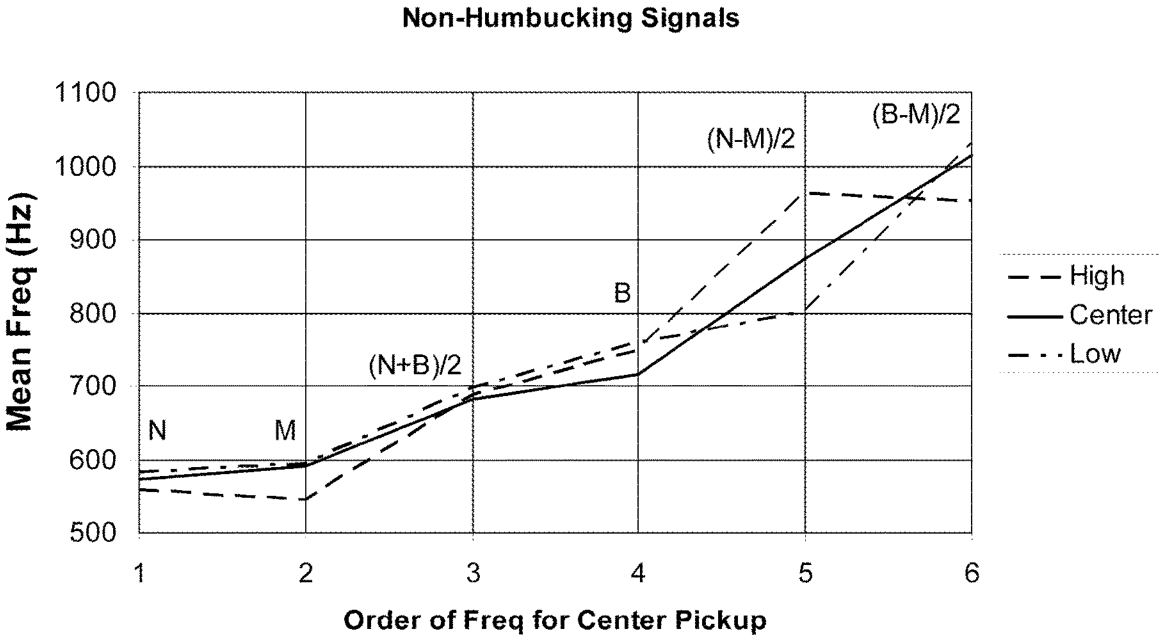
FIG. 9 shows the same type of plots when the lower pickup is shorted out in the pairs and triples of FIG. 5, producing non-humbucking, or hum signals.

FIG. 9 shows a plot of non-humbucking signals in Table 3 for the low, center and high middle pickup positions, in mean frequency versus the order of increasing mean frequency for the center pickup position. Here we see that there is a wider range in magnitudes of variation in moving the middle pickup for different signals, with a change of mean frequency for the (N−M)/2 signal (5) from 804 Hz to 875 Hz to 963 Hz. FIGS. 8 & 9 show the justification for having one or more movable pickups. The tones obviously do change in some measurable, if crude, manner, and having at least one movable pickup in a set of three matched pickups, producing both humbucking and non-humbucking tones (as per U.S. Pat. No. 10,810,987 (Baker, 2020)) offers the potential of a stringed instrument capable of being tuned in tone to better suit the style of the musician.

Figure 10:
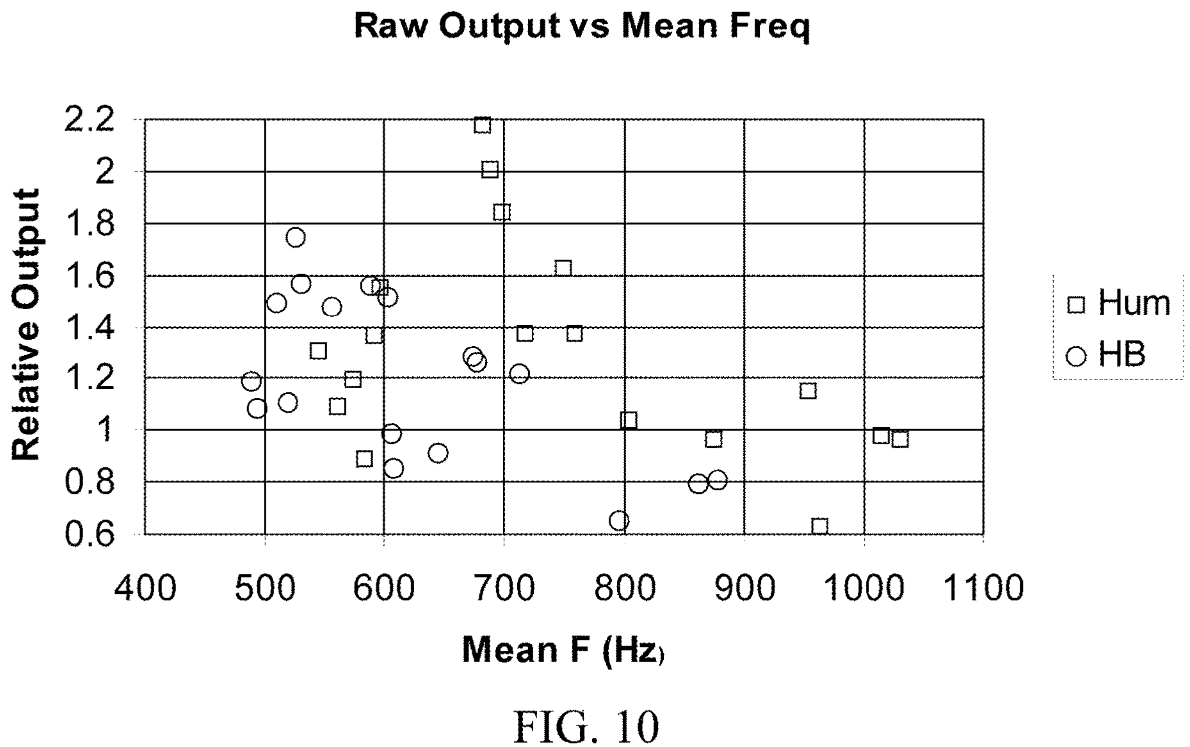
FIG. 10 shows the relative outputs of the signals plotted in FIGS. 8 & 9 versus mean frequency (Hz), with squares denoting Hum signals and circles denoting HB, or Humbucking, signals.

To go a little farther, FIG. 10 shows a combined plot of the Relative Amplitude versus Mean Frequency (Hz) from both Tables 2 & 3, with square symbols for the non-humbucking circuit outputs and circles for the humbucking outputs. Notice that there is a large variation in relative amplitude from 0.63 to 2.18, a ratio of 1:3.46. Note also that a number of the symbols fall almost on top of one another, indicating a possibility of small differences in tone. Further, the tones, both humbucking and not, tend to bunch at the warm end.

Figure 11:
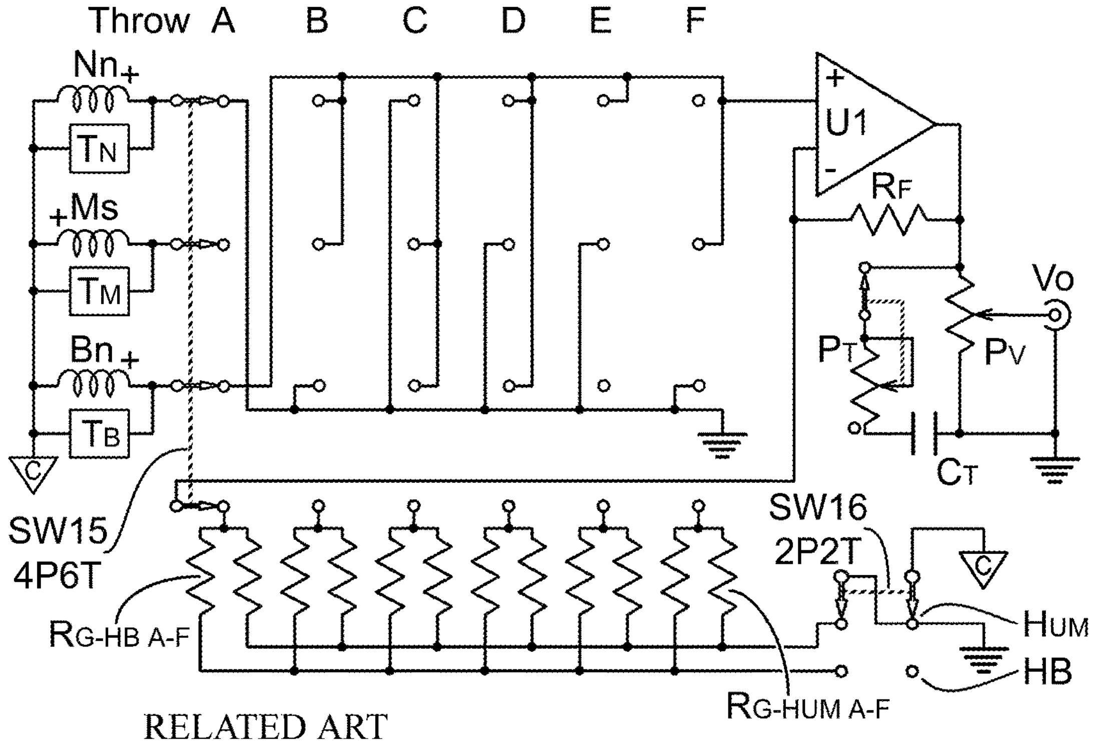
RELATED ART FIG. 11
FIG. 11 is related art, FIG. 16 from U.S. Pat. No. 10,810,987, showing how a 4-pole 6-throw pickup switch and a 2-pole 2-throw mode switch, can be used to generate the 6 HB and 6 Hum signals plotted in FIGS. 8-10, while using an active amplifier to compensate the output amplitude for phase cancellations with switched feedback resistors.
Figure 16:
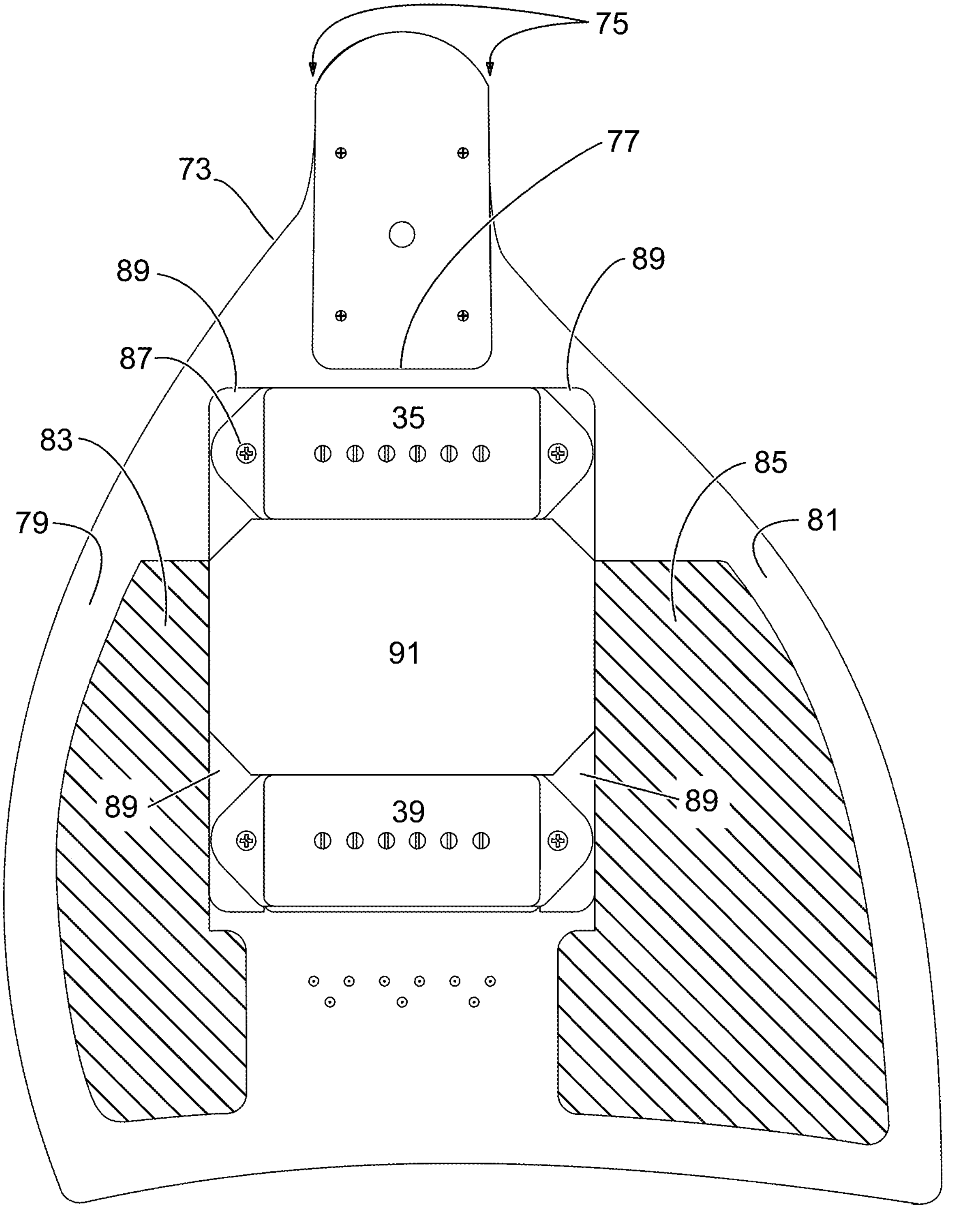

FIG. 11 shows related art, FIG. 16 from U.S. Pat. No. 10,810,987. The order of the circuits generated by the throws A to F of the 4P6T pickup circuit switch, SW15, is not as important as the use of the fourth pole of SW15 to change the feedback resistor, $R_G$, in the preamp circuit of U1, $R_G$, $R_F$, according to both the throw of SW15 and the position of the mode switch, SW16. With SW16 in the upper position, the common-point connection (triangle-C) is grounded, the lower pickups in each of the six outputs circuits are shorted, all the circuits chosen by SW16 are non-humbucking, and the feedback resistors, $R_{G\text{-}HUM\ A\text{-}F}$, are chosen by the fourth pole of SW16. But with the mode switch in the lower position, the common-point connection is not grounded, all the output circuits are humbucking, and the feedback resistors, $R_{G\text{-}HB\ A\text{-}F}$, are chosen. Note that the boxes labeled $T_N$, $T_M$ and $T_B$ represent individual tone controls for ea each pickup. These tone control boxes also appeared in FIGS. 9-11 in U.S. Pat. No. 10,380,986 (Baker, 2019).

Figure 12:
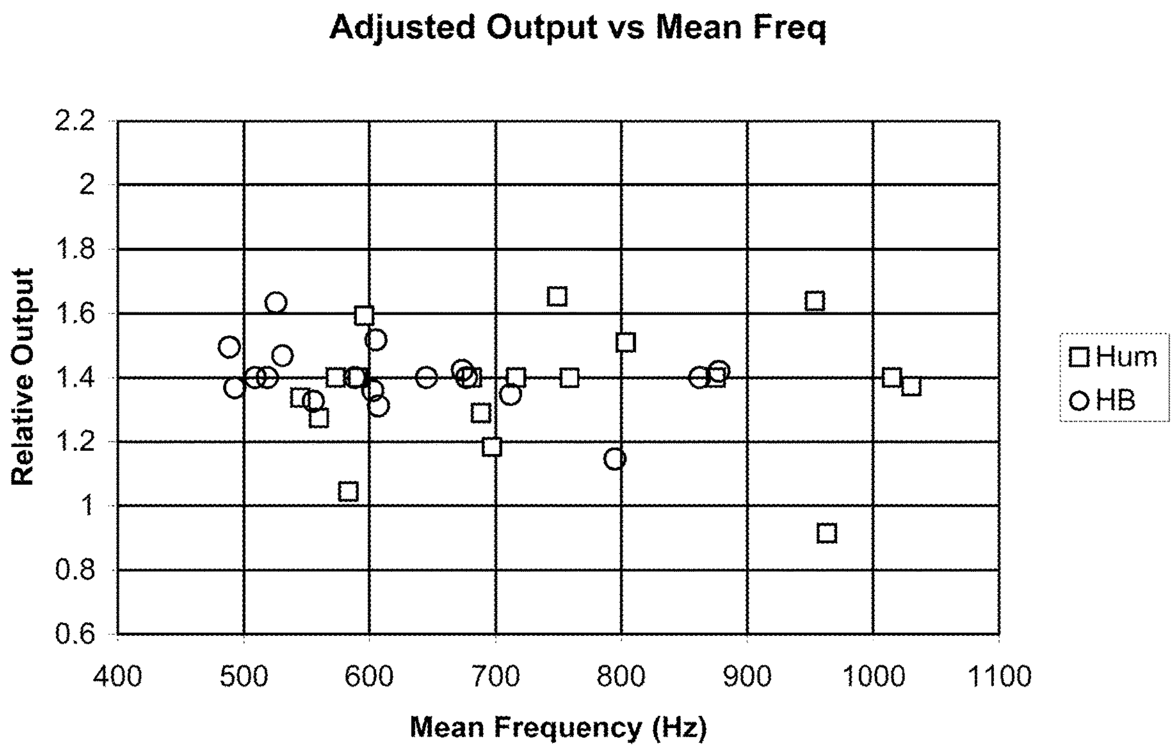
FIG. 12 shows how the circuit in FIG. 11 affects the outputs plotted in FIG. 10, when the feedback resistors in FIG. 11 are adjusted to produce a relative output of 1.4 for the middle P-90 in the center position (FIG. 2B). Only the Center position output are set to 1.4. But the spread is reduced from a range of 0.63 to 2.18 in relative output to a range of 0.915 to 1.65, a reduction of 52.6%.

The relative outputs shown in FIG. 10 run from 0.63 to 2.18, with a ratio of 1:3.46, and a median of about 1.4. Using the feedback resistors in FIG. 11, the gains for each signal can be set to produce an adjusted output of 1.4 for all the humbucking and non-humbucking signals with the middle pickup in the center position. FIG. 12 shows the adjusted outputs when this is done. They now range from 0.915 to 1.65, with a ratio of 1:2.02, a reduction in extreme range by a factor of 1.71. This brings the non-humbucking and humbucking output levels much closer together. But we now see how many of the different circuits produce mean frequencies that are close together, especially at the warm end, between 500 and 700 Hz.

Figure 13:
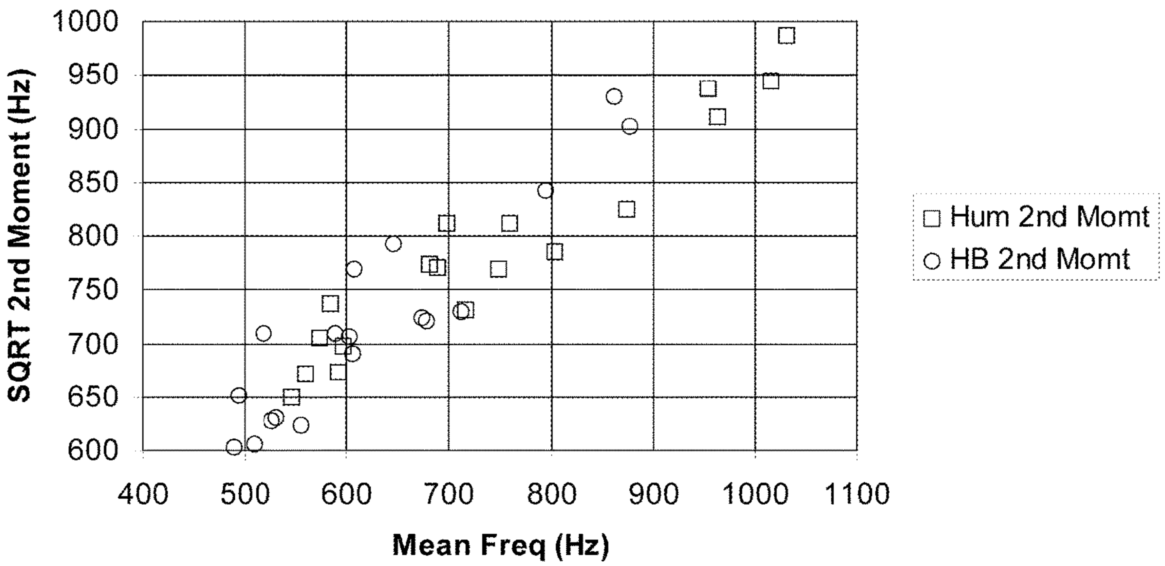
FIG. 13 shows the square roots second moments of the frequency probability distribution (Hz) of six strummed strings, plotted against mean frequency (Hz) for the previous results using three P-90 pickups (without the circuit in FIG. 11), with squares and circles again showing HB and Hum results.
Figure 14:
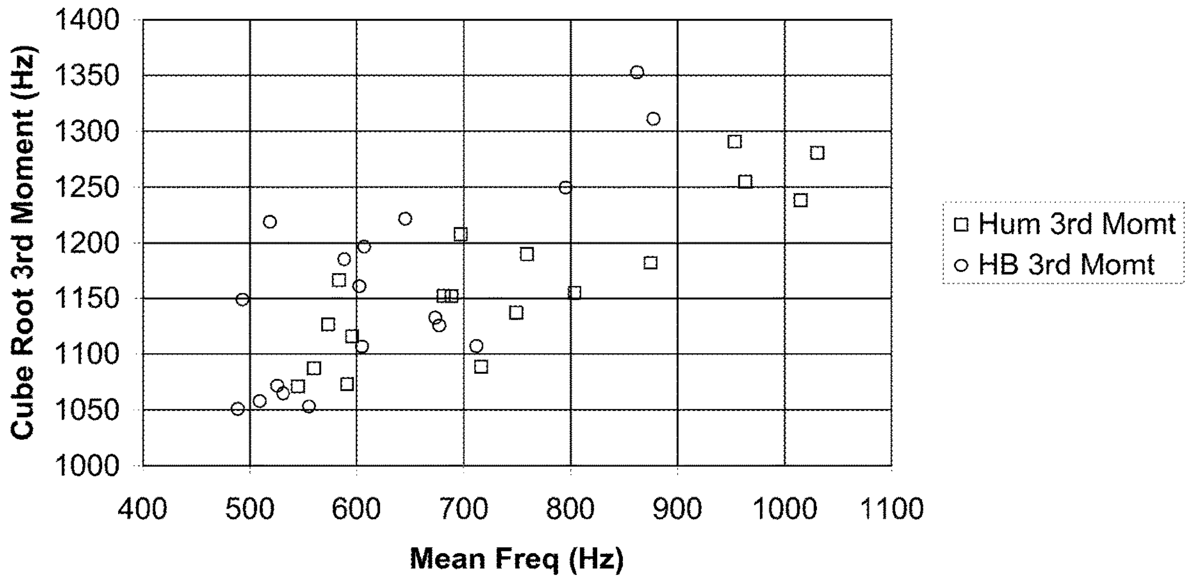
FIG. 14 shows similar results for the cube root of the frequency probability distribution (Hz).

More work needs to be done to come up with a physical measurement of tonal differences that corresponds to what people subjectively hear. But consider FIGS. 13 & 14. FIG. 13 shows the square root of the second moments in Tables 2 & 3 versus mean frequency for the humbucking signals (circles) and non-humbucking signal (squares). FIG. 14 shows a similar plot for the cube root of the third moment versus mean frequency. In FIG. 13, there are five places where 12 symbols overlap, indicating smaller differences in tonal characteristics. In FIG. 14, there are three places where 8 symbols overlap and one where they touch, indicating smaller difference in tonal characteristics, but the other 4 symbols show more separation. It remains to have these signals evaluated by professional musicians, but we can say that up to 24 to 28 of the 36 possible tones, humbucking and not, may be audibly different. This is not bad, compared to a standard 5-way switch for the same three pickups. But for many musicians, it may require some exploration and adjustment to accept it.

A Previous Embodiment

Figure 15:
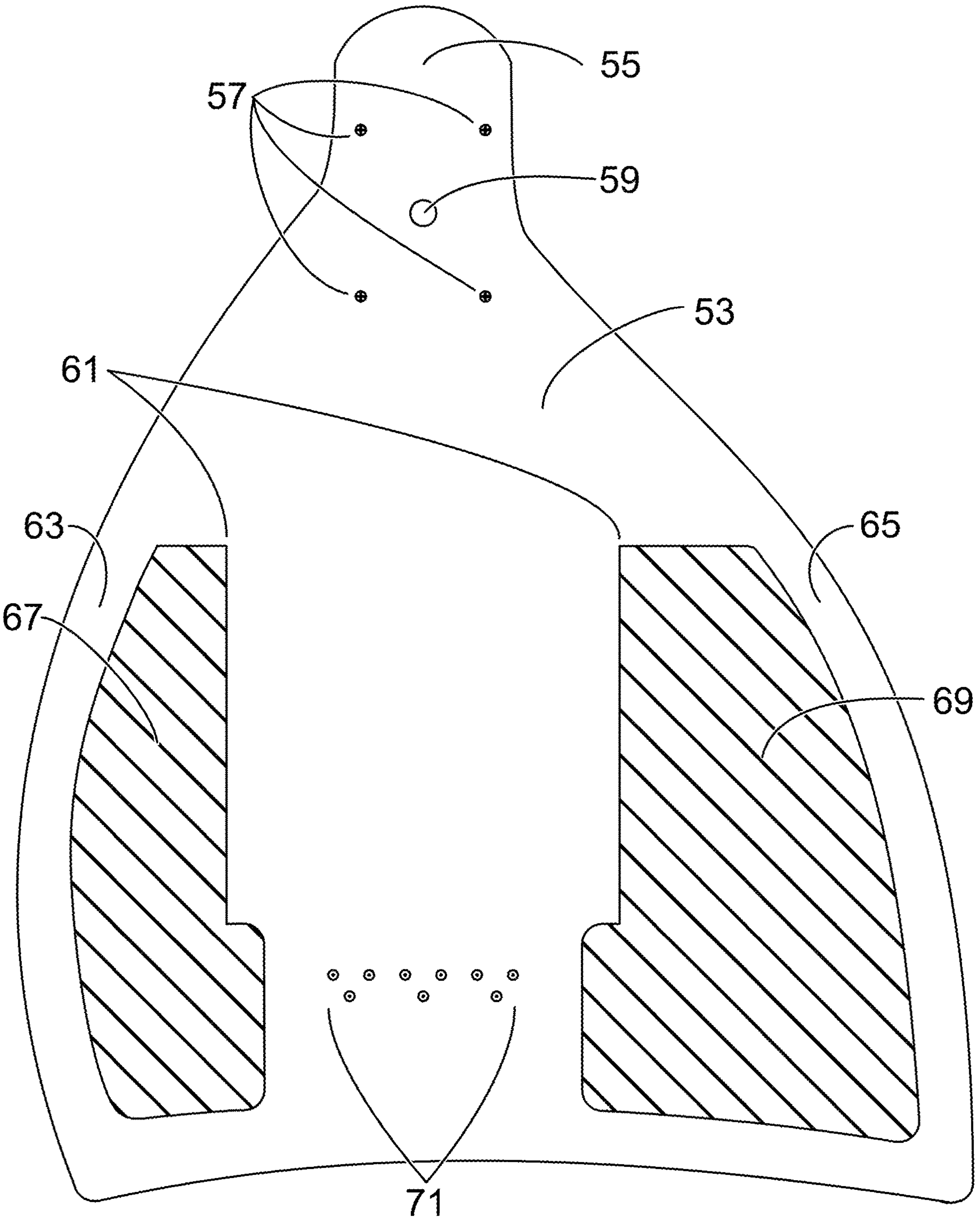
FIGS. 15-18 show a first prototype of the invention, with the body made from two layers of 18 mm, 15-ply Birch plywood, with top and bottom plates made of 3.5 mm, 3-layer Birch plywood.

The data for Tables 2 & 3, and FIGS. 6-10 and 12-14, were obtained by measurements on a previous mechanical embodiment (prototype), shown in FIGS. 15-18. Showing this helps to understand the evolution of the design. The body was made from two layers of 18 mm (nominal ¾-inch) birch plywood, with top and bottom plates of 3.5 mm (nominal ⅛-inch) birch plywood. FIG. 15 shows the lower body profile of 18 mm 15-ply (53). The neck foot mounting area (55) has mounting screw holes (57), on a standard 1.5 by 2 inch rectangle, and a neck knockout hole (59). The lower set of mounting screw holes are set ⅛ inch above the center of the 21$^{st}$ fret on a commercial neck. The lower body profile has a backbone area (61), a left rib (63), a right rib (65), with left (67) and right (69) cutouts between the ribs and the backbones for hollow space and electronics. The bridge mounts in area 71.

FIG. 16 shows the upper body profile (73), also made of 18 mm birch plywood, which is glued to the lower body profile. It has a neck socket (width of 75) routed about 13.4 mm deep, with a bottom wall (77) between it and the routed areas (89, 91) over the backbone (91). Like the lower body profile (FIG. 15, 53), it has left (79) and right (81) ribs enclosing left (83) and right (85) cutouts. The neck pickup (35) and bridge pickup (39) are mounted by four screws (87) to four mounting areas (89) routed about 2.8 mm (0.110 in) into the upper body profile. The rest of the backbone (91) between the neck socket wall (77) and the bridge mounting area (not numbered) is routed to a depth of about 13.4 mm (0.527 in). So it is partially open to the lower and upper body profile cutout areas (67, 69, 83, 85) which form the hollows of the guitar. The width of the backbone is about 120.3 mm (4.736 in) with a depth of about 22.6 mm (0.890 in), which has a cross-sectional area of about 27.2 square cm (4.21 square in). Adapting this body design to other types of pickups will require reducing the width of the backbone, and increasing its depth with an add-on support to maintain stiffness.

Figure 17:
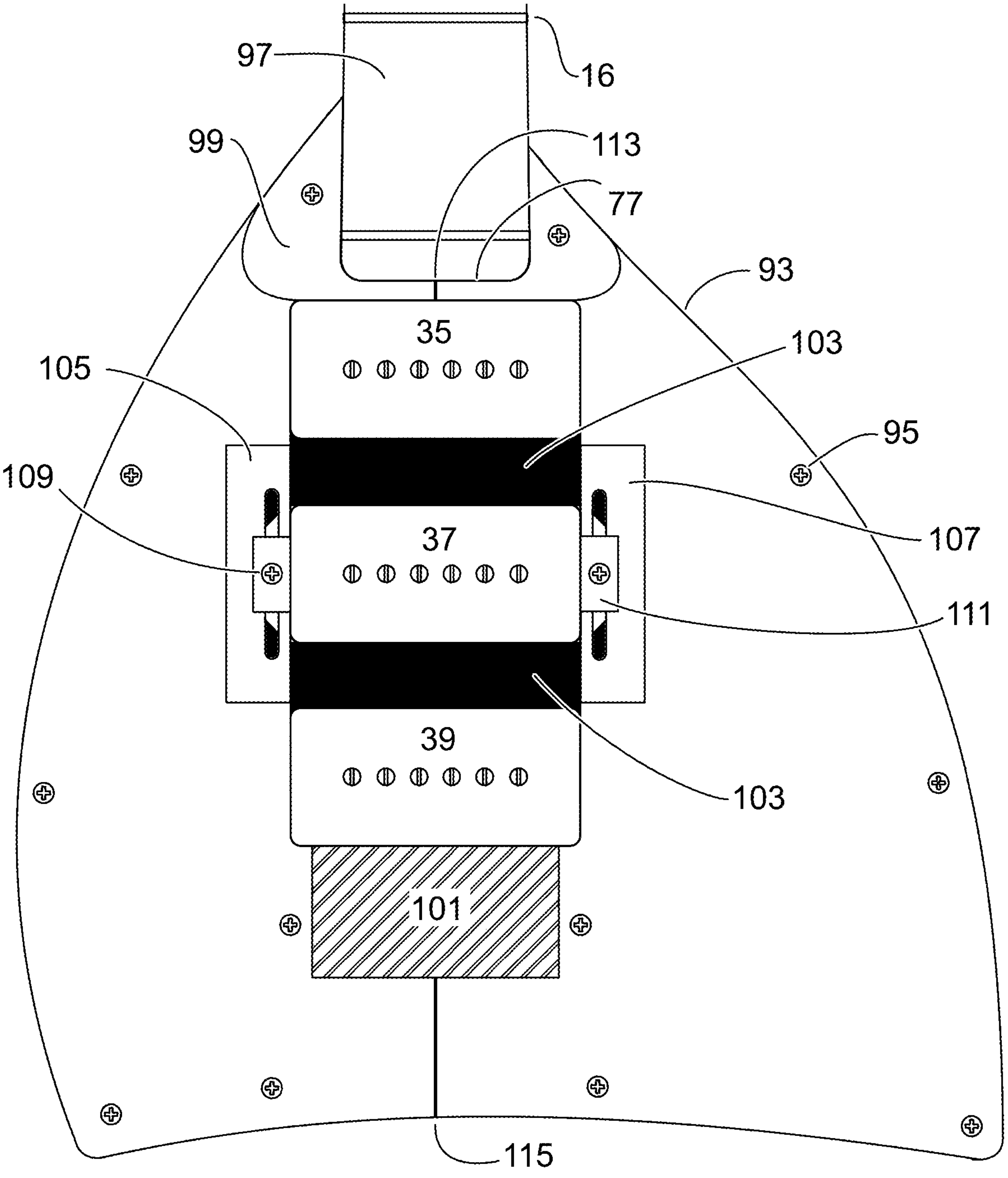

FIG. 17 shows the top plate (93), with 12 mounting screws (95) which secure it to the upper body profile. The top plate in this prototype was made of painted 3-ply, 3.5 mm birch plywood. The outline of the neck (97) is shown, with the positions of just frets 16 (16) and 21 (not indicated). The top has an added top link (99), another layer of 3.5 mm plywood, to strengthen it across the wall (77) in the upper body profile which forms the neck stop. The top plate wraps around pickups 35, 37 & 39, with a cutaway space (101) for the placement of the bridge (not shown). The bridge sits on a pad or shim (not shown) on top of the upper body profile, to help it raise the strings to the proper level. The black space (103) around the middle pickup (37) forms the effective sound hole, connecting to the hollows in the guitar body. The middle pickup mounts to slots (not numbered) in reinforced areas of the top plate on the left (105) and right (107) of the sound hole with 2 screws (109) and rectangular washers (111).

The reinforcements were made from thin aluminum angle, 0.75 by 0.048 inch, with one side of the angle cut to the thickness of the top plate, and fitted into a corresponding notch in the top plate, next to the middle pickup. The range of motion of the middle pickup is about 46.4 mm (1.83 in), from next to the bridge pickup to next to the neck pickup. With a slightly smaller bridge, and a slightly longer sound hole, four P-90s could fit between the neck and the bridge, to take advantage of more complicated pickup circuits in this set of intellectual property. It was later found that because the top plate surrounds the bridge, it cannot be removed without removing the strings. So cuts 113 and 115 were added to separate it into two parts, left and right (not numbered).

Figure 18:
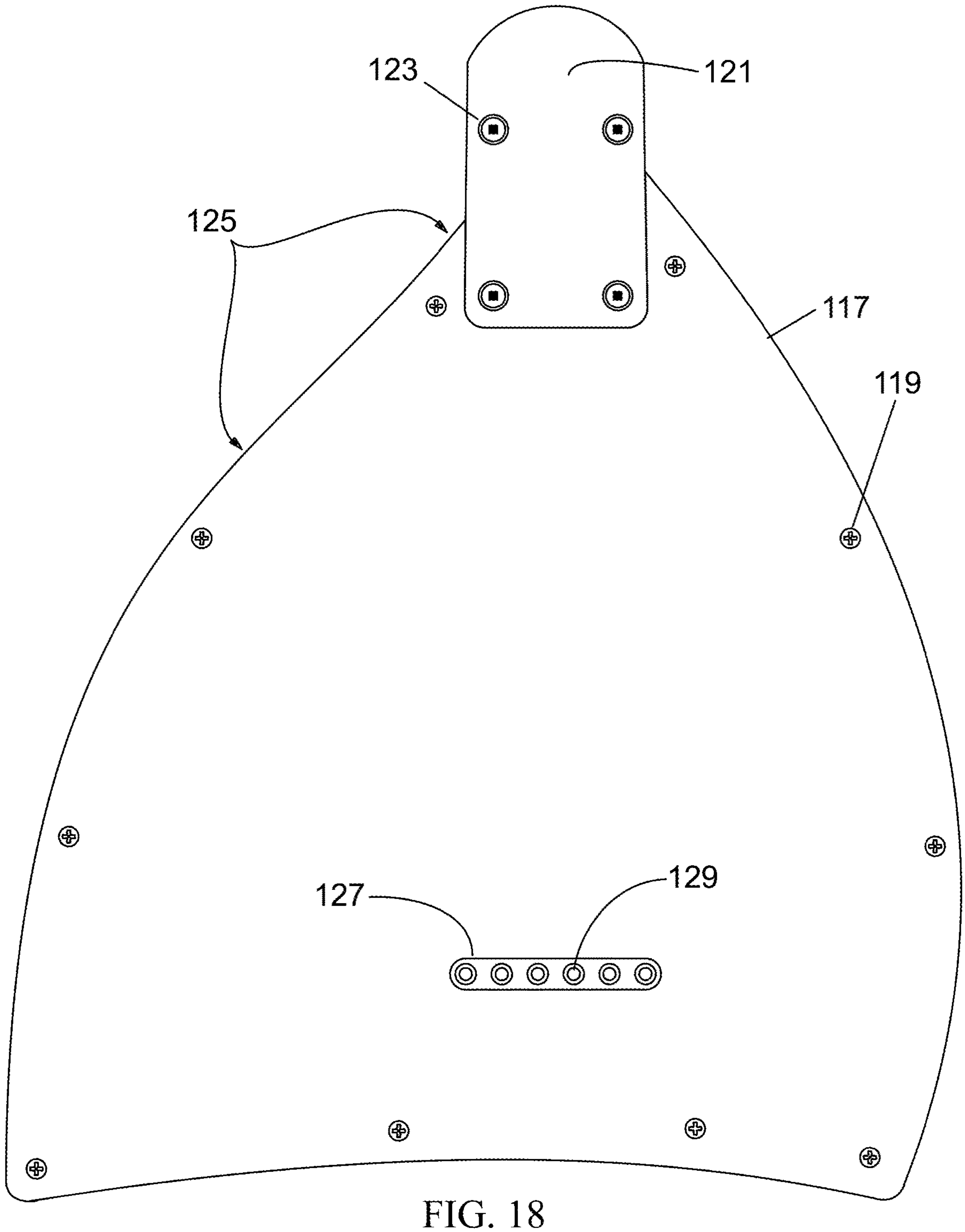

FIG. 18 shows the bottom plate (117), made of painted 3.5 mm birch 3-ply, mounted by 10 screws (119) to the bottom of the lower body profile (not numbered). Instead of the usual metal neck plate, this prototype has a ⅛-inch thick hardwood plate (121) connected by four #8 square-drive, washer-head wood screws (123) through the lower and upper body profiles (not shown) into the foot of the neck (not shown). The bottom plate screws are mounted in the same relative positions as the upper plate screws. The bottom plate has a long-oval cutout (127), giving access to the 6 string ferrules (129) mounted into the bottom of the lower body profile (not numbered). The strings feed through these ferrules to the bridge (not shown).

Note the slightly dished section of the outline (125). Because that dished area was harder to sand, it is straightened in the next design (FIG. 1). Also the bottom corners are given a larger radius. The bottom plate, lower and upper body profiles, and top plate all share the same outline in this prototype. This allows a master drilling and routing template to give the same shape and screw positions to all of them. Obviously, this is not the only way to make an instrument body to use this invention, or parts of it. Gluing two thick sheets of plywood together for the body and screwing to thin plates to the top and bottom of the body was just the easiest way for this inventor to test some ideas. More standard hollow-body and solid-body designs can be adapted to allow for using at least one of the pickup types used here, with at least one of the pickups movable along the strings.

Circuits for Single-Coil and Humbucking Pickups

No electronic controls are shown here in the instrument body drawings. This invention is intended as a practical test bed for both movable pickups and circuit designs introduced in and derived from U.S. Pat. No. 10,380,986 (Baker, 2019), U.S. Pat. No. 10,810,987 (Baker, 2020), U.S. Pat. No. 10,991,353 (Baker, 2021), U.S. Pat. No. 11,011,146 (Baker, 2021), U.S. Pat. No. 11,087,731 and U.S. Ser No. 17/363,901.

Figure 2B:
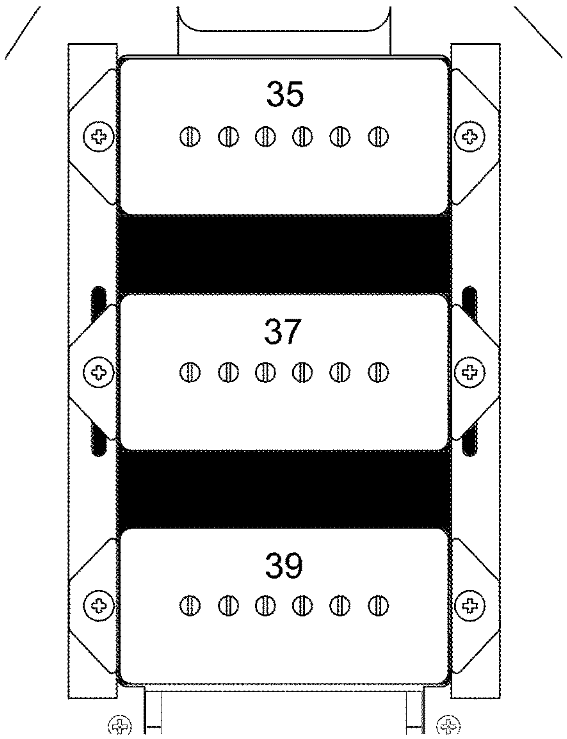
Figure 2C:
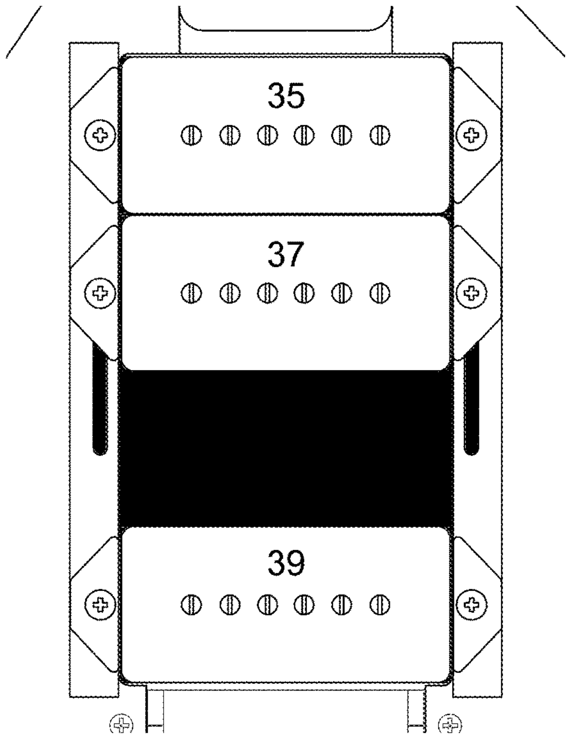

Table 4 shows a reasonable choice of switching order for three P-90 pickups from Tables 2 & 3, for the middle P-90 with a South pole up and in the center position (FIGS. 2B & 17). Since the neck and bridge P-90 pickups are North-up, the South-up middle pickup is taken to have a reversed string signal, –M. The "Switch Throw" is the switch position, A to F, of a 4P6T switch used as a 3P6T switch. "Common-Point To Output" shows the pickups connected between the common point and the output in terms of the pickup designators, N (neck), M (middle) and B (bridge). "Common-Point To Ground" shows the same for pickup connected between those two points. "HB Mean Freq" is the measured mean output frequency in Hertz (Hz) for the humbucking signal. "Non-HB Mean Freq" is the measured mean output frequency when the common point connection is grounded, shorting out that pickup (row three). Note that for HB mode, with the common point not grounded, the mean frequencies indicate a progression from bright to warm. Once that is set, the non-humbucking mode mean frequencies can only fall where they do. With mechanical switching, the order of tones for this kind of circuit can set for only one mode, humbucking or non-humbucking (hum). The only other choice for hum-mode tones has throws A, D and E with the HB signals (B−N), (−M−B) and (N+M), with output hum mean frequencies, 716 (B), 591 (M) and 573 (N) Hz, respectively.

TABLE 4

Humbucking Six-Throw Circuit Order for middle P-90 pickup in center position.

| Switch Throw | A | B | C | D | E | F |
|---|---|---|---|---|---|---|
| Common-Point To Output | N | (N − M)/2 | (B − M)/2 | B | −M | (N + B)/2 |
| Common-Point To Ground | −B | −B | −N | M | −N | M |
| HB Mean Freq | 862 | 677 | 645 | 589 | 519 | 509 |
| Non-HB Mean Freq | 573 | 875 | 1015 | 716 | 591 | 681 |

Figure 19:
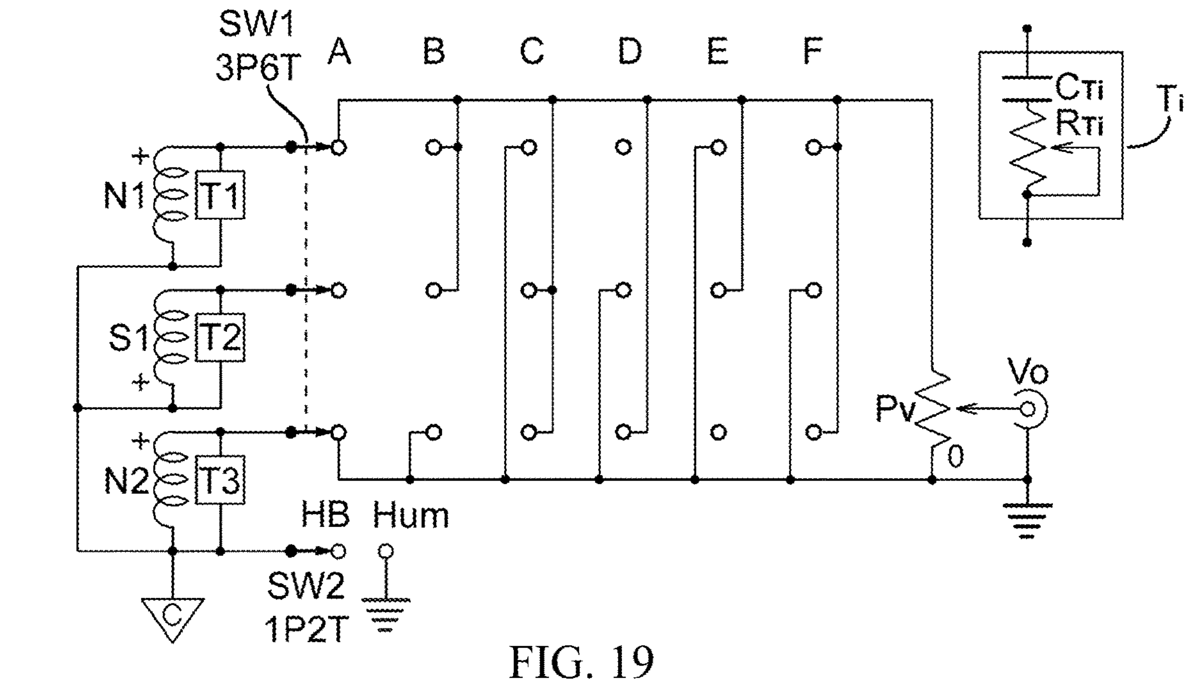
FIG. 19 shows a first circuit being considered for use with this invention and three P-90 pickups. It derives from FIGS. 7 & 10 in U.S. Pat. No. 10,380,986 and FIGS. 6, 8 & 12 in U.S. Pat. No. 10,810,987. It has humbucking (HB) and non-humbucking (Hum) modes set by a 1P2T switch, with which the pickup switch produces six circuits each, according to FIG. 5.

FIG. 19 shows a first circuit being considered for use with this invention and three P-90 pickups. It derives from FIGS. 7 & 10 in U.S. Pat. No. 10,380,986 and FIGS. 6, 8 & 12 in U.S. Pat. No. 10,810,987. The pickups are shown as N1 (neck, North-up), S1 (Middle, South-up) and N2 (bridge, North-up), connected by the same hum phase to a common-point connection (triangle-C), with plus signs showing the relative string signal phase. The boxes labeled T1, T2 & T3 are individual tone controls for each pickup, as detailed in the upper right-hand box (Ti). Switch SW1 is a 3P6T switch which makes the connections A-F in Table 4. Switch SW2 is a 1P2T mode switch, with humbucking (HB) and non-humbucking (Hum) modes, where the Hum mode shorts the common-point connection to the output ground. A volume pot (Pv) and an output jack (Vo) complete the circuit.

Figure 20:
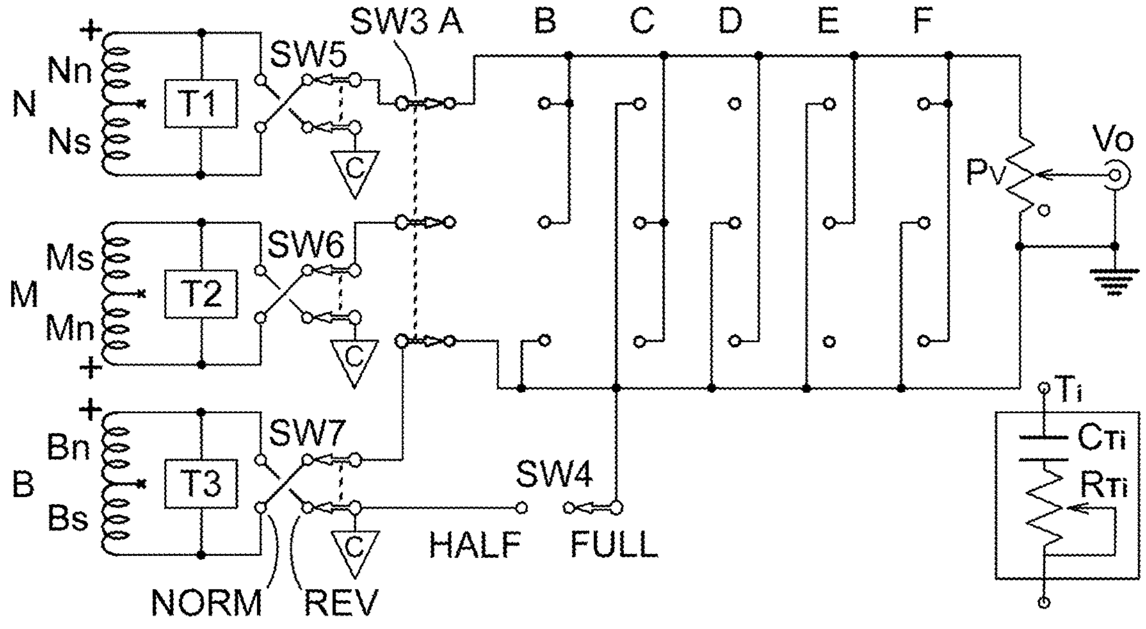
FIG. 20 shows a modification of FIG. 19, being considered for use with three humbucking pickups. It uses reversing switches on the humbuckers to simulate three matched single-coil pickups with reversible magnetic poles. From 96 switch combinations, it can produce 54 different pickup circuits.

FIG. 20 shows the first circuit being considered for three matched dual-coil humbucker pickups, derived from FIGS. 7 & 8 in U.S. Pat. No. 11,011,146, FIG. 19 here, and those previously mentioned for FIG. 19. The neck, middle and bridge pickups are designated N, M and B, respectively, with North-up coils Nn, Mn and Bn, and South up coils Ns, Ms and Bs. The plus signs (+) indicate the relative string signal polarity. Note that if it is reversed for the middle pickup (M), it will be consistent with FIG. 19, as the same connections are used in the 3P6T pickup switch, SW3, as in SW1 in FIG. 19. In the left-hand position, the mode switch, SW4, shorts to common-point connection (triangle-C) to the lower output of SW3 in the HALF mode, also shorting out the lower pickups being switched. In the right-hand position, FULL, the common-point connection is not shorted to the lower output, allowing the full pair or triple circuit to be used. Each pickup has an individual tone circuit, Ti, where i=1, 2 and 3, each using a capacitor, $C_T$i, and a pot, $R_T$i, as detailed in the box labeled Ti at the lower right-hand side. Each pickup also has a polarity reversing switch, SW5 to SW7. A volume pot, Pv, and an output jack, Vo, finish the circuit.

The switches SW5, SW6 and SW7 are meant to provide both alternative tones, and to simulate single-coil pickups with reversible magnets. In the left-hand position, NORM, switches SW5-7 connect the pickups to SW3 and the common-point connection consistent with the polarities of the pickups in FIG. 19. In the right-hand position, REV, switches SW5-7 reverse the polarity of the string signals. Consider throw position A for SW3. Depending on SW5 and SW7, the output can be N−B, N+B, −N+B or −N−B. Switch SW6 has no effect. As a practical matter, unless the instrument amplifier past Vo has a nonlinearity, such as tube distortion or a distorting pedal effect, there should be no audible difference between N−B and −N+B, or between N+B and −N−B. See "Unique Tonal Phase Combinations of J Things", Column 14, U.S. Pat. No. 10,217,450 (Baker, 2019). So the practical signal output for Throw A is N±B, one of two signals, not four outputs: ±N±B. For this way of thinking, if two reversing switches are in the circuit, only one has an appreciable effect. If three reversing switches are in the circuit, only two have an appreciable effect. Unless, of course, there follows a nonlinearity.

So the FULL mode output circuits can be written corresponding to Table 4 as: N±B, B±(N±M)/2, N±(B±M)/2, B±M, M±N and M±(N±B)2. The HALF mode output circuits can be written from Table 4 as: N, (N±M)/2, (B±M)/2, B, M and (N±B)/2. Note that N±B in the FULL mode with have effectively the same tone as (N±B)/2 in the HALF mode, differing only by signal amplitude. The FULL mode circuits have numbers of outputs amounting to: 2+4+4+2+2+4=18. The HALF mode circuits have numbers of outputs amounting to: 1+0+0+1+1+0=3, excluding effective duplicates. All together there can be up to 21 different tone circuits for a linear instrument amplifier, or up to 42 different tone circuits for a nonlinear instrument amplifier or effect. But for switches SW3 to SW7, there are a total of 6*2*2*2*2=96 different switch combinations for 21 tone circuits. The problem of duplicate tones, fewer tones than switch combinations, is common in mechanical pickup switching. Remember that not all of the switches SW5-7 function in all the circuits, so the number of switch combinations does not guarantee the number of tones. Remember also that in FIGS. 13 & 14, a number of outputs could be clearly seen to be either close together or overlapping, and that many of the tones tended to bunch at the warm end. This is as likely to be true for flipping switches as it is for moving pickups.

Figure 21:
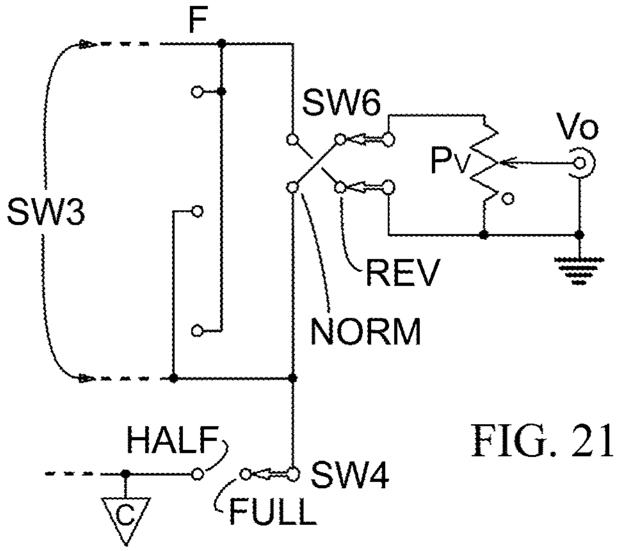
FIG. 21 shows how a phase-reversing switch can be added at the output of either FIG. 19 or FIG. 20, among other circuits presented here.

So if there are no nonlinearities past Vo in the entire circuit, there are $2^{J-1}$ number of unique phases for J number of reversible devices (Baker, U.S. Pat. No. 10,217,450). That means that one of SW5, SW6 or SW7 is optional. But if there is a nonlinearity in the downstream circuit, one reversing switch can be moved to between the output of SW3 and the volume pot, Pv, as shown in FIG. 21, with SW6. Note how the common-point connection (triangle-C) can only be grounded if mode switch SW4 is in the HALF position, and output reversing switch SW6 is in the NORM position. This ensures that SW4 will short out only the non-humbucking pickup circuits indicated in the third line of Table 4. This adaptation, which also appears as SW20 in FIG. 9 in U.S. Pat. No. 11,011,146 (Baker, 2021), can also be applied to FIG. 19.

Six Pickup Types

Six widely-varying styles of guitar pickup, three single-coil pickups and three dual-coil humbuckers, have been chosen to be adapted and used in the new instrument body. Two standard Strat-type pickups are also considered. Five from Allparts, Houston TX (Allparts_dot_com), are models: PU-0418-023 (P-90 single-coil); PU-0436-000 (Soapbar single-coil); PU-6193-050 (Jazzmaster single-coil); PU-6430-010 (Hofner style chrome humbucker); and PU-6459-010 (Vintage style chrome humbucker). One from Musiclily, Shen Zhen, Guang Dong, China (Musiclily_dot_com, Amazon_dot_com) is the model M533, dual hot rail, single-sized humbucker, made to fit a standard Strat-type pickup hole. The Hofner style humbucker is small with two mounting legs, and required making the backbone (91) thicker and narrower. The Jazzmaster is the largest, at 49.9 mm (1.967 in) wide by 92.6 mm (3.644 in) long, and required a much different mounting adapter from the others. All of the single-coil pickups required disassembly and modification to change the middle pickup from North-up to South-up. Here, we start with the smallest and work up, describing the mounting arrangements in the next sections.

Figure 22:
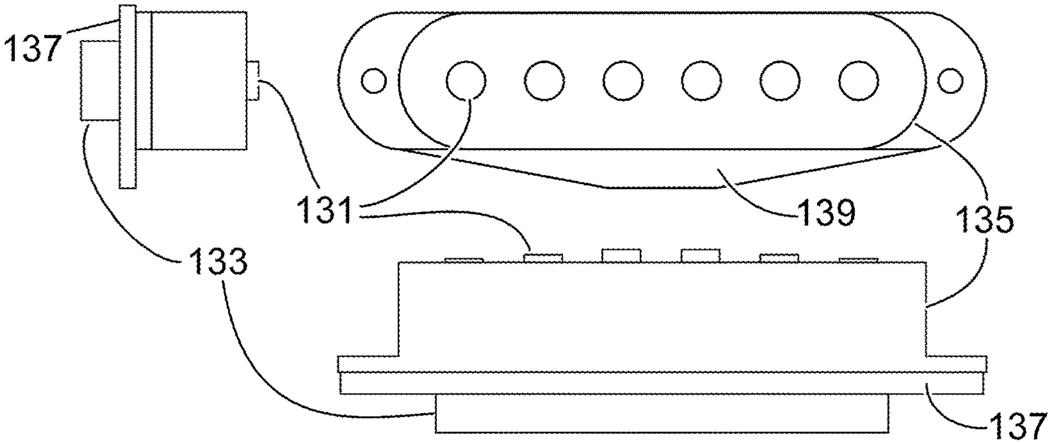
FIG. 22 PRIOR ART
FIGS. 22-28 show existing art, scale drawings of 7 different types of pickups.

For reference, FIG. 22 shows a representation of a single-coil Strat-type pickup. Although drawn to the same scale as the others, it is more representational than accurate in dimensions. It has six poles (131), extending through the top cover (135). If they are not magnets themselves, often Alnico, it has a magnet (133), often ceramic, glued to the lower coil form (137), in contact with them. Often, but not always, the lower coil form has a tab (139) with two rivets (not shown) to which the coil (not shown) is connected to the output wires by soldering. A lot of manufacturers make this kind of pickup, all of which may have slightly different dimensions.

Musiclily Model 533 Single-Sized Dual-Rail Humbucker

Figure 23:
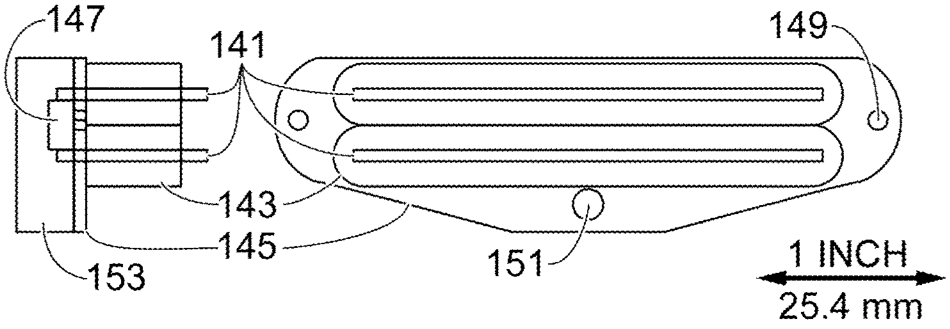
FIG. 23 PRIOR ART

FIG. 23 shows the Musiclily model 533 single-sized dual-rail humbucker, measured and drawn at scale from a pickup. It has two ferro-magnetic, plate-like rails (141) around which two coils (143) are wound. There is no cover. The rails pass through a printed circuit coil form (145) and contact with a magnet (147) between them. The coil form has mounting holes (149) at each end, and an electric lead hole (151). The box, 153, is virtual, merely showing the clearance needed for the pick output cable. The connections between the lead wires and coils are not shown. The tops of the rails have a radius (not shown) that approximates the fret radius, but are otherwise rectangular. This pickup does not require modification to work with the circuits in FIG. 20, having a 4-wire with shield output. It is already wired with the coils in series, with the black wire for the low output, and the red wire for the high output.

Allparts PU-6430 Hofner-Style Humbucker

Figure 24:
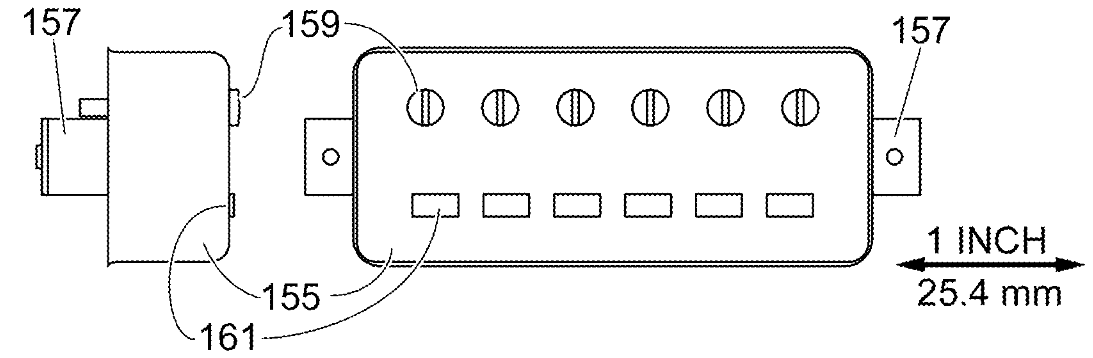
FIG. 24 PRIOR ART

FIG. 24 shows the Allparts model PU-6430 Hofner-style humbucking pickup. It has a chromed metal cover (155) soldered to a brass baseplate, of which only the mounting feet (157) are shown. It has screw-adjustable North poles (159) and flat, fixed South poles (161). The pickup connection cable (not shown) comes out of the bottom at one end and has a single shielded lead, with the shield connected to the metal cover and base. To use this with FIG. 20, the solder between the base and cover has to be cut away, and the coils re-wired with 2-conductor shielded cable, with the conductors connecting the coils in series and the shield connected to the metal housing. Then, after feeding the cable through the hole in the base, the cover has to be re-soldered to the base. This is possible, having been done on a previous prototype (not shown). The narrow distance between the mounting holes in the feet (157) required the backbone (91) in FIG. 16 to be redesigned.

Allparts PU-6459 Vintage Humbucker

Figure 25:
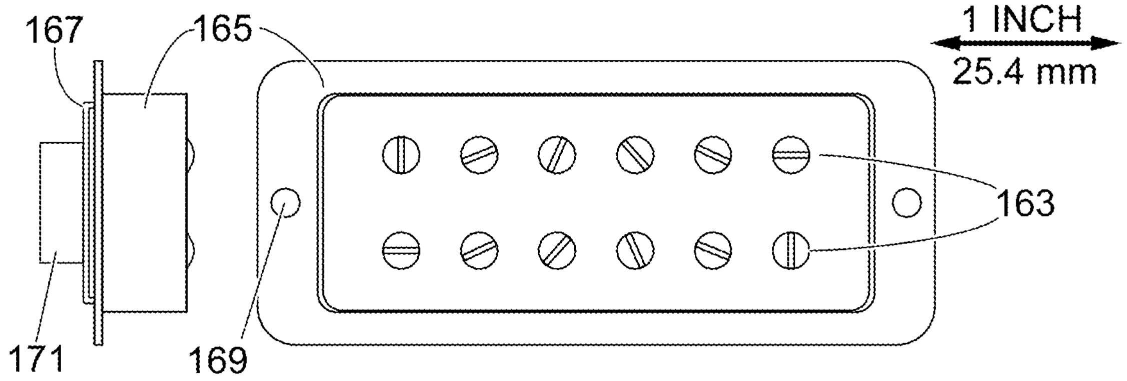
FIG. 25 PRIOR ART

FIG. 25 shows the Allparts model PU-6459 Vintage style humbucking pickup. It has two rows of screw poles (163) in a metal top cover (165), soldered to a brass base (167), with mounting holes in a top-hat-like flange (169). The box 171 shows the bounding space for the screws. Like the Musiclily 533, this model comes with a four-wire shielded output cable, with the green and white center-tap wires soldered together to put the coils (not shown) in series. But to work with FIG. 20, the black low wire may need to be unsoldered from the shield.

Allparts PU-0436 Soapbar Single-Coil Pickup

Figure 26:
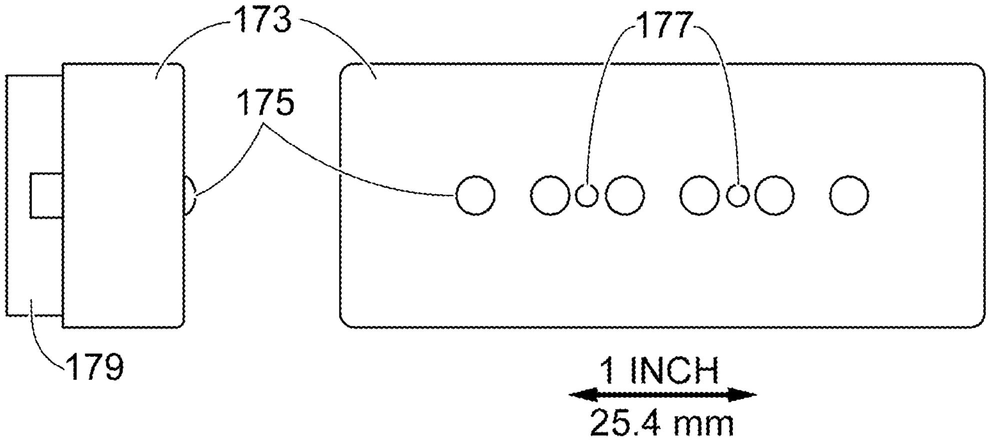
FIG. 26 PRIOR ART

FIG. 26 shows the Allparts model PU-0436 Soapbar pickup. It has a plastic cover (173) mounted to a brass base (not shown) by screws on the bottom (not shown). It has six screw poles (175), around which a single coil (not shown) is wound, with two small mounting holes (177) in between two pairs of poles. The base has two foam blocks (not shown), about 5/16 inch by ½ inch in cross-section mount to the bottom of the base with adhesive. The included mounting screws (not shown) are long and skinny, intended to fit through the holes (177) on the top, all the way through the pickup and past the foam blocks, to screw into the guitar body. They will not be used here.

This pickup has two plate-like magnets on the upper side of the brass base, with the same North poles in contact with the screw poles. The South poles of the magnets point horizontally out the sides of the pickup, producing a North-up pickup with a broad magnetic field, compared to Strat-type single-coil pickups. To produce a South-up pickup for use in the circuit in FIG. 19, the pickup must be disassembled and the magnets flipped to put their South poles against the screw poles. The pickup has a two-wire shielded cable, with red and white wires, with the shield soldered to the brass base. Presumably the white wire is the intended low end of the coil. For this pickup, a special carrier must be fabricated to work with this invention, as described below.

Allparts PU-0418 P-90 Single-Coil Pickup

Figure 27:
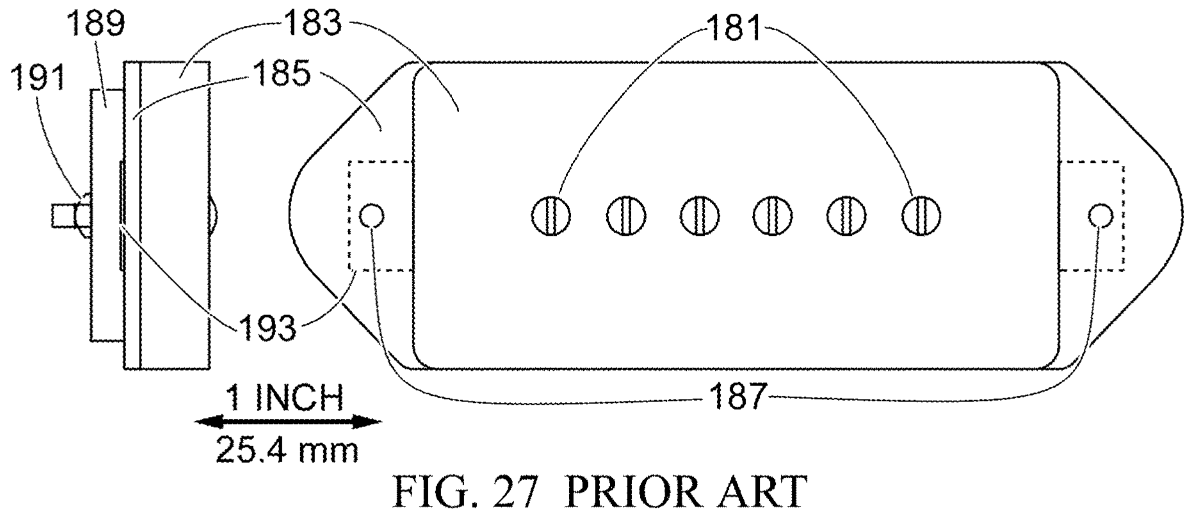
FIG. 27 PRIOR ART

FIG. 27 shows the Allparts model PU-0418 P-90 pickup. It has six screw poles (181) and a plastic cover (183) with integral mounting tabs (185) and holes (187). The coil form (not shown) screws to a brass bottom plate (189) with two bottom screws (191). The bottom plate also has mounting tabs (193) fitting into rectangular depressions in the bottoms of the cover mounting tabs, with mounting holes (187) almost in the same places as those in the cover tabs. Like the Soapbar pickups, the P-90 has two plate-like magnets (not shown) with the North edges touching the screw poles, and the South poles pointing out the sides of the pickup. To get a South-up pickup, the P-90 has to be disassembled and the magnets flipped. This is not difficult. The P-90 has a two-wire shielded output cable, with red and white wires, the shield being soldered to the brass base.

Allparts PU-6193 Jazzmaster-Style Single-Coil Pickup

Figure 28:
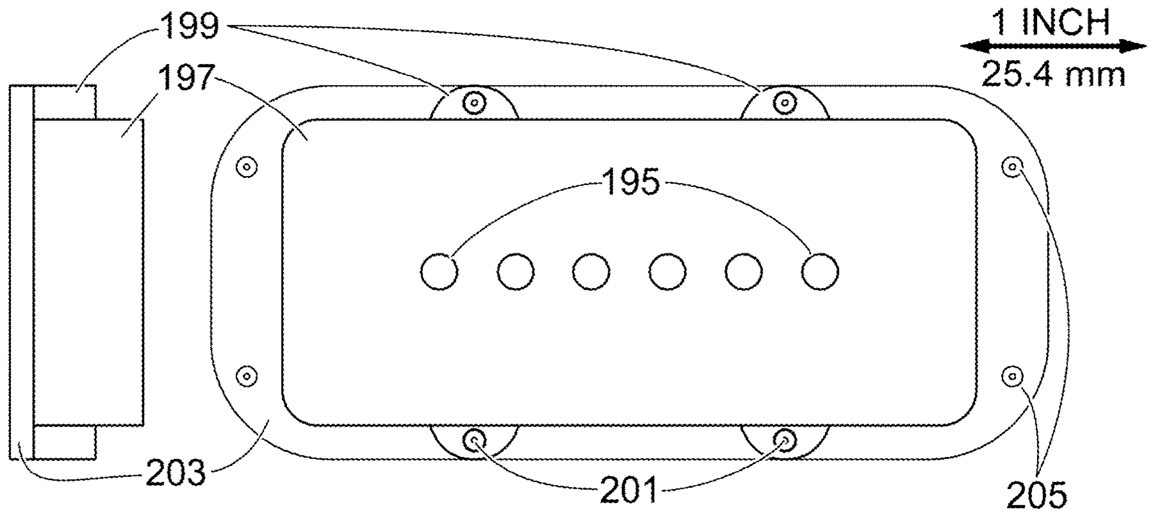
FIG. 28 PRIOR ART

FIG. 28 shows the Allparts model PU-6193 Jazzmaster-style pickup. It has six non-adjustable magnetic poles (195) permanently fixed in a coil form (not shown), the coil form glued into a plastic cover (197), with four mounting tabs (199) having mounting holes (201). This drawing also shows an added alternative mounting embodiment, a mounting plate (203) with four mounting holes (205), to which the pickup is screwed through its own mounting tabs. The pickup comes North-up, with black and white single-wire output leads, soldered to rivets in the bottom of the coil form. The coil form is glued into the cover by two lines of glue along the long edges. This pickup was designed to be mounted directly to the guitar body with the mounting tabs, with no further adjustment for height under the strings.

To make the pickup South-up, the glue lines must be cut away and the coil form removed, leaving only the cover. The pickup leads are unsoldered from the rivets, and the corners of the coil form across the rivets (on the N-up side of the coil) snipped off. Then the wire leads are soldered back into the opposite rivets, the coil form flipped over and put back in the cover, with the wire leads brought out past the snipped-off corners. The removed glue can be replaced with either epoxy or hot-melt glue. The black and white leads must look like they come from the same sides of the pickup as before, but through the holes formed by the snipped-off corners. The coil form and poles are symmetrical and the poles will look the same in the top of the cover.

Redesigning the Body from the First Prototype

The Allparts Hofner-style pickup (FIG. 24) required a redesign from the first prototype, FIGS. 15-17, of the guitar body backbone (FIG. 16, 91) due to the short 2.5-inch distance between its mounting legs. Also, the previous design did not allow access to the pickup mounting from the back, which is much more convenient, especially in the cases of the pickups disclosed in U.S. Ser. No. 15/917,389. This redesign is partially shown in FIG. 1. After this, the other pickups can be easily accommodated.

The original backbone was about 4.82 inches wide by 0.93 inch thick, for a cross-sectional area of about 4.48 $in^2$ of thin-ply birch plywood. This obstructed the mounting arrangements of even the P-90 pickups from the back. The PU-6430 Hofner style pickup mounting legs extend down 1.25 in below the top of the pickup cover, compared to 0.825 in for the Soapbar pickup and 0.835 in for the P-90 pole screws in their lowest position. To simplify the routing of the guitar body, the redesigned body (FIG. 1) is to be made of a nominal 0.71 in (18 mm) thick lower body profile, with a nominal 0.5 in (12 to 13 mm) thick upper body profile, for an un-reinforced backbone cross-section of 1.78 $in^2$, less than half of the previous prototype. Therefore, to be approximately equal in strength, the new backbone needs to be reinforced with about 1 inch of birch plywood, or a lesser thickness of a stronger hardwood, like oak.

Consider the reinforcement strips (27, 29) and mounting slots (31,33) in the respective top plates (21, 23), FIG. 1. In most cases, pickup mounting arrangements are designed to be used by direct mounting to the guitar body, or in pick guards with a single pair of round mounting holes for each pickup. In those cases, it is reasonable for the pickup mounting holes to be close to pickup bodies. But to use mounting slots, instead of holes, this leaves a very small strip of material between the slot and the pickup body. In U.S. Pat. No. 9,401,134 (Baker, 2016, FIGS. 1-5)), the mounting system avoids this difficulty by using extended mounting plates on each pickup mounting hole, with the plates mounted either directly to the body or to sliding tabs in aluminum slots. This system can be used here as an alternative embodiment, but a simpler system is possible.

The prototypes use relatively inexpensive 3-ply, 3.5 mm birch plywood for the top plates, which is simply too soft and weak to take the strain of mounting pickups in slots to it directly, without reinforcement. In FIG. 1, the strips left between the mounting slots and the P-90 pickups can be easily broken by hand, if not reinforced. The first prototype uses reinforcement made of 0.048" thick aluminum angle, obtained from Home Depot, with 0.75" sides, one side cut to about 3.5 mm inside so that it covers the side of the top plate nearest the pickups, with the remaining 0.75" side glued to the top of the top plate.

Figure 29:
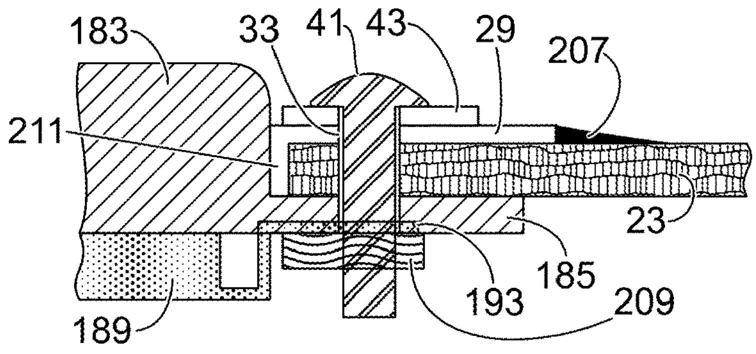
FIG. 29 shows how a P-90 was mounted on one side to the original prototype, with a threaded brass plate soldered to the bottom of the mounting tab. An thin aluminum angle was glued to the top of the top plate to reinforce it, because of the small amount of top plate material between the mounting slot and the pickup.

FIG. 29 shows a detail of the right-side P-90 pickup mounting in FIG. 17, which also applies to FIGS. 1 & 2. The right-hand side slot (33) in top plate (23) is reinforced with aluminum angle (29), glued to the top plate. A fillet (207) fairs the slot reinforcement to the top plate. The short side (211) of the aluminum angle reinforcement strip covers the inside edge of the top plate. A non-magnetic 6-32 stainless steel screw (41 in FIG. 1, 109 in FIG. 17) passes through a aluminum washer (43 in FIG. 1; 111 in FIG. 17), of the same material as the reinforcement strip, and slot 33. It threads into the mounting tab (193) portion of the P-90 brass base (189) and into a ⅛-inch brass plate (209) glued or soldered to the bottom of the pickup mounting tab. The pickup base mounting tab sits in a depression of the pickup cover (183) mounting tab (185).

Figure 30:
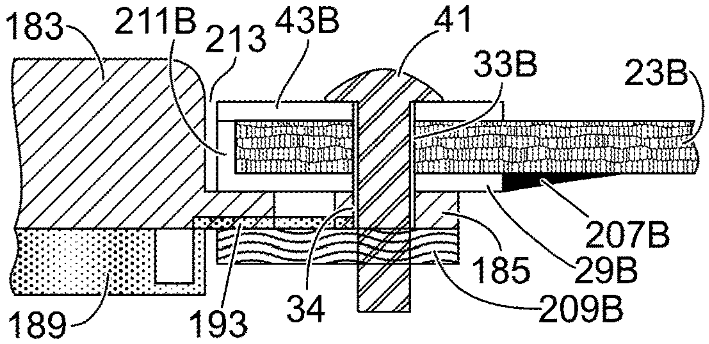
FIG. 30 shows in improved mounting design for the P-90, with an extended mounting plate under the mounting tab, allowing more material in the top plate between the mounting slot and the pickup. Here the reinforcement is glued to the bottom of the top plate, with a correspondingly wide top washer to spread the mounting screw force over a wider area of the top plate.

FIG. 30 shows a preferred alternative embodiment, with the reinforcement strip (29B), glue and fillet (207B) on the bottom of the top plate (23B). Note the added 0.015 inch gap (213) between the vertical leg (211B) of the reinforcement strip and the pickup body (183). This makes moving the pickup much easier, when it doesn't rub the sides. The new mounting slot (33B) sets just off the end of the pickup base mounting tab (193), and the mounting screw (41) passes through it into a new mounting hole (34) in the pickup body mounting tab (185) to into a threaded hole in the alternative extension mounting plate (209B). The mounting slot could be centered more in the reinforcement strip (211B), but that would require notching the end of the pickup base mounting tab (193) to pass the screw. Here, the mounting washer (43B) is about the same width as the reinforcement strip, and sits on the upper end of the vertical leg (211B) of the reinforcement strip, to take some of the pressure from the mounting screw off the top plate.

This is just one embodiment of the top plate slot reinforcement strip about the mounting slots. One preferable embodiment could be an epoxy-pre-impregnated carbon fiber tape wrapped in a U-shape about the top plate edge, then bonded to it and slotted. Or brass or non-magnetic stainless steel shim stock could be wrapped and bonded to the top plate for reinforcement. Or a U-shaped layer of Micarta could be made in place. Or the area about the slot could be made of an entirely different and stronger material than the top plate, being grafted to the top plate. Or a material could be used for the top plate which is strong enough in itself not to need any reinforcement, such as carbon-fiber composite plate. The solution presented here is simply cheap & easy. The only necessary requirement is that the small cross-section of the top plate between the mounting slot and the pickup be strong enough not to break for the lifetime of the instrument.

This approach will be taken with other pickups. For the standard single-coil pickup (FIG. 22), the dual-rail humbucker (FIG. 23), the Hofner humbucker (FIG. 24) and the Vintage humbucker (FIG. 25), a mounting extension plate like 209 & 209*b* in FIGS. 29 & 30 can be used. If measurements dictate that the pickup must have a spacer between the bottom of the top plates and its mounting tabs, then that too will be used. Neither the Soapbar pickup (FIG. 26) nor the Jazzmaster pickup (FIG. 28) have that kind of mounting tab. For them, either an added mounting plate (FIG. 28, 203) can be used, or they can be mounted either directly to the backbone or to a spacer block screwed to the backbone. In the case of the Jazzmaster pickup, its body (197) and mounting tabs (199) take up so much space between the neck and bridge that the movement of any one pickup is limited to just ⅜ inch. This is so small compared to the overall width and magnetic field of the pickup that a fixed mounting may be a practical solution. In some cases, spring mounting will be used, with special considerations.

It turns out not to be easy to rout mounting slots in even thin aluminum with a straight bit in a hand-held wood router, even with guides. And gluing the aluminum to the top of the top plate is a bit unsightly, so a tougher material for the top plate, like resin-infused wood or synthetic laminate, at least in the pickup mounting area, would look better. The 3.5 mm birch ply is not entirely suitable for top plates or pick guards; it is so soft that it crushes under standard mounting screws (FIG. 1, 25; FIG. 17, 95). After a screw hole counter-sink bevel is cut, it's a good ideal to let some superglue soak into the wood and set before installing screws.

The first prototype, FIGS. 15-18, had single-piece plates for both the top and bottom (93, 117). The top plate (93) had to be split into two pieces at cuts 113 and 115 so that the pickups and top plate parts could be removed without removing the strings. That makes the reinforcing top link (99) redundant. However the neck bottom wall (FIG. 1, 22; FIG. 17, 77) still exists and can require a filler piece between the neck, the left top plate (21) and the right top plate (23), to the level of the top plates. Using two separate top plates allows the bridge mounting plate (FIG. 17, 101) to be extended all the way to the outer margin of the body (FIG. 1, 10). This allows the parts of the bridge mounting plate not under the bridge to function as decoration, such as a piece of exotic hardwood or carved wood. The bridge mounting plate otherwise functions to adjust the height of the strings.

The proposed backbone reinforcement can be attached to the bottom of the backbone (FIG. 1, 7) extending from the neck mounting plate (FIG. 18, 121) to the string ferrules (FIG. 18, 127). If a top-mounting bridge is used without ferrules, it can extend all the way to the bottom of the body. The backbone reinforcement will split to bottom plate (FIG. 18, 117) into two pieces, unless the reinforcement is incorporated into the bottom plate, possibly with longer and heavier mounting screws going through it into the lower body profile backbone. If the back plate is split into two pieces, the backbone reinforcement will have to be narrower than 2.5 inches, to allow for mounting strips and screws for the back plates on the back of the backbone. The backbone reinforcement can also offer opportunities for decoration, including carving and exotic hardwoods. If made of metal or hardwood, it can also incorporate the neck mounting plate.

Mounting the Six Pickup Types, Plus Standard Single-Coil Pickups

Here follows the descriptions of the differences in mounting the chosen six different pickup types in the invention, plus a common standard type, as shown in FIGS. 31-47. Table 5 shows the approximate lengths of these pickups in the second column, plus the common single-coil pickup, where the body parts are most likely to touch the top plates when mounted in place. Columns 3 & 4 show the approximate body width of each pickup and the number that can fit in the sound hole in FIG. 1, in approximately 6.45 inches between the neck and bridge. The descriptions begin with the Allparts Hofner-style humbucking pickup, because its dimensions required the most modification to the original prototype design. Table 5 shows that the Musiclily Model 533 humbucker, Allparts Hofner style and common single-coil pickups are close enough in length (within 0.1") to use the same top plates, if sized for the single-coil pickup, thus lowering the number of guitar parts in one's inventory. The Allparts Soapbar and P-90 pickups are also very similar in length, and could use the same top plates. But the Allparts Vintage humbucker and Jazzmaster are too different for all the others, and may require separate top plate parts in a manufacturer's inventory. And the Jazzmaster has other issues to be described later.

TABLE 5

Approximate sizes for seven pickups in inches, ordered by length

| Pickup Type | Approx. Body Length (inches) | Approx. Body Width (inches) | Number Between Neck & Bridge (~6.45 inches) |
|---|---|---|---|
| Musiclily 533 humbucker | 2.66 | 0.91 | 7 |
| Allparts Hofner mini humbucker | 2.71 | 1.14 | 5 |
| Common Single-coil | 2.76 | 0.95 | 6 |
| Allparts Vintage humbucker | 2.89 | 1.48 | 4 |
| Allparts Soapbar | 3.36 | 1.38 | 4 |
| Allparts P-90 | 3.39 | 1.61 | 4 |
| Allparts Jazzmaster | 3.64 | 1.96 | 3 |
| Jazzmaster on mounting plate | 3.64 | 2.10 | 3 |

Allparts PU-6430 Hofner-Style Humbucker

Figure 31:
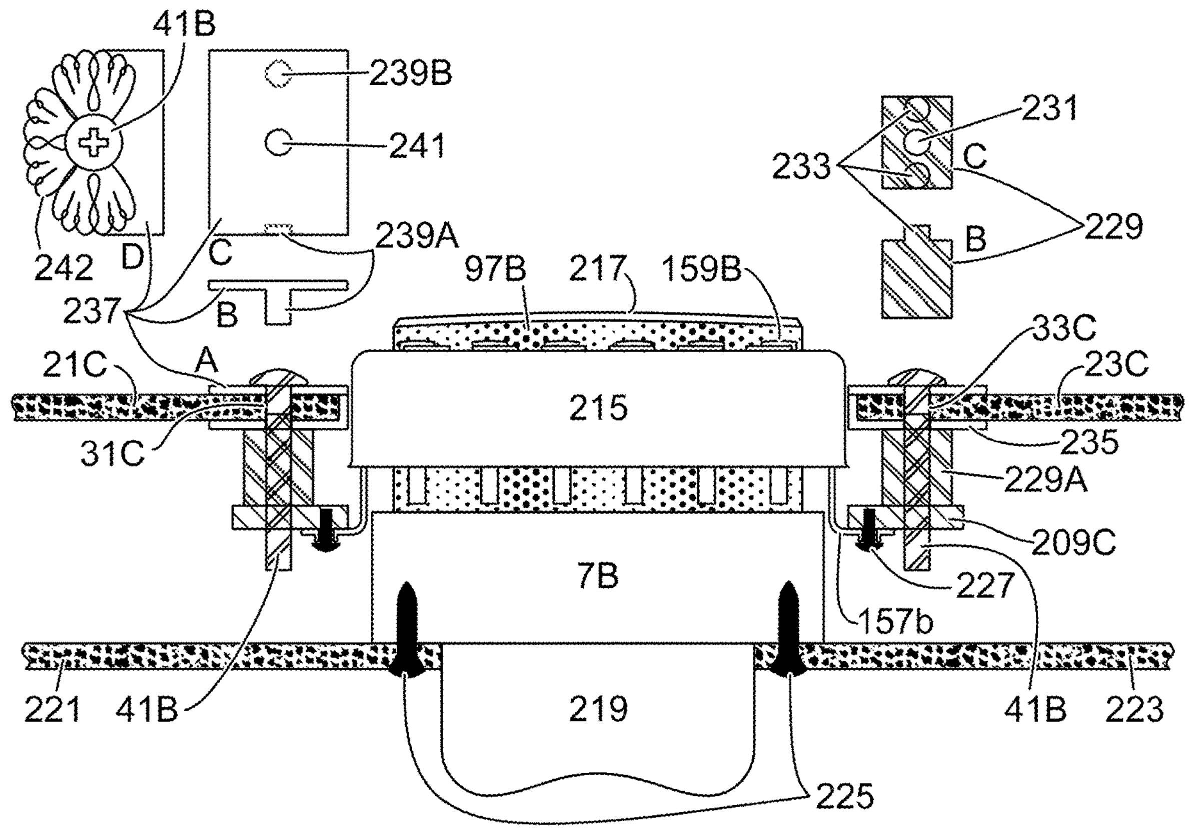
FIG. 31 shows a much more detailed mounting of a Hofner-style pickup under the top plates, as viewed from the bridge to the neck, and over a lower body profile backbone, which has been reduced in width to accommodate the mounting legs of the pickup. The upper body profile is not shown, but in this embodiment is made of 12 mm Birch plywood to lighten the guitar and make it thinner. This may require an optional backbone reinforcement bar (219). This drawing to scale, helps to place all the components vertically about the pickup, with the tops of the poles about ⅛ inch below the top of the neck 21-fret. It proves that everything actually fits in the design.

FIG. 31 shows how the Allparts model PU-6430 Hofner-style humbucking pickup is mounted in the invention, in a pseudo-cross-section view from the bridge (not shown) to the toe of the neck (97B). From the bottom up, the backbone reinforcement is preferably glued and screwed (not shown) to the lower body profile backbone (7B). Here, the backbone has been narrowed from 2.5 inches to about 2.44 inches to clear the mounting legs (157B) of the Hofner-style pickup (215), shown here in a side view. The backbone reinforcement (219) is about 0.75 inch narrower than the backbone, to allow the left bottom plate (221) and the right bottom plate (223) to be mounted to the backbone with ordinary #4½" stainless steel pick guard screws (225). Guitar bodies can be made of woods as soft and weak as Bass wood. So the backbone reinforcement should be made of something much stronger and harder, than Bass wood, even extruded aluminum. Preferably, the backbone reinforcement is glued and screwed (not shown) to the backbone.

FIG. 31 shows the pickup placed vertically so that the 1-string screw pole (159B) and 6-string screw pole (not called out), placed in their lowest screw positions, sit about ⅛ inch below the top of the neck frets (217) at that horizontal position. This shows the bottom of the screw poles (white rectangles below the pickup, but not called out) just clearing the backbone. Pickup mounting extension plates (209C) are secured to the tops of the pickup mounting feet (157B) by ordinary means, including solder (if both are metal), glue and/or screws (227). Pickup mounting screws (41B), preferably of a non-magnetic material, such as brass or stainless steel or glass-reinforced nylon, sized here as 6-32×1", pass through top plate washers (237A,B,C,D), through the left (31C) and right (33C) mounting slots in the left (21C) and right (23C) top plates, the left and right top plate reinforcement strips (235), and mounting spacers (229A,B,C) to screw into the mounting extension plates.

FIG. 31 shows the in-place view (229A) the separated bridge side view (229B) and the top view (229C) of the pickup mounting spacers (229). The spacer has a center hole (231) to pass the pickup mounting screw, and one or more pegs offset from it to engage the mounting slot (31C, 33C) in the top plate reinforcement strip (235). The height of the spacer sets the base height of the pickup. It should be made of rigid, non-magnetic material, and soft enough to be adjustable by sanding its bottom. Ordinary pickup mounting springs can be used, but this is preferable, because the mounting is more rigid and cuts down on pickup movement with respect to the strings. Notice that using a mounting extension plate (209C) allows this material to be much wider than if the mounting holes on the pickups are used.

FIG. 31 also shows several views of the top plate mounting washer (237): in-place (237A), raised and separate (237B), top view (237C) and decorated (237D). The washer should be rigid, plate-like and non-magnetic. It has one or more of either a bent tab (239A) or a peg (239B) which goes all the way through the mounting slot (31C, 33C) to engage the reinforcement strip (235), should that strip exist. It has a mounting hole (241) to pass the pickup mounting screw (41B). The tab or peg that engages the mounting slot keeps the washer oriented parallel to the side of the pickup, which is both visually and functionally useful. The washer need not be the simple rectangle shown in 237C. It can be shaped and decorated in any manner (242), as shown in 237D, which does not damage its physical integrity, to enhance the visual impact of the stringed instrument.

Figure 32:
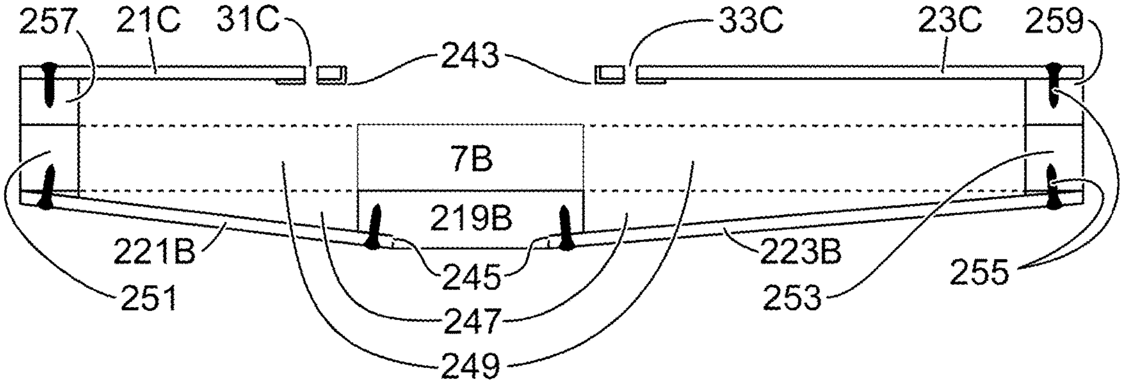
FIG. 32 shows a modified design for the backbone reinforcement and the bottom plates to make the guitar more comfortable to hold against one's body, and to allow more hollow space inside.

FIG. 32, at half-scale from FIG. 31, shows the pseudo-cross-section of a different, more preferred embodiment of the backbone reinforcement (219B). This one is the same width as the lower-body backbone (7B), and has two notches (245) into which the inside edges of the lower right (221B) and left (223B) bottom plates fit to be attached with ordinary #4½" pick guard screws (255). The outside edges of the bottom plates are supported by wedge-shaped extensions (247) of the lower body profile, between the plates and the lower dotted lines (not marked), which are lower extensions of the lower body profile left (251) and right (253) ribs. The lower body profile (249) fills the space between the dotted lines. The outside edges of the left (21C) and right (23C) top plates are attached, as before, to the upper body profile left (257) and right (259) ribs. The upper body profile is not shown, but extends vertically between the upper dotted line (not marked) and the top plates. The left (31C) and right (33C) pickup mounting slots in the top plates are also shown, along with the mounting slot reinforcement strips (243).

This preferred embodiment is more difficult to build, but the semi-arched back (221B, 219B & 223B) should be more comfortable on the instrument player's body, and provide more internal space for resonance and/or electronics. It also allows the backbone reinforcement to be wider and thinner. More usual hollow-body construction techniques can be used, even having the bottom plates as on curved and solid piece. But it is necessary to have the top with an oblong mounting hole and mounting slots for the pickups. On the other hand, this design allows the instrument/invention to be made by any reasonably competent woodworker in a home shop.

Figure 33:
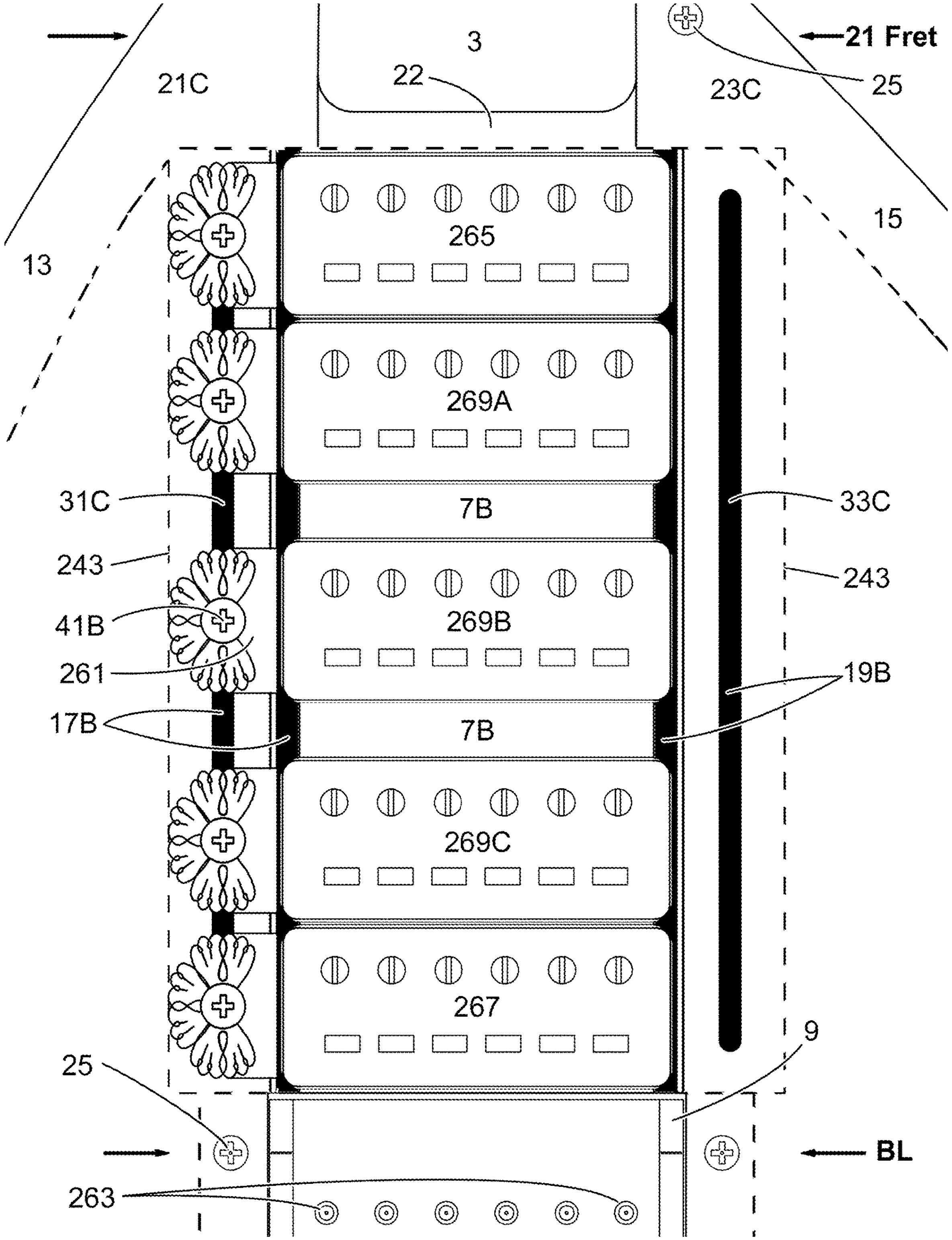
FIG. 33 shows either how 5 Hofner-style humbuckers can fit between the neck and bridge, or how two humbuckers can each be placed at the neck and bridge, with the third movable between them. It also shows decoration on the top pickup mounting washer.

FIG. 33 shows a full-scale portion of the top view of the invention using features from FIGS. 1, 31 & 32. Because of the lack of space, a number of the numerical indicators (3, 7B, 9, 13, 15, 21C, 23C) rest on top of the parts they designate. Arrows at the positions of two lines (21 Fret, BL) show the approximate locations of the 21$^{st}$ fret for the neck used here and the approximate bridge line (BL), about which the bridge saddles group. The Figure extends from part of the neck socket (3) at the top to a portion of the bridge (9) at the bottom. It shows three mounting screws (25), the left top plate (21C), the right top plate (23C), the filler (22) between them on the neck toe wall (not numbered), parts of the left rib (13) and the right rib (15) indicated by a dotted line, the modified lower body profile backbone (7B) showing below the pickups (265-269C), the left top plate mounting slot (31C), the right top plate mounting slot (33C), the underside left and right top plate reinforcement areas (243) indicated by dotted lines, and the string holes (261) in the bottom of the bridge (9). The neck, strings and the bridge saddles are not shown. Note at the top left of the drawing how the rib (15) and the reinforcement strip (243) overlap slightly. One of them would have to be relieved with a notch or depression (not shown). Note that the reinforcement strip may not be needed if the top plate material is sufficiently strong.

Some example decorated pickup mounting washers (261) are shown with the mounting screws (41B) on the left sides of the pickups, but not on the right, so that the full extent of the mounting slots (31C, 33C) can be seen. The other mounting parts are not shown. The mounting slots look longer than necessary for these pickups, so that the Musiclily 533 dual-rail humbucking pickups can be used in the same top plates. Parts of the left cavity (17B) and right cavity (19B), between the ribs (13, 15) and backbone (7B) show through as black areas in the mounting slots and between the pickups. The Hofner-style pickups are shown with a neck pickup (265), a bridge pickup (267) and a middle pickup (269) in a range of positions between them (269A-C). Or they could be up to five pickups, all of which can be moved and remounted. These pickups are all shown with the North screw poles towards the neck and the flat South poles toward the bridge. Any one of the pickups can be reversed from that, allowing different interactions between the screw poles and the strings, and between the pickups.

Musiclily Model 533 Single-Sized Dual-Rail Humbucker

Figure 34:
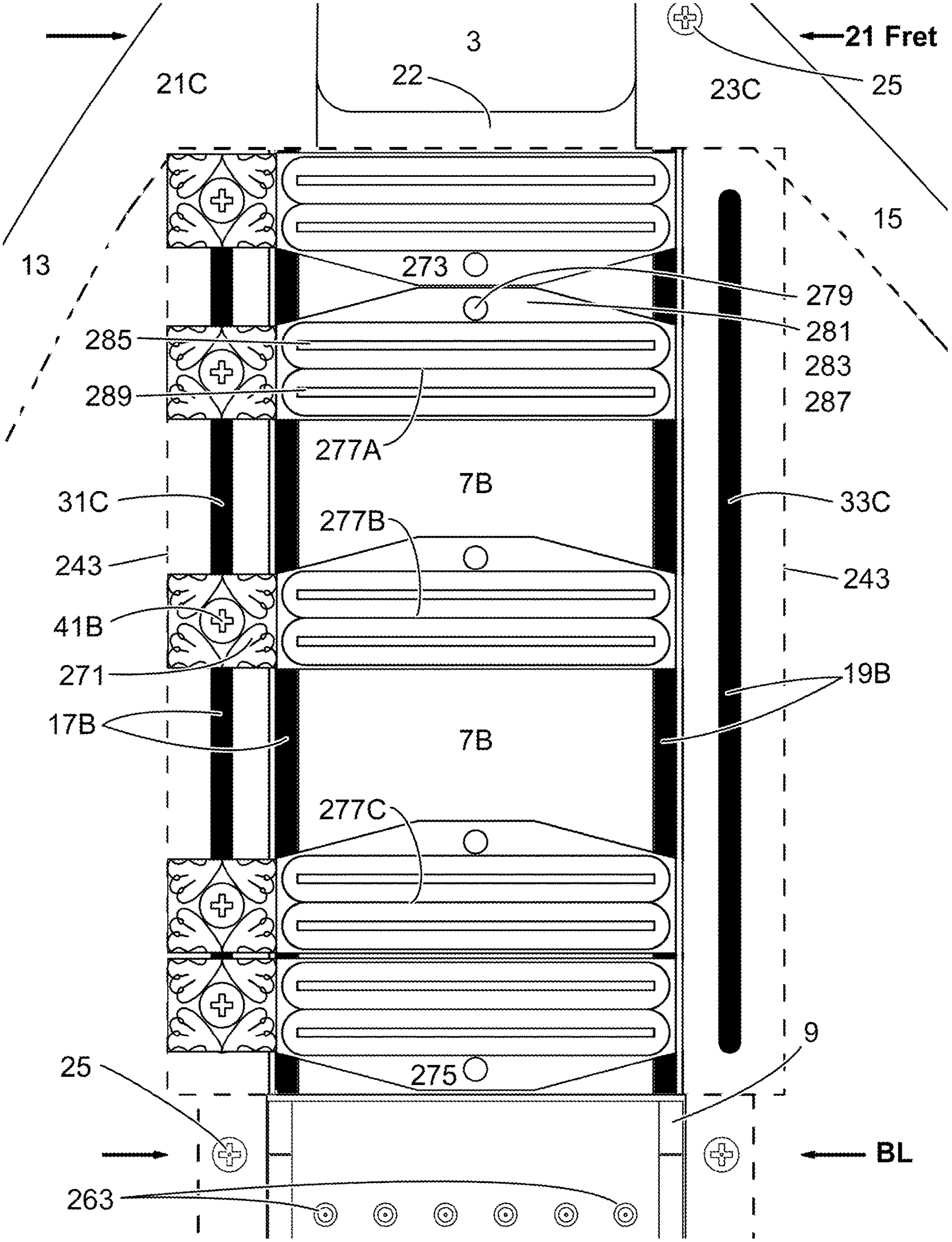
FIG. 34 shows either how 5 Musiclily 533 (M-533) humbuckers can fit between the neck and bridge, with room for 2 more, or how two M-533s can sit each at the neck and bridge, with a third movable between them. It also shows decoration on the top pickup mounting washer.

FIG. 34 shows the Musiclily model 533 single-sized dual-rail humbucker, mounted in the same top plates as FIG. 33. The designations BL, 21Fret, 3, 7B, 9, 13, 15, 17B, 19B, 21C, 22, 23C, 25, 31C, 33C, 41B, 243 and 263 remain the same as in FIG. 33. The new features are a different decorated pickup mounting top washer (271), a 533 neck pickup (273), a 533 bridge pickup (275), and a 533 middle pickup (277A-C) which can be mounted in any position between the neck and bridge pickups, as shown in 277A, 277B and 277C. Or these could be five individual pickups out of a possible seven Musiclily 533s that can be mounted between the neck and the bridge. The pickup mounting top washers (271) are shown only on the left side, demonstrating the extent of the right side mounting slot (33C). Each Musiclily 533 pickup has a cable hole (279) in a printed circuit bottom coil form (281), and pickup coils (283, 287) wound individually about the North pole rail (285) and as South pole rail (289). Here, the bridge pickup is mounted with the cable adjacent to the bridge to give the poles some spacing between themselves and the ferro-magnetic bridge. The middle pickup, for fourth from the neck of five (277C), is oriented in the opposite direction, because the virtual fret positions, indicating tonal harmonic vibrations, are much closer together at the bridge than at the neck. But any pickup can be mounted in either orientation, for greater flexibility in tonal output.

Figure 35:
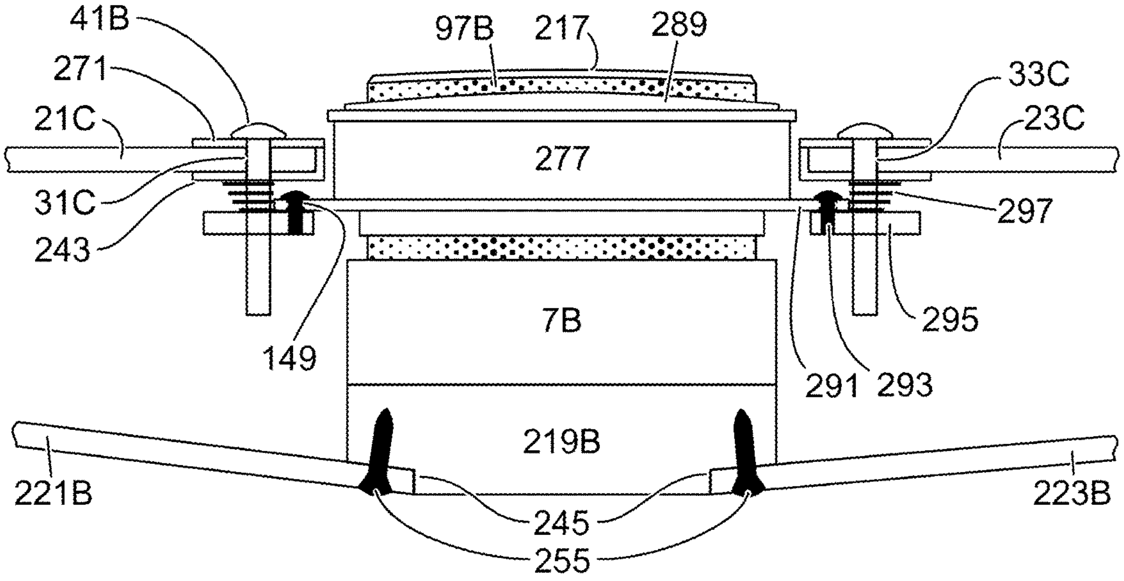
FIG. 35 shows the body design of FIG. 32, with the mounting details for a Musiclily 533 pickup, as seen from the bridge to the neck. In this case it is spring-loaded on the mounting screws because the dual rail poles are not adjustable. All the following Figures with pickup mounting details are drawn not showing either type of backbone reinforcement.

FIG. 35 shows a pseudo-cross-section view from the bridge of the Musiclily 533 pickup (277). Parts 7B, 21C, 23C, 31C, 33C, 41B, 97B, 217, 219B, 221B, 223B, 243, 245 and 255 are the same as in FIGS. 31 & 32. Parts 271, 277 and 289 duplicate those in FIG. 34. The pickup rail poles (289 & 285—not shown) have more curvature than the frets (217) used in the prototype neck (97B). So the middle top of the rail is set about 0.125 inch below the middle top of the fret. The mounting foot (291) of the pickup has a mounting hole (149) through which a small screw (293) passes to thread into the pickup mounting extension plate (295). A mounting screw (41B) passes through the pickup mounting top washer (271), the left (31C) or right (33C) mounting slot, the left (21C) or right (23C) top plate with reinforcement strips (243), and a standard pickup mounting spring (297) to thread into the extension plate (295).

The Musiclily 533 pickup has two unfortunate features which must be taken into account. First, the mounting holes (149) do not consistently line up on any fixed axis at any fixed position. Second, the wire ends from the coils come out from under the black wrapping tape (not shown) and pass through the bottom coil form, which is printed circuit board, pass through holes and are soldered to the underside printed circuit too near to the mounting holes. The solder dot on the bottom can be within 0.090 inches of the center of the mounting hole. The mounting spring shown here is conical, with a 0.20 inch base and a 0.30 inch top. Even the 0.20 inch end can possibly bear down on the coil wire ends where they enter to top of the bottom coil form. This can cause damage or shorting. So using mounting screw 41B in the pickup mounting hole with a metal spring is inadvisable. It may be better to use silicone (or other soft plastic) tubing instead of a spring.

As shown in FIG. 35, this is alleviated to some extent by using the mounting extension plate to offset the mounting screw from the pickup's mounting hole. But the plate cannot be electrically conductive, or it can short out the coil end solder points. The solder points also stick down about 0.050 inch from the bottom of the coil form. So the extension plate will have to have corresponding depressions to mount flatly and securely to the pickup mounting foot. This should not be a problem if the Musiclily 533 humbuckers are replaced with matched standard single coil pickups, which are the about same size, and do not generally have this problem.

Different Pickup Mounting Washer Embodiment

Figure 36A:
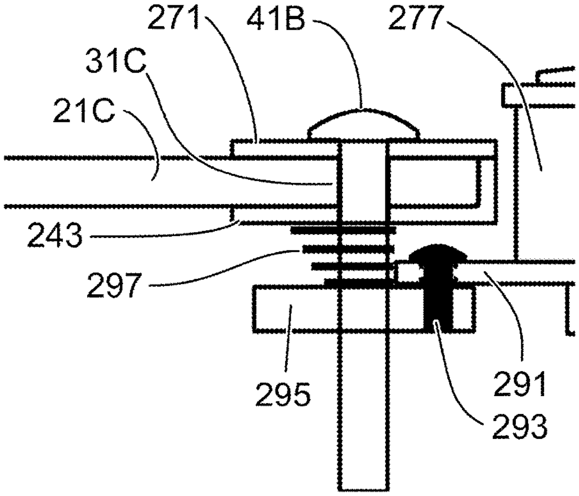
FIG. 36A-B show how a design improvement to the top washer, a vertical, downwards flange in the sound hole towards the pickup, to help keep the top mounting washer oriented with respect to the mounting slot and the pickup. It also allows the mounting slot to be moved a little farther from the pickup and thus straightens out the mounting spring. Hereafter, the pickups are drawn showing a small gap of at least 0.02-inch between the pickup and the mounting parts on the top plates. Otherwise the pickups rub against the top plates and are not easily movable.
Figure 36B:
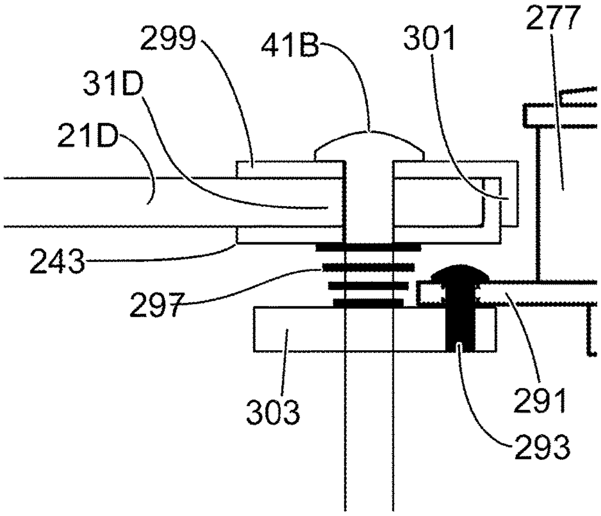

FIG. 36A shows a detail of the Musiclily model 533 humbucker left-side mounting from FIG. 35. The part numbers, 21C, 31C, 41B, 243, 271, 277, 291 and 293 are the same as in FIG. 35. The tab (239A) or peg (239B) from the Hofner mounting in FIG. 31 is not shown. Instead, FIG. 36B shows a modification to the pickup mounting washer (299) for the Musiclily 533. Instead of a peg or tab fitting into the top plate (21D) mounting slot (31D), the washer has a molded-over or folded-over vertical flange (301) that slides along the inside edge of the top plate parallel to the mounting slot, and orients the washer to the slot that way. In this case, the open distance between the right and left top plates has to be greater by at least twice the thickness of the washer flange (301). The mounting extension plate (303) has to be a little longer in that dimension, but this also helps to move the mounting screw (41B) and spring (297) away from touching the pickup mounting foot (291). This can be considered a preferred embodiment, because of this, and because the flange (301) will be longer or larger than either the tab (239A) or peg (239B) and thus less likely to break or fail.

Allparts Vintage Chrome Humbucker

Figure 37:
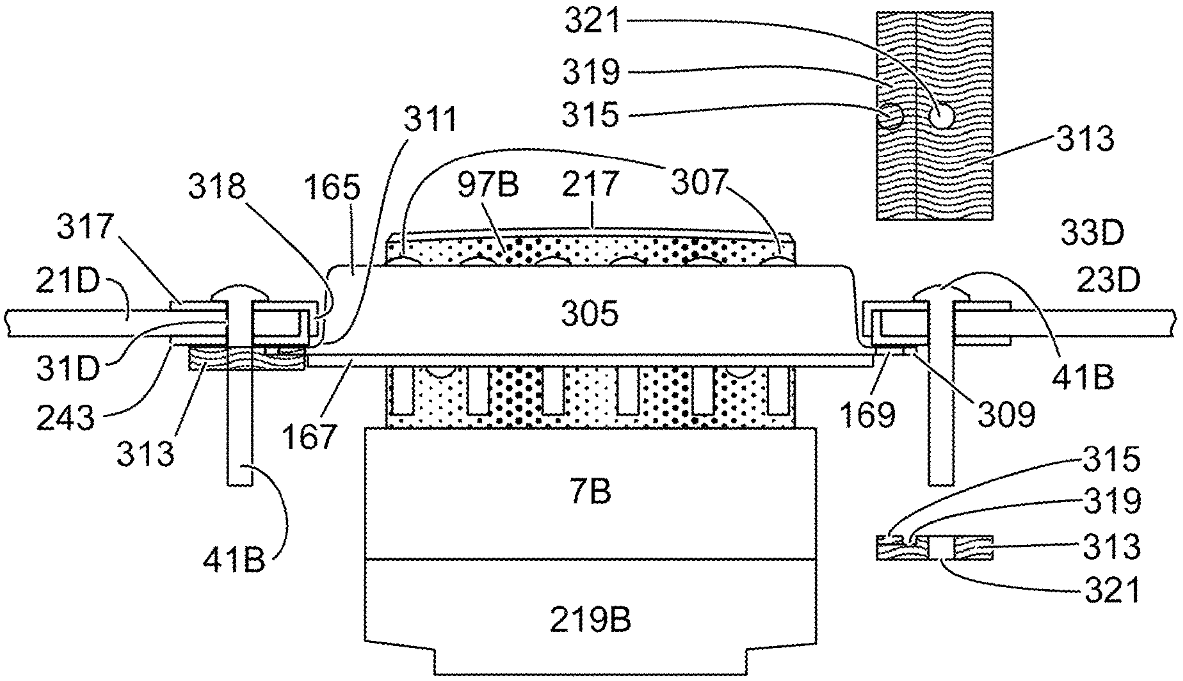
FIG. 37 shows the mounting details for the Allparts Vintage humbucker, which requires a special cut in the mounting extension plate.

FIG. 37 shows a pseudo-cross-section, with a view from the bridge (not shown) towards the toe of the neck (97B), of an Allparts Vintage style chrome humbucker (305) mounted on the right (21D) and left (23D) top plates, with reinforcement areas (243), in the left (31D) and right (33D) mounting slots. The backbone (7B) and the backbone reinforcement (219B) are shown, but the bottom plates and mounting screws are not. The pickup is mounted so that the screw poles for the 1- and 6-strings (307) are about 0.125 inch below the top of the 21 fret (217). The pickup has a chrome-plated brass cover (165, FIG. 25) and brass base (167, FIG. 25), with flanges (309) on the ends with mounting holes (169).

In manufacturing, the pickup cover is likely made by taking a flat sheet of brass and progressively pressing it into a cup shape with dies. The corners at the top and at the bottom (311) have radii to avoid breaking the metal, and a slight taper to the sides of the cup (not designated). So the short flange (318) of the mounting top washer (317) helps to avoid touching the cover in that radius. The pickup mounting flange is very short, with the mounting hole (169) very close to both the radius (311) and the end of the flange. In this case, the mounting extension plate (313) has a notch (319) to fit the flange, with a peg-like protrusion (315) to fit into the pickup mounting hole (169), and a threaded hole (321) to take the mounting screw (41B). The mounting extension plate is shown here in place on the left, lowered on the bottom right, and rotated to see its top surface on the top right of the Figure.

In this case, putting the outside screw poles 0.125 inch below the top of the fret puts the top of the flange only about 0.010 inch below the top plate reinforcement area (243). If the pickup is to be hard-mounted to the top plates, the mounting extension plates need not be fixed to the pickup. But if the option to mount the pickup lower should be maintained, then the extension mounting plates (313) must be either soldered to glued to the pickup mounting flanges (309), so that washers or some other spring or spacer can be inserted between the top plate (21D, 31D, 243) and the pickup mounting structures (309, 313). In this Figure, the screw poles bottom out about 0.08 inch above the backbone (7B), which can be cut lower, if needed.

At the level of the top of the top plates, the pickup cover is about 2.845" wide. In previous Figures, the pickups were had approximate body lengths of about 2.706 inches for the Hofner style humbucker and about 2.663 inches for the Musiclily 533. This allowed a common sound hole width of about 2.706 inches. In this Figure, the reinforcement structure (243) and the mounting top washer (317) and its vertical flange (318) are all sized at 0.048" thick. The bottom end of the washer flange (318) is placed about 0.031 inch from the pickup cover. All this means that the open sound hole area between the top plates is about 3.05 inches wide. So, unless one is willing to have much larger gaps for pickups of shorter length, the top plates must be slightly different in dimensions for this pickup than for the previous two.

Allparts Soapbar Single-Coil Pickup with Two Magnets

Figure 38:
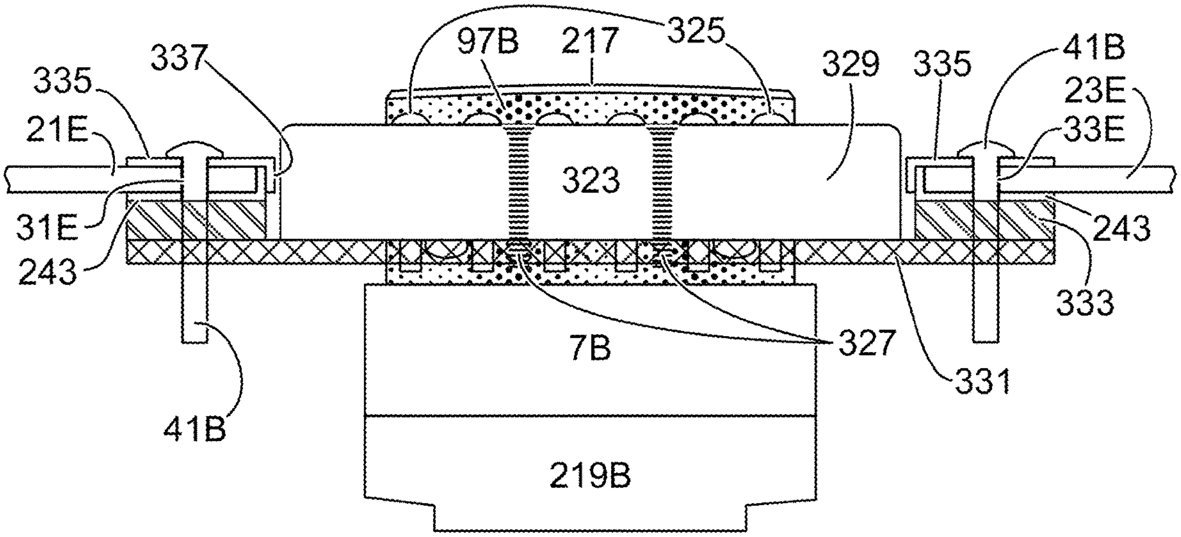
FIG. 38 shows the mounting details for the Allparts Soapbar pickup, which has no mounting tabs and requires a mounting plate which extends all the way under the pickup from one side to the other.

FIG. 38 shows a pseudo-cross-section, with a view from the bridge (not shown) towards the toe of the neck (97B) of an Allparts Soapbar pickup (323), mounting between the left (21E) and right (23E) top plates in the left (31E) and right (33E) mounting slots, with mounting screws (41B), just above the backbone (7B) and backbone reinforcement (219B). The pickup has six screw poles, of which the 1-string and 6-string poles are marked here as 325. They are set about 0.125 inch below to top of the 21-fret at their positions. The Soapbar pickup has a plastic cover (329), with two mounting screws (327) which are provided long enough to pass through the body, past two foam spacers glued to the bottom (not shown) of the pickup, and into a guitar body. The foam spacers (not shown) would extend about 2.38 inches across this Figure, and be about 0.5 inch tall, with a thickness into the Figure of about 5/16 inch. They are not used here. Instead, the mounting screws thread into a rigid pickup mounting plate (331), about 0.125×1.38×5.02 inches in size.

The pickup mounting screws (41B) pass through the top washers (335), the top plate mounting slots (31E, 33E), mounting spacers (333) and thread into the mounting plate (331). These parts are sized to match the top plate reinforcement areas (243), should they exist. The mounting plate (331) is more completely explained by FIG. 39. The top washer (335) in this Figure also has a vertical flange (337) to keep it visually oriented to the pickup. To accommodate the Allparts P-90 pickup, the distance between the top plates, across the sound hole, is about 3.52 inches. This leaves about 0.033 inch between the pickup cover (329) and the top washer flange (337), which shrinks to about 0.020 inch for the slightly longer P-90 pickup.

It is possible to mount up to four Soapbar pickups between the neck and bridge. They can also be mounted directly to the backbone (7B), using the provided foam mounting pads, cut down appropriately. But then those cannot be easily moved. The Soapbar pickup, like the P-90, has two magnets (not shown) placed horizontally below the coil (not shown), with their North poles against the screw poles and their South poles pointing out the sides of the pickups. With three pickups, it is possible to get $2^2=4$ different tonal characters for poles ordered between the neck and bridge, i.e., NNN, NNS, NSN and SNN from neck to bridge. The opposite polarities, SSS, SSN, SNS and NSS, will not matter unless there is a nonlinearity, like a fuzz box, in the signal path. And that can be handled with a reversing switch between the pickups and the nonlinearity, such as at the guitar output. This can also be simulated with humbucking pickups by putting reversing switches on each humbucking pickup.

Figure 39:
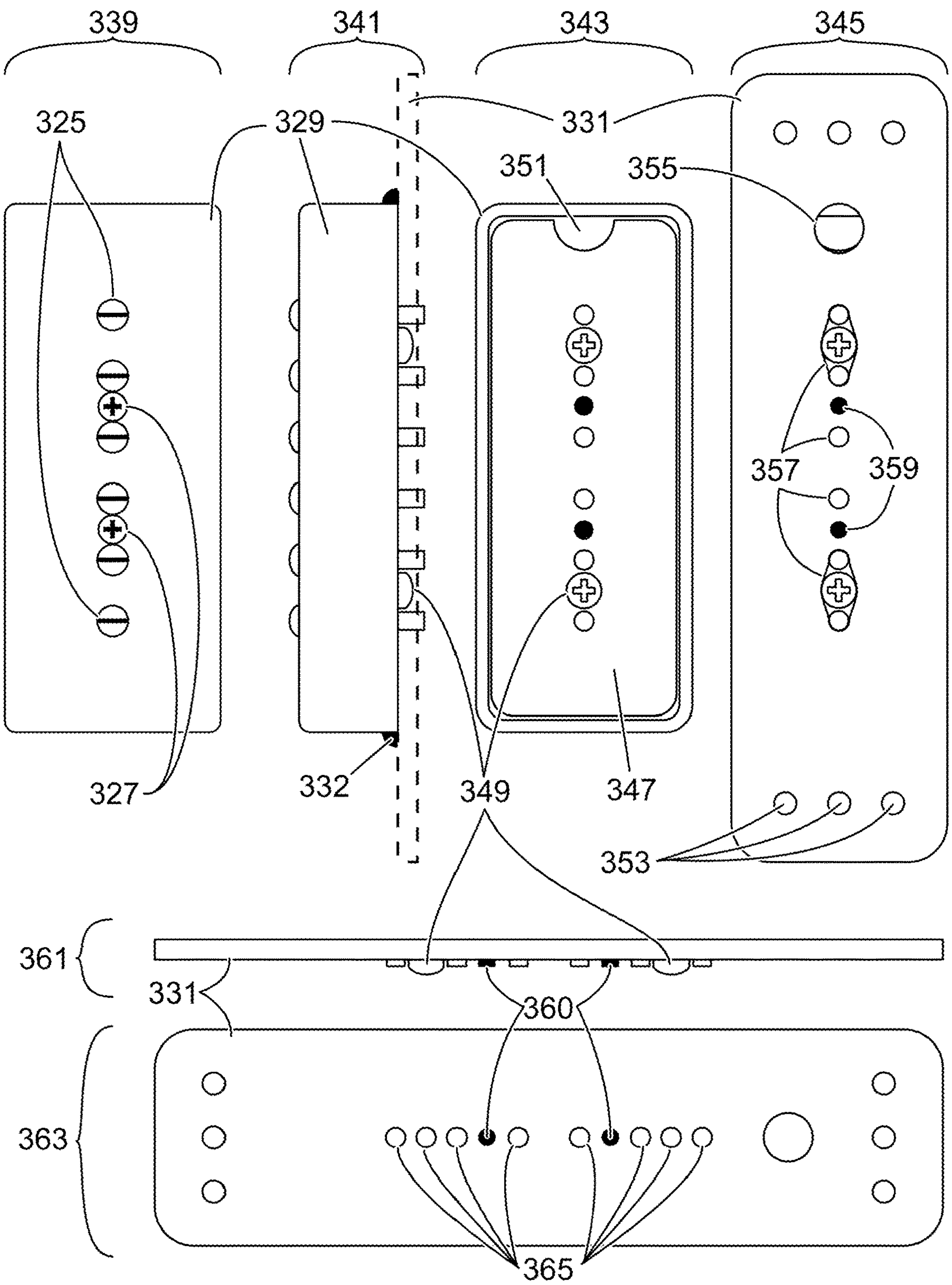
FIG. 39, with views 339, 341, 343, 345, 361 and 363, shows the details of the Soapbar pickup and its mounting plate.

FIG. 39 shows six views of a Soapbar pickup, top (339), side (341), bottom (343), bottom with the mounting plate (331) attached (345), a side view (361) of a preferred alternative embodiment of the mounting plate, and a plan view (363) of the mounting plate (331). In top view (339), the 1- and 6-string screw poles (325), the mounting screws (327) and the plastic cover (329) are called out. In the side view (341), the plastic cover (329), a dotted-line position of the mounting plate (331) and one of the two body assembly screws (349) are called out. Since the mounting screws (327) are long and thin, it may be advisable to add fillets of glue (332), preferably removable hot melt glue, to the ends of the pickup cover (329) to secure it to the mounting plate. In the bottom view (343), the plastic cover (329), the brass bottom plate (347), an assembly screw (349), and the scalloped hole (351) in the bottom plate to pass the pickup cable are called out. The bottoms of the screw poles and the two mounting screws are not called out, the screw poles being represented as circles and the mounting screws as black dots.

The bottom view of the mounting plate (345) shows three of the six threaded mounting screw holes (353), the pass hole for the pickup cable (355), the pass holes (357) for the screw poles and assembly screws, and the bottoms of the mounting screws (359). Since the mounting screws (327, 359) must thread into the mounting plate, the pass holes (357) for the other screws must be as small as practical. The pickup mounting screws (41B, not shown) thread into two, three or four of the mounting holes (353). This gives maximum flexibility for the mounting arrangements. For example:

1) Two mounting screws in each middle hole can have either a standard pickup spring, or a fixed spacer between the mounting plate and the top plate (not shown). A spacer in this configuration, which extends across the width of the mounting plate for stability, can have one or two unthreaded pegs coming down into the mounting holes (353) to keep it properly oriented to the pickup.

2) Two mounting screws can engage the outside holes (353) at one end and an single mounting screw can engage the middle hole at the other end of the mounting plate, can have either springs or spacers. With springs, the neck to bridge tilt of the pickup can be adjusted.

3) Two mounting screws can engage two holes at each end, with either springs, or with spacers aligned to the pickup by their mounting holes.

In all of these examples, the top mounting washer must be configured to fit the screws. In FIG. 39, views 361 and 363 show a preferred alternative to the mounting plate, in just a few changes. Instead of the pickup assembly screws (349) being sunk into pockets (357) in the mounting plate, they hold the mounting plate to the pickup, using simpler pass holes (365) along with the screw poles (not called out). The original pickup mounting screws (327, 359, 360) can still be used to attach the pickup to the mounting plate as well, but are not as necessary in this embodiment.

Allparts P-90 Single-Coil Pickup with Two Magnets

Figure 40:
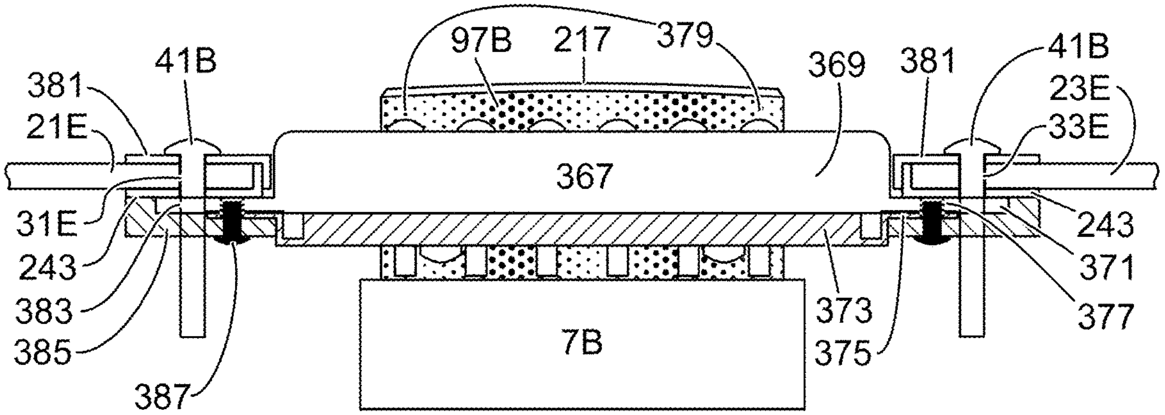
FIG. 40 shows mounting details for the P-90 pickup, which also requires an extended mounting plate with special features to accommodate the pickup.

FIG. 40 shows a pseudo-cross-section, with a view from the bridge (not shown) towards the toe of the neck (97B) of an Allparts P-90 pickup (367). The parts 7B, 21E, 23E, 31E, 33E, 41B, 97B, 217 and 243 are the same as in previous Figures. Part 219B has been left off to save space for the next Figure. This pickup has a plastic cover (369) with an integral mounting tabs (371) at each end, and a brass bottom plate (373) with its own integral mounting tabs (375) at each end, slightly inset into the plastic mounting tab. Both plastic and brass mounting tabs have original mounting holes (377), which are almost impossible to separate visually in this Figure. The hole in the plastic tab is a pass-through, and the hole in the brass tab is intended to be threaded, but the material is quite thin.

Here, because of the pickup dimensions, the mounting tabs fit flush against the bottoms of the top plates (21E, 23E, 243). So the 1-string and 6-string screw poles (379) sit about 0.174 inch below the top of the 21-fret (217). Note how the bottoms of the screw poles barely clear the top of the backbone (7B). The mounting screws (41B) pass through the top washer (381), the top plate mounting slots (31E, 33E) and a newly-drilled pass hole (383) in the plastic tab to thread into a mounting extension plate (385). The mounting extension plate has two steps cut into it (shown, but not called out) to accommodate the original pickup plastic and brass mounting tabs, and is attached the pickup mounting tabs by one or more of glue, solder or a screw (387) passing through it and threaded into the brass mounting tab.

Allparts Jazzmaster Single-Coil Pickup with Pole Magnets

Figure 41:
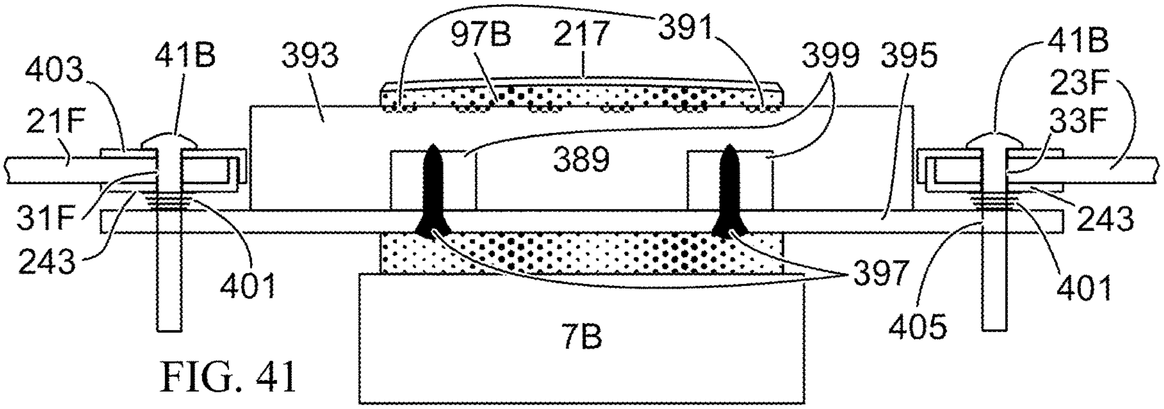
FIG. 41 shows the mounting details for the Jazzmaster pickup, which like the Soapbar requires a bottom mounting plate larger than the pickup. Not having adjustable poles, it is spring-mounted.

FIG. 41 shows a pseudo-cross-section, with a view from the bridge (not shown) towards the toe of the neck (97B) of an Allparts Jazzmaster pickup (389), placed over the backbone (7B). It has poles (391) recessed in a plastic cover (393), the cover being mounted to a mounting plate (395) by screws (397) passing through the mounting plate threaded into mounting tabs (399). The pickup internal part are not shown. The mounting plate is mounted to the left (21F) and right (23F) top plates, the same as used with the P-90 pickup, by screws (41B) passing through the upper mounting top washer (403), the left (31F) and right (33F) mounting slots in the top plates, then through pickup mounting springs (401) into threaded holes (405) in the mounting plate. As shown, the 1-string and 6-string poles (391) are about 0.13 inch below the top of the 21-fret (217).

Figure 42:
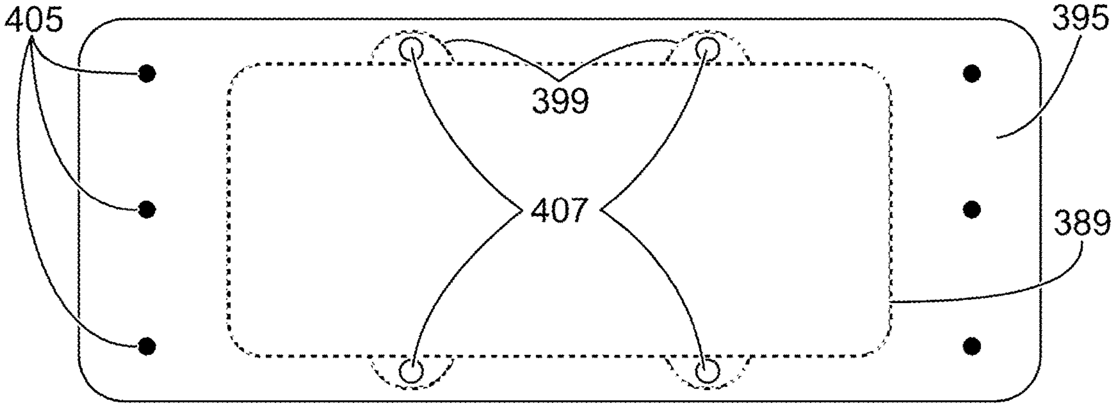
FIG. 42 shows more plan details for the Jazzmaster mounting plate.

FIG. 42 shows the mounting plate (395) in plan view from the bottom, with the pickup cover (389) and mounting tabs (399) indicated by the broken line. It has three threaded holes (405) at each end, and four pickup mounting holes (407) to pass the mounting screws (397) in FIG. 41. The keep the pickup stable, it should have at least three of the 41B mounting screws and 401 springs, two in the outer holes on one end, and one in the inner hole on the other. Preferably, four 41B screws are used, each with a mounting spring (401, FIG. 41), in the four corner holes (405). Fixed spacers (not shown) can be used instead of springs, but then the height of the poles under the strings will not be adjustable. In FIGS. 41 & 42, the mounting plates (395) are shown sized about 2.10 inch by 5.28 inch. The 2.10 inches dimension allows more material around threaded holes 407 for strength, which they might not have if the plate were only 1.96 inches wide. A 1.96 inch dimension would allow only about 0.57 inch to move between three Jazzmaster pickups. A 2.10 inch dimension allows only about 0.15 inch of movement. Both numbers are small compared to the coil size of the pickup, and three Jazzmaster pickups could just as well be mounted directly to a solid spacer extending across and mounted to the backbone. But if one mounts only one or two Jazzmaster pickups in the sound hole, then the range of movement is much greater.

Mounting Considerations with Springs

The Musiclily 533 and Allparts Jazzmaster pickups, which have no adjustable poles, are presented here mounted with springs to allow height adjustments under the strings. Out-of-the-box, the M-533 weighs about 79 grams and the Jazzmaster weights about 84 grams, not counting any additional hardware, like the mounting plates. In a standard electric guitar, the Jazzmaster is made to be mounted directly to the body, and the M-533, like the standard Strat-type single coil pickup, is made to be mounted with screws and springs to fixed points on the pickguard. But mounting either with springs under screws in slots raises physical stability issues.

Pickup springs are not very strong, and exert little pressure as they reach full extension. So with the pressure of springs alone, there is nothing to keep the pickup mounts from sliding in the top plate mounting slots when the springs are fully extended. And the pickups may have enough inertia to move in the mounting slots due to dropping or bumping the guitar if the springs are less than fully compressed, with the coils touching each other. This can be fixed by using a kind of T-nut with another hole in a top washer to fix it in the slot, or adding adjustable stops to contact the top washers in the mounting slots. For the Jazzmaster, with up to six mounting holes in its top washer, several combinations of springs and stops can be used, and maintain full spring height adjustments, so long as there is at least one each at each end of the pickup.

Figure 43A:
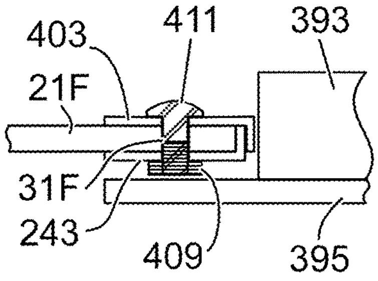
FIGS. 43A-B show details for a T-nut for the pickup mounting screws, which fits in and under the mounting slot, with a rectangular post sitting in the slot to give an opposition torque to aid tightening the mounting screw, so that fixing the mounting hardware in the mounting slot does not depend upon mounting spring pressure.
Figure 43B:
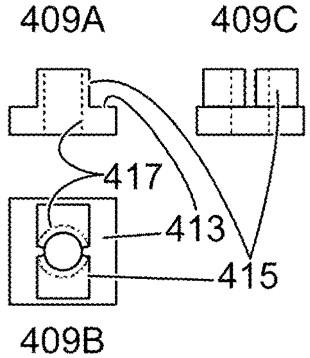

FIG. 43A shows the left side mounting hardware of FIG. 41 with the screw (41B, FIG. 41) and spring (401, FIG. 41) replaced by a shorter screw (411) and a T-nut (409). FIG. 43B shows three views of the T-nut design at 2X scale, slot-wise (409A), top (409B) and cross-slot (409C). This T-nut is similar to much larger T-nuts commonly used in machinery set-ups in drill presses and vertical mills, but specifically designed for this application. It has a flange (413), a rectangular slot neck (415) and a hole (417, broken lines) threaded for screw 411. The screw and flange compress parts 21F, 243 and 403 together, holding the top washer in place by friction against any inertial bumps transmitted to the top washer through the mounting screws (41B). Many configurations of this T-nut are possible, so long at it retains threads for screw 411, a flange for compression, and rectangular slot neck, fitted to the mounting slot (31F, FIG. 43A) to provide the torque needed to tighten the screw (411) to get the needed compression and associated stopping friction. Given the six mounting positions (405) shown on the Jazzmaster mounting plate (395) in FIG. 42, it is clear that several mounting configurations will work, so long as here is at least one spring and one T-nut at each end of the pickup. The most stable and versatile mounting configuration may be two springs and one T-nut on one end, and two T-nuts and one spring on the other.

But it is always possible to use fixed spacers instead of springs and avoid T-nuts altogether. Remember that the Jazzmaster is so big that there is virtually no room left for adjustment along the strings when three Jazzmasters are mounted. This may only be an issue for a guitar with just one or two Jazzmasters mounted with springs.

Figure 44A:
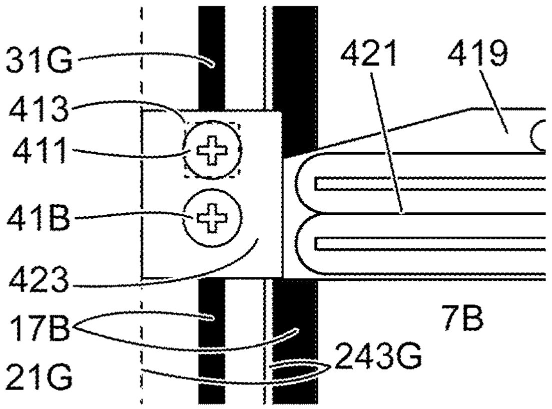
FIG. 44A shows a top washer with two screws, one for mounting a pickup with a spring, and one for fixing the top washer in the mounting slot with a T-nut.

FIG. 44A shows a portion of the left side of a mounted Musiclily 533 (M-533) pickup modified from FIG. 34. The sound hole (not indicated) has been widened slightly to accommodate a single-coil pickup in FIG. 44B, and to accommodate a modified left top washer (423) with a vertical flange (not shown), with a new left top plate (21G), and a repositioned mounting slot (31G). The broken line on the left and the white strip on the right indicate the left top plate mounting slot reinforcement area (243G) on the bottom of the left top plate. The left body cavity (17B) shows as black to the left of the backbone (7B). The top washer takes advantage of the fact that the cable tab (419) of the M-533 pickup (421) takes up room between the neck and bridge, and is slightly smaller than the neck-to-bridge width of the pickup. The mounting screw (41B) is in the same place relative to the M-533 pickup. The head of the mounting screw is about the same diameter as the top of the mounting spring (not shown). A broken line (413) shows the location of the T-nut flange under the T-nut screw (411), which is a shortened version of the mounting screw. Because the placement of the mounting and T-nut screws on the top washer is not symmetrical along the mounting slot, there must be a left top washer and a right top washer for each pickup. The T-nut compression flange (413) could be wider if necessary. The T-nut and T-nut screw should be non-magnetic material, such as brass, aluminum, stainless steel or glass- or carbon fiber-filled nylon.

Figure 44B:
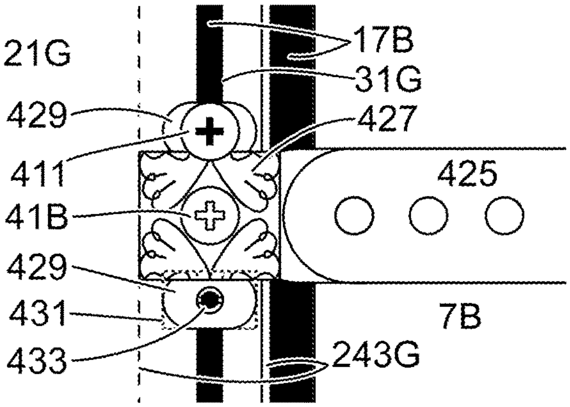
FIG. 44B shows an alternative embodiment, where the top washer has a single pickup mounting screw, used with a mounting spring, and the top washer is fixed in the mounting slot with one or two short screws with T-nuts, and a special washer with a flat against the top washer.

FIG. 44B shows the M-533 pickup and top washer in FIG. 44A replaced by a single-coil pickup (425), without a cable tab, and new top washer (427). Many if not most single-coil pickups have a cable tab, like part 419 in FIG. 44A. But some don't, instead having the output wires attached to one end of the pickup. This Figure shows the same parts 7B, 17B, 21G 31G 41B and 243G as the FIG. 44A. The top washer is similar to the top washer (271) in FIG. 34, but is slightly longer along the slot. Since it is not large enough to accommodate a T-nut screw on it, T-nuts (431, 433) are shown mounted in the slot above and below it. The upper T-nut is not shown, just the T-nut screw (411) and a T-nut stop washer (429). Part of the T-nut in the lower position, without the screw (411), can be seen as its outline (431, broken line) and the treaded hole in the T-nut slot neck (433), through the hole in the stop washer (429). This T-nut has a wider compression flange than in FIGS. 43A & 44A.

Note that the stop washer (429) is asymmetrical about its central screw hole (not indicated), so that part of the head of the upper screw (411) overlaps the top washer (427). The stop washer should be just slightly less thick than the top washer, so that part of the screw head will bear directly on the top washer. The dimensions of the pickup (425) were taken from a pick cover for a single-coil pickup from a Fender Squier Affinity Stratocaster™, and are slightly larger than noted in Table 5, being about 0.716×2.772 inches on the part covering the coil (not shown) and poles (not called out). The pickup cover clears the top washer by about 0.020 inch in this Figure. The top washer is a bit shorter in the slot than the pickup is wide.

If T-nuts and stop washers are used on both the top and bottom of the top washer, this makes the assembly fill about 1.209 inch between the neck and bridge, allowing for only 5 pickups. If only one T-nut and stop washer is used, then the assembly fills about 0.962 inch between the neck and bridge, allowing for 6 pickups. If the top washer (423) in FIG. 44A is used with this pickup, then the assembly fills about 0.942 inch between the neck and bridge, allowing for 6 pickups. This suggests that the T-nut from FIG. 44B and the top washer from FIG. 44A are a preferred combination for this kind of pickup, if the width of the T-nut does not interfere with pickup or extension mounting plate. The ideal T-nut width is likely somewhere in between the two, or asymmetrical with a wider flange on the side away from the pickup.

Rotating Pickups with Respect to the Strings in U.S. Pat. No. 9,401,134

On many standard 3-coil Strat-type electric guitars and Telecasters (™ Fender), the single-coil bridge pickup is canted from 10 to 16 degrees off square with the strings, usually with the 6-string pole farther from the bridge. U.S. Pat. No. 9,401,134 (Baker, 2016, FIGS. 1-5), which this invention continues in part, took this much farther, disclosing a pickup mounting system which allowed pickups to be mounted in almost height beneath the strings, any position between the neck and bridge, and almost any orientation across the strings.

Figure 45A:
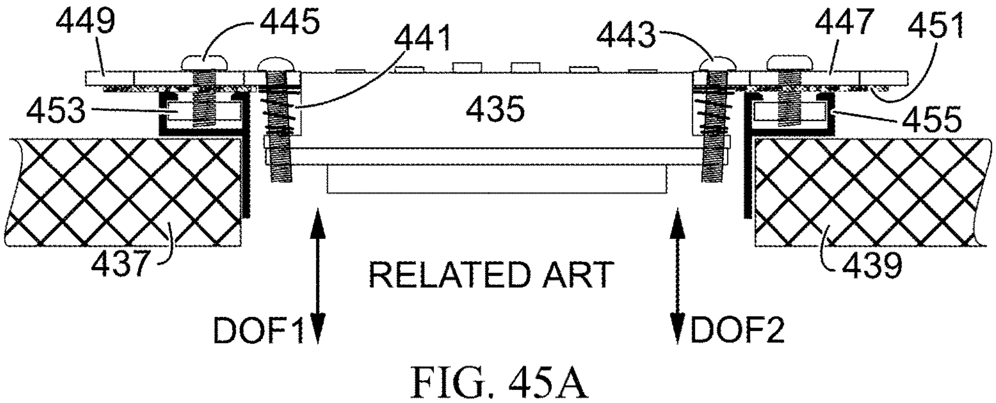
FIG. 45A shows related art, FIG. 4A from U.S. Pat. No. 9,401,134, with different part numbers, with a side view of mounting plates above the pickup, mounted to the plates by standard screws and springs, and the mounting plates mounted in turn by screws with nut sliding in a partially-enclosed channel, the channel being mounted to the guitar body. The two usual degrees of freedom (DOF), the height adjustments at the ends of the pickup, are noted.

FIG. 45A shows Related Art, FIG. 4A from U.S. Pat. No. 9,401,134, with different part numbers. A single-coil pickup (435) is mounted between two body parts (437, 439) using standard pickup mounting springs (441) and screws (443), each screw passing through a mounting plate (449) instead of a pickguard. The mounting plate screw (445) passes through a slot (447) in the mounting plate (449), with a non-slip gasket (451) on its bottom, into a rectangular nut (453) captured in an extruded aluminum mounting channel (455). In this case, the extruded aluminum channel is simply part of a standard Nielsen™ picture frame. Each screw (443) and spring (441) adjusts the height of the pickup below the strings (not shown), as would a normal pickup screw on a pick guard, giving the same two degrees of freedom (DOF1, DOF2) of movement.

Figure 45B:
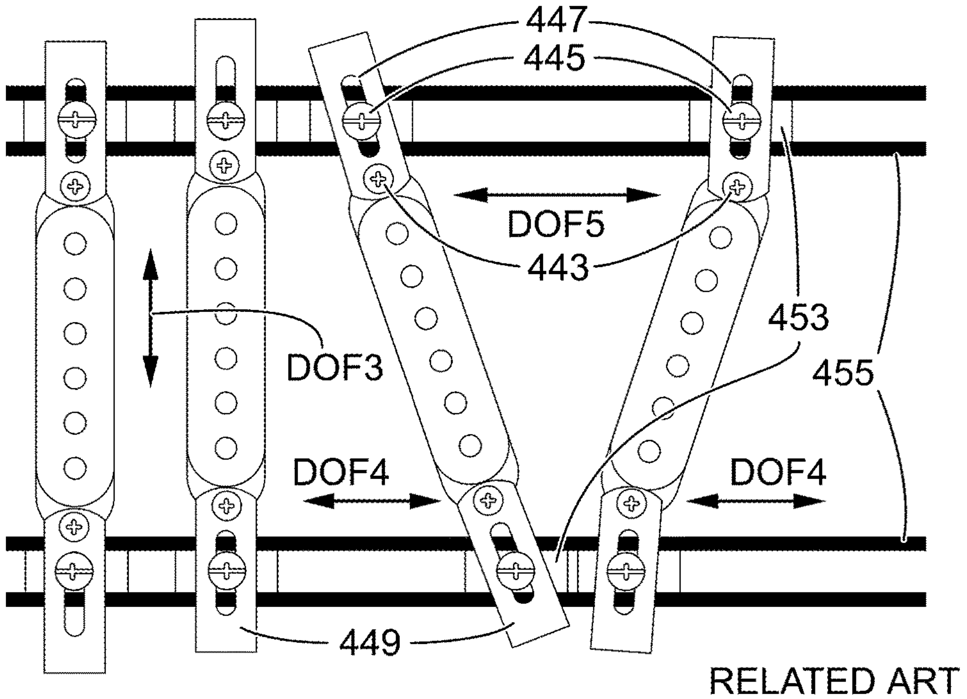
FIG. 45B shows the top view of the mounting system in FIG. 45A, with three more DOF noted.

FIG. 45B shows Related Art, FIG. 5 from U.S. Pat. No. 9,401,134, with different part numbers. Four pickups (shown but not numbered) show how the slotted (447) mounting plates (449), attached by mounting plate screws (445) to rectangular mounting nuts (453), captured in mounting channels (455) allow three more degrees of freedom (DOF3, DOF4, DOF5) of movement. With the channel nuts (453) left in place, moving the pickup along the slots (447) in the mounting plates allows DOF3, movement at right angles to the strings (not shown). Assuming the 1-string at the top of the Figure, and the 6-string at the bottom, loosening the lower mounting plate screw allows the mounting nut to move in the bottom mounting channel, giving DOF4, the movement of the end of the pickup under the 6-string. Doing the same with the top mounting nut and screw, gives DOF5, movement of the end of the pickup under the 1-string. DOF4 & DOF5 could together be considered DOFθ, rotation under the strings. The non-slip gaskets (FIG. 45A, 451) help to keep the pickups in place under external bumps, without scratching the mounting channels. Since the pickup mounting screws (443) tend to rotate freely, the force that the channel mounting screws and mounting nut exert on channel lips (shown in FIGS. 45AB, but not numbered) keeps the pickups in place against external bumps.

It is possible to do exactly the same thing in this invention by substituting T-nuts for the mounting nuts and mounting slots for the mounting channels, and doing away with the mounting extension plates added to the pickup here, except for the Soapbar and Jazzmaster pickups which have no mounting tabs on their ends, and require pickup-sized mounting plates to provide the mounting tabs. FIG. 3A-E in U.S. Pat. No. 9,401,134 shows a more sophisticated design for the mounting plates. To use the approach in FIGS. 45AB, the sound hole must be widened to make the pickup mounting tabs accessible from the top. The mounting parts are all preferably non-magnetic, made of brass, aluminum, stainless steel and/or fiber-reinforced plastic, such as carbon fiber- or glass-filled nylon. Note that if the pickups are long and narrow, with rounded ends on the coils like the Strat-type single-coil and M-533 pickups, it is likely that the sound hole need not be further modified to accommodate pickup rotation under the strings. But if the top of the pickup is rectangular, like all the other pickups presented here, the sound hole will have to be wider yet to accommodate the corners of the pickup body as it rotates.

Figure 46:
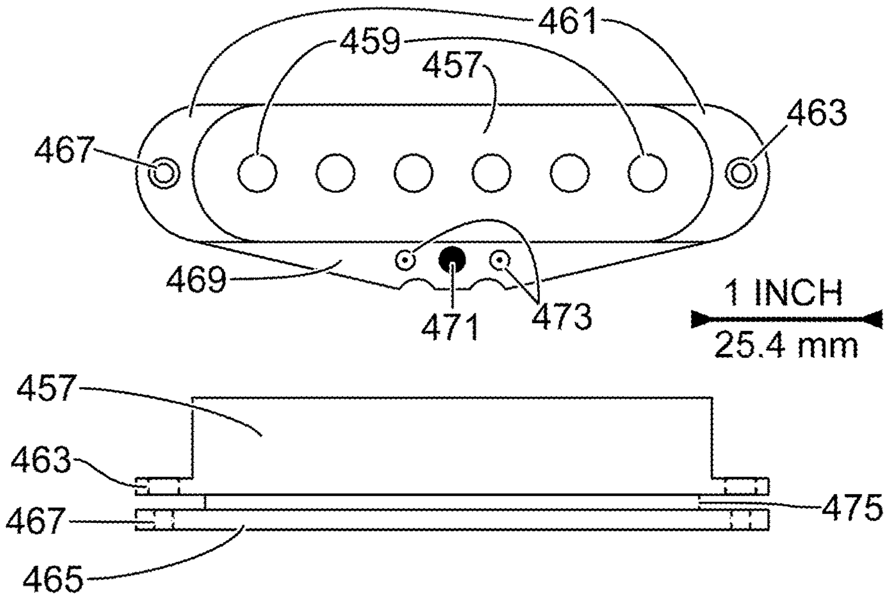
FIG. 46 shows a single-coil pickup, drawn to scale, from a Fender Squier Affinity Stratocaster™, for used in subsequent drawings.

FIG. 46 shows an approximate drawing, to the scale indicated, of a Fender Squier Affinity™ single-coil pickup. It shows a pickup cover (457) with poles (459) passing almost through it, mounting tabs on each end (461), with screw pass holes (463). It has a lower coil form (465) with mounting holes (467), a cable tab (469) which has a cable pass hole (471) and rivets (473) to connect the coil (475, just visible) ends to the pickup cable by soldering. The magnet (not shown) is rectangular and ceramic, touching the lower ends of the ferro-magnetic poles (459) embedded in the lower coil form and flush with the bottom.

Figure 47:
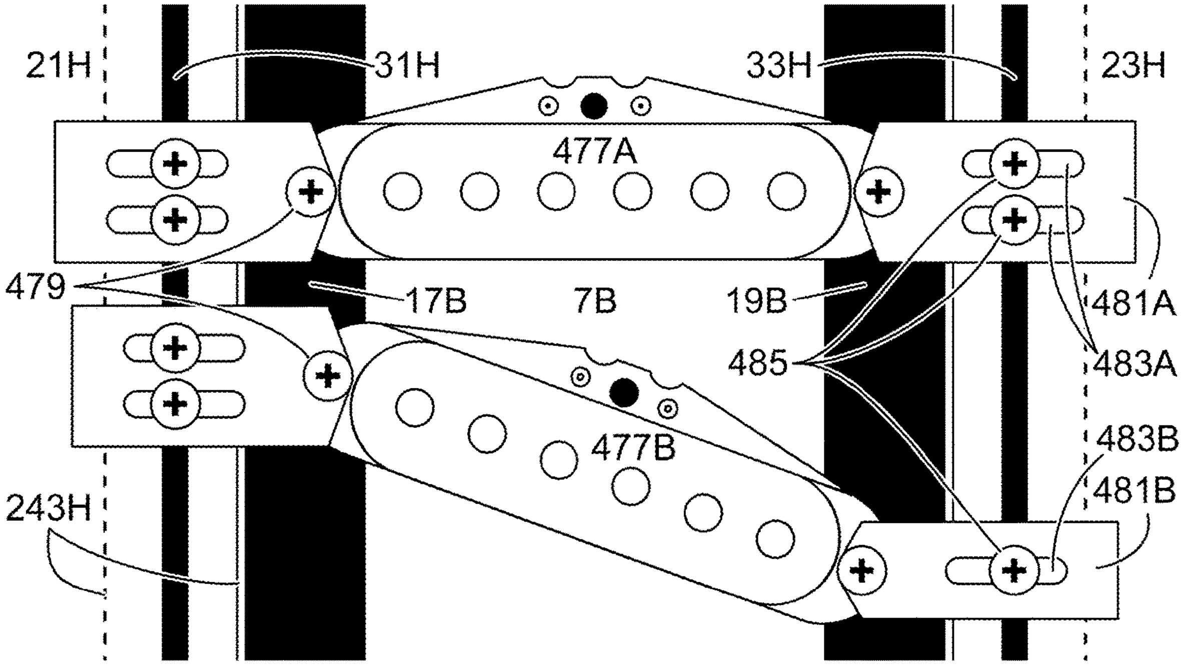
FIG. 47 shows an adaptation of the top washer in this invention to the mounting system in FIGS. 45A-B, with one or two slots in the top washer for use with screws and T-nuts in the mounting slots, so that the pickups can be rotated under the strings up to 20 degrees, and shifted across the strings plus or minus at least ½ the distance between pickup poles.

FIG. 47 shows one Squier-type pickup mounted at right angles to the strings (447A) and another at 20 degrees to the first (477B), over the backbone (7B), the left guitar hollow (17B) and the right guitar hollow (19B), between the left (21H) and the right (23H) top plates. The top plates have left (31H) and right (33H) mounting slots, with underside reinforcement areas (243H), just visible towards the backbone and indicated by broken lines away from the backbone. The pickups have mounting tab screws (479, indicated on the left side only) passing through mounting plates (481A, 481B) which replace the top washers in previous Figures, through standard pickup mounting springs, and then thread into the pickup mounting tabs (not called out). The mounting plates have slots (483A, 483B) through which mounting screws (485) pass, also passing through the mounting slots (31H, 33H) and into T-nuts (not shown), which clamp the mounting plates to the top plates.

In this Figure, the mounting plates have no vertical flanges to orient them at 90 degrees to the sound hole (17B, 19B). The 481A plates have two slots (483A) to do that, and a long T-nut (not shown, but similar to previous T-nuts) with two threaded holes into which both mounting screws (485) thread. In this instance, the distance between the top plates, or the width of the sound hole, is about 3.72 inches. Both it and the mounting plate slots are sized so that the pickup can be moved one-half of the distance between pickup poles, left or right, at any angle up to ±20 degrees to the square with the strings, so that the edges of the top plate will not interfere with any structure of the pickup, its mounting screws or mounting springs. The second type of mounting plate (481B) has only one mounting slot (483B) and is narrower. Its design allows the right side of pickup 477B to be mounted at close to the bridge as possible. Both types of mounting plates (481A,B) are symmetrical and can be used on either end of the pickup.

In this Figure, the heads of the mounting screws (479, 485) are necessarily smaller than in previous Figures, due primarily to the dimensions of the mounting tabs on this style of pickup. Note that the sizing of the mounting plate screw slots (483A,B) allows for plus-or-minus 20 degrees of pickup rotation under the strings, and allows for the pickup to be moved at least one-half the separation between poles left or right. The design of the mounting plates and any visual decoration used on them is not otherwise set. FIG. 47 shows a basic type. A great deal of other artistic license is possible. This embodiment might look more visually appealing than the first as indicated in FIGS. 45AB, but the tradeoff would be considerably less flexibility. Which is more preferable may end up depending on what the market demands.

Cascading Pickup Circuits

This next section could have been covered in Background, Prior and Related Art, but seems to work well enough here, to set up the following sections. The following sections show how adding each additional humbucking pair can be handled by cascading modular switching circuits.

Previous Relevant Patents and a Patent Application in the Family

Every electric guitar has to have a pickup circuit. FIGS. 11 & 19-21 show the first pickup circuits being considered for use with this invention, derived from U.S. Pat. No. 10,217,450 (Baker, 2019), U.S. Pat. No. 10,380,986 (Baker, 2019), U.S. Pat. No. 10,810,987 (Baker, 2020), and U.S. Pat. No. 11,011,146 (Baker, 2021). U.S. Pat. No. 10,011,146 (in FIGS. 7-9) shows how it is possible to use humbuckers to simulate pickups with reversible magnets by simply adding a reversing switch on each humbucker. These cover electro-mechanical switching circuits. The family of patents that include these also covers micro-programmer control of analog-digital switching circuits: FIG. 20 in U.S. Pat. No. 10,217,450; FIGS. 14-17 in U.S. Pat. No. 10,380,986; and FIG. 9 in U.S. Pat. No. 11,011,146.

In addition, U.S. Pat. No. 11,087,731 and U.S. Non-Provisional patent application Ser. No. 17/363,901 cover the linear analog combination of humbucking pair signals, either from dual-coil humbuckers, or from pairs of matched single-coil pickups. The ’731 Patent and ’901 NPPA can produce all the possible mechanically-switched humbucking pair signals, plus all the continuous tones in between. All of these circuits can be used with this invention, providing a much wider range of choices and tones than any existing two-humbucker, three-humbucker or 3-coil electric guitar.

U.S. Pat. No. 10,991,353 (Baker, 2021) discloses a modular single-coil pickup with multiple choices for magnets, magnet orientation (N-up or S-up), poles (fixed or adjustable), and standard or field-spreading bases of ferro-magnetic material. The modular magnetic core of this kind of pickup can be removed and flipped, from N-up to S-up to N-up again, without disturbing the humbucking nature of the circuit the pickup is in. For this invention, the base can be redesigned and replaced, without changing the other modules, to have extended mounting tabs, so that separate part extended mounting plates are not needed.

The standard S-type guitar with three common single-coil pickups and a 5-way switch, with N-up at the bridge ($B_N$) and neck ($N_N$) with S-up at the middle ($M_S$), the three single-coil outputs have hum, but the parallel-connected $B_N+M_S$ and $M_S+N_N$ circuits are nominally humbucking. But using common-point connection humbucking circuits from U.S. Pat. No. 10,380,986 (Baker, 2019) and later, six all-humbucking are possible: $B_N+M_S$, $B_N-N_N$, $M_S+N_N$, $B_N+(M_S-N_N)/2$, $M_S+(B_N+N_N)/2$ and $N_N+(B_S-M_N)/2$, give or take an output sign, as shown in FIG. 5.

FIG. 11 (Related Art, FIG. 16 in U.S. Pat. No. 10,810,987) shows how grounding the common-point connection can produce 6 more circuits with hum, plus amplitude compensation, 3 single-coil circuits and 3 2-coil circuits, for a total of 12. Twelve is better than five. Electro-mechanical humbucking switching for 3 single-coil pickups with a common-point hum connection is easy to set up, but not so much for 4 single-coil pickups, where there are 6 combinations of humbucking pairs, 12 combinations of humbucking triples and 7 combinations of humbucking quads, for a total of 25 circuits. Trying to switch 4 matched single-coil pickups mechanically tends to produce a lot of duplicate circuits and tones. Unless the switching is digital under the control of a micro-processor or micro-controller, 3 matched single-coil pickups are the preferred number for mechanical switching.

In the related art of the common-point connection circuit patents in this family, there are several levels of circuits. The lowest level is a simple mechanical switching system, with no amplitude compensation for different output levels, as shown in FIG. 19. The second level has a powered preamp after the switching system, with gain control resistors to bring all the outputs to the same level, as shown in FIG. 11. Being mechanically switched, neither of these circuits can order both the humbucking and non-humbucking (hum) modes for tone from bright to warm, just one mode and one mode only, by the wiring.

The third level replaces the electro-mechanical switches with program-controlled analog/digital switches, and is necessarily powered, as shown in U.S. Pat. No. 11,011,146, FIG. 9; U.S. Pat. No. 10,380,986, FIGS. 14-17; and U.S. Pat. No. 10,217,450, FIG. 20. Since the power is available, it makes no sense not to use output amplitude compensation. This level allows the string signals for each pickup, or humbucking pair of pickups, or switched outputs to be sampled and transformed into frequency domain spectra, by reversible transforms, such as Fast Fourier Transforms, or FFTs. The FFT spectra for single pickups or humbucking pairs can be combined mathematically, according to the switching, and transformed back into analog signals. If an algorithm exists to decide, from the frequency spectra of the output signals, the order of the tones from bright to warm, then they can be ordered automatically, and the amplitude compensation can be automatically set. If no such algorithm exists, then the system can be programmed to let the musician order tones and set amplitudes to his or her own preference.

U.S. Pat. No. 11,087,731 replaces circuits using electro-mechanical switches almost entirely with powered analog circuits, which linearly combine humbucking pair signals. Each humbucking pair is a simple common-point connection circuit of two matched pickup coils feeding into a fully differential amplifier. The output of that amplifier is the humbucking pair signal. For J number of matched single-coil pickups, there are J−1 number of humbucking pair signals. For example, for matched single-coil pickups A, B & C, there are humbucking pairs (A−B) and (A−C). or (B−A) and (B−C), or (C−A) and (C−B), or their inverse phases. The humbucking pair signals are combined using dual-gang sine-cosine pots, or their approximation, to produce a linear vector combination of the existing humbucking pairs. For example, the humbucking pairs (A−B) and (B−C) can be combined to create an output signal, $Vo=\cos(\theta)(A-B)+\sin(\theta)(B-C)$, for $-\pi\leq\theta\leq\pi$. This produces not only all six possible switched humbucking circuit tones for three such pickups, and their opposite output phases, but all the continuous variation in between. As a practical matter, the only the range $-\pi/2\leq\theta\leq\pi/2$ is used, since sine-cosine pots for the full range could be very expensive.

Like the mechanical switching patents, this invention has three levels of complexity. FIGS. 6, 10-12, 15 and 25 in U.S.

Pat. No. 10,087,731 show the first level, where all the outputs are available, but there is no provision to order the sequence of tones or compensate the output amplitude for phase cancellations. FIGS. 21-23 in U.S. Pat. No. 10,087,731 show the third level of complexity, with a programmable controller driving digital/analog switches and pots, allowing the order of tones and output amplitude compensation to be set as desired. The Non-Provisional patent application Ser. No. 17/363,901 (Baker, 2021 Jun. 30) addresses better sine-cosine pot approximations and shows how custom or digital pots can correct outputs to a constant level despite phase cancellations. This corresponds to the second level in electro-mechanical switching.

Mixing Different Types of Pickups on the Same Guitar—Humbucking Results

Then there's the possibility of mixing pickup types, say 3 matched single-coil pickups with two humbuckers, and combining circuits from other patents in this family of intellectual property. Note from the other patents that for 2 matched single-coil pickups, there is only one basic humbucking tone. The tonal difference between series and parallel circuits comes only from the different impedance loading of external circuits on the pickup circuit; the relative contribution of string signal from each pickup is the same. The non-loaded tone of the two pickups in two fixed positions under the strings is the same for series and parallel circuits.

The relative sizes of the pickups make a difference. If the 3 single-coil pickups are Jazzmasters, then there is no room left between the neck and bridge for other pickups on the size guitar presented in this invention. This may be different on different stringed instruments, like pianos. For 3 single-coil P-90s, there is room for only one of the other pickups presented here, not a Jazzmaster. A single Hofner-style mini-humbucker, or one single-sized humbucker, either with stacked coils or like the M-533, would be appropriate. For 3 single-coil Soapbar pickups, there is room 2 M-533 or Hofner humbuckers, and room for only 1 Vintage humbucker. For 3 standard single-coil pickups, there is room for 3 M-533 or Hofner humbuckers, or 2 Vintage humbuckers, or for either 2 Soapbar or 2 P-90 single-coil pickups.

Three Matched Single-Coil Pickups and One Humbucker

Figure 48A:
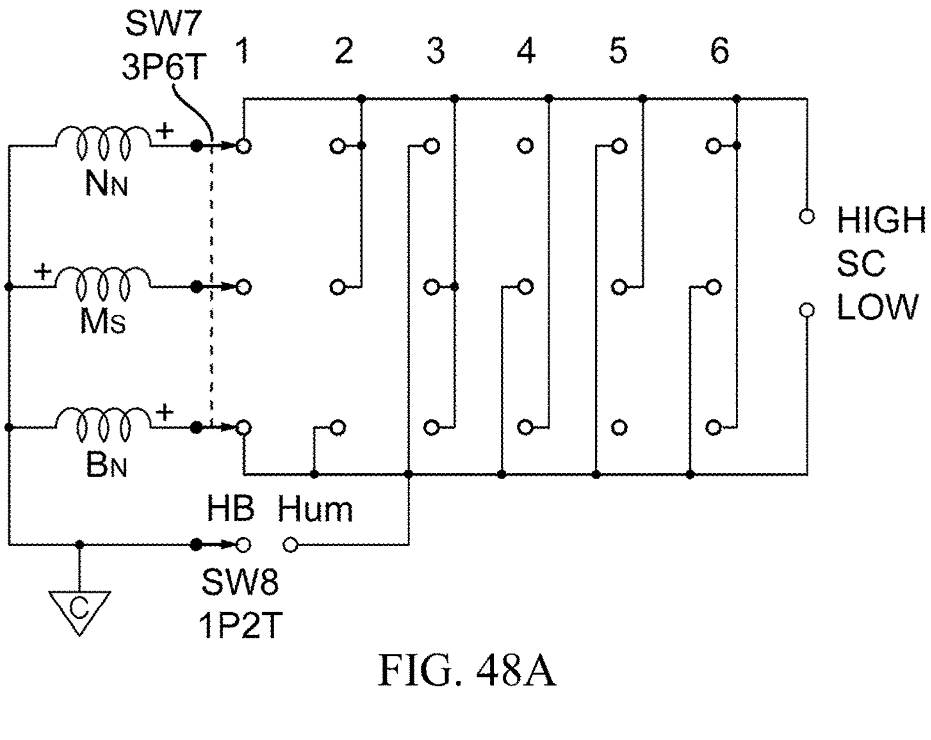
FIG. 48A shows the common-point connection circuit in FIG. 19 as a 12-way switching module for three single-coil pickups, with output SC, with all the tone and volume control removed. The standard pickups for a 3-coil Strat-type guitar are used.

First, we establish the most basic common-point connection circuit for switching three matched single-coil pickups. For simplicity, we delete all tone and volume controls and circuits, leaving only two switches to produce 6 humbucking outputs and 6 non-humbucking outputs, as in FIG. 19. Let it be the standard arrangement of N-up pickups toward the neck and bridge, with a S-up pickup in the middle of those two. Otherwise, we do not say where the single humbucker is placed, because it can be placed in any position above, below or between the three single-coil pickups. FIG. 48A shows that circuit where $N_N$ is a N-up pickup nearest the neck, $B_N$ is a N-up pickups nearest the bridge, and $M_S$ is an S-up pickup in between them. The plus signs on the coils indicate the relative string signal phases. The Triangle-C symbol denotes the common-point connection. Switch SW7 is a 3-pole, 6-throw (generally rotary) switch, with throw connections 1, 2, 3, 4, 5 and 6, with an output SC, which has High and Low terminals. Switch SW8 is a 1-pole, 2-throw switch which sets up the humbucking mode, HB, in the left position, and the non-humbucking mode, Hum, in the right position, by connecting the common-point to the Low SC output. For the HB mode (see also FIG. 5), the throws produce $SC=N_N-B_N$ (1); $SC=(N_N-M_S)/2-B_N$ (2); $SC=(B_N-M_S)/2-N_N$ (3); $SC=B_N+Ms$ (4); $SC=-M_S-N_N$ (5); and $SC=(N_N+B_N)/2+Ms$ (6). For the Hum mode, the pickup(s) connected to the SC Low terminal are shorted out, leaving $SC=N_N$ (1); $SC=(N_N-M_S)/2$ (2); $SC=(B_N-M_S)/2$ (3); $SC=B_N$ (4); $SC=-M_S$ (5) and $SC=(N_N+B_N)/2$ (6). Note that if one makes a mistake in setting this up, one can get two throws with the same single coil pickup in Hum mode. Any other preferred order, for the HB mode or the Hum mode, but not both, can be set by rewiring the switch.

Figure 48B:
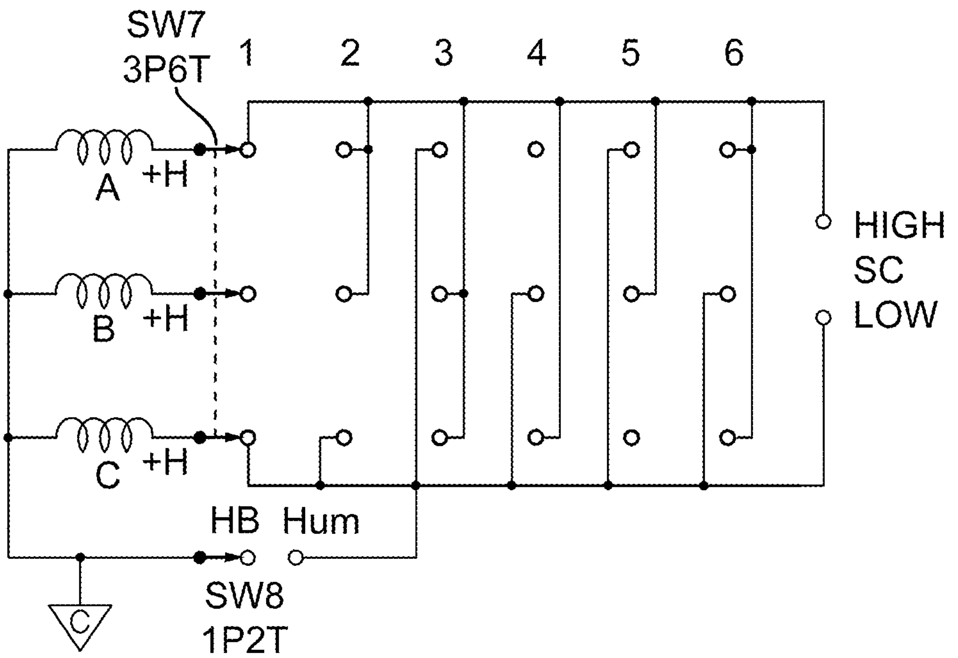

FIG. 48B shows the generic case for three matched single-coil pickups, A, B & C, where only the hum phase is shown (+H). By the convention used here, the signal phase is positive at the +H pickup terminal if the poles are N-up, and negative if it is not. The HB mode produces 6 humbucking outputs: SC=A−C (1); SC=(A+B)/2−C (2); SC=(B+C)/2−A (3); SC=C−B (4); SC=B−A (5); and SC=(A+C)/2−B. The Hum mode produces 6 non-humbucking outputs: SC=A (1); SC=(A+B)/2 (2); SC=(B+C)/2 (3); SC=C (4); and SC=(A+C)/2 (6). If A, B and C have reversible magnets, as in U.S. Pat. No. 10,847,131, or preferably U.S. Pat. No. 10,991,353, then there are four different possible tonalities and four equivalent tonalities of inverse phase. First let A, B & C have poles N, N & N up respectively. If so, then all of the SC outputs for the HB mode will have phase cancellations, and none of the SC outputs for the Hum mode will. The other three basic tonalities come from magnetic polarities of S, N & N; N, S & N; and N, N & S, respectively for A, B & C. The complementary tonalities with reversed phase outputs at SC are, respectively: S, S & S; N, S & S; S, N & S; and S, S & N. Consider for example HB mode for throw 1; If A & C have poles up N, N; S, S; N, S; and S, N, the respective SC outputs will be: A−C, −A+C, A+C, and −A−C. But no change in the pole of pickup B will have any effect on throw 1. And unless a nonlinearity follows the SC outputs, then A+C will sound the same as −A−C, and A−C will sound the same as C−A. So reversing the magnetic poles of J number of matched single-coil pickups with produce $2^{J-1}$ number of tonalities with another $2^{J-1}$ number of complementary tonalities of reversed output polarity at SC. If one writes out all the possible circuits for pole reversals, one will see that all the tonalities share some of the same tones among the 6 HB mode tones and among the 6 Hum mode tones. But each tonality will be at least partially different. With amplitude compensation for phase cancellations in more complex powered circuitry, at least some of the tones with phase cancellation will be found useful.

Figure 49A:
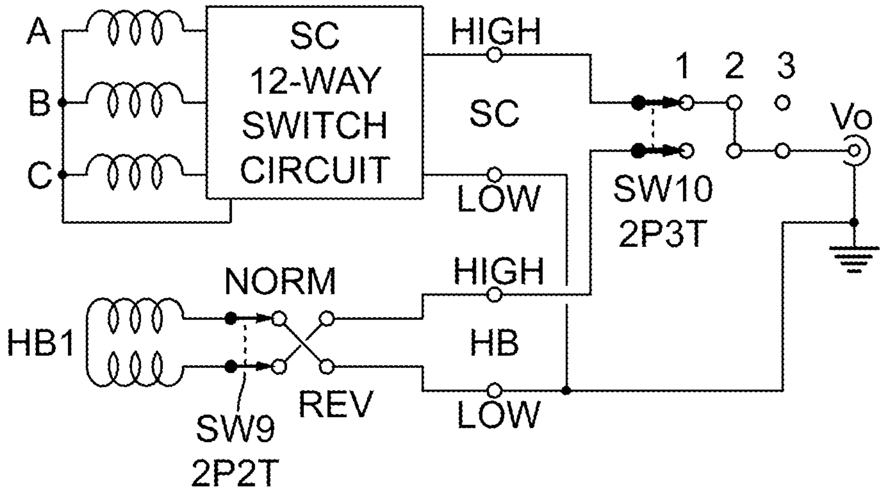
FIG. 49A shows three coils with a 12-way switching module and output SC, combined with a single humbucker which has a reversing switch, using a standard 3-way switch depicted as a 2-pole 3-throw switch.

There are at least two different ways to combine the 3-coil SC output with a single humbucker, HB1, to get Vo=SC, HB1, SC+HB1 and SC−HB1, so that the output remains humbucking when the SC circuit is in HB mode. FIG. 49A shows FIG. 48B reduced to three coils, A, B & C, and a box, "SC 12-WAY SWITCH CIRCUIT", with the same SC-HIGH and SC-LOW output terminals. Consider that the plus-sign, +H, conventions still hold. It includes a humbucking pickup (HB1) with a 2P2T reversing switch (SW9), without output terminals HB-HIGH and HB-LOW. The LOW terminals of both SC and HB are connected to the output ground. The HIGH terminals are connected to a 2P3T switch (SW10) which duplicates the function of the mechanically-different standard 3-way switched often used on a guitar with two humbuckers. The standard 3-way switch can be used instead; it's just simpler to draw this way. SW10 had three states which produce the outputs: Vo=SC (1); Vo=SC||HB (parallel) (2); and Vo=HB.

If an actual 2P3T switch is used, these outputs can be reordered by perceived tone from bright to warm, if that can exist consistently with a 12-way SC switching circuit and a reversing switch (SW9). Ignoring phase differences due merely to reversing the phase of the output, Vo, the number of humbucking tone circuits generated for the SC circuit in HB mode will be SC→6; HB→1; SC||(+HB1)→6; and SC||(−HB1)→6, for a total of 19. The number of non-humbucking tone circuits for the SC circuit in Hum mode will be SC→6; SC||(+HB1)→6; and SC||(−HB1)→6, for a total of 18. So by adding one reversible humbucker to three matched single-coil pickups, the number of possible tone circuits increases from 12 to 37. Again, many of these tones will bunch at the warm end, and the tones with phase cancellations may be weak and tinny without amplitude compensation and tone controls, which have been left off for simplicity of understanding. If non-symmetrical non-linear distortion circuits or amplifiers are to be used after Vo, then a phase reversing switch just before Vo (as shown in FIG. 21) may be useful, possibly doubling the number of perceived tones. But this is subject to trial and demonstration; some of the tones may sound much the same, with or without distortion, especially at the warm end.

Figure 49B:
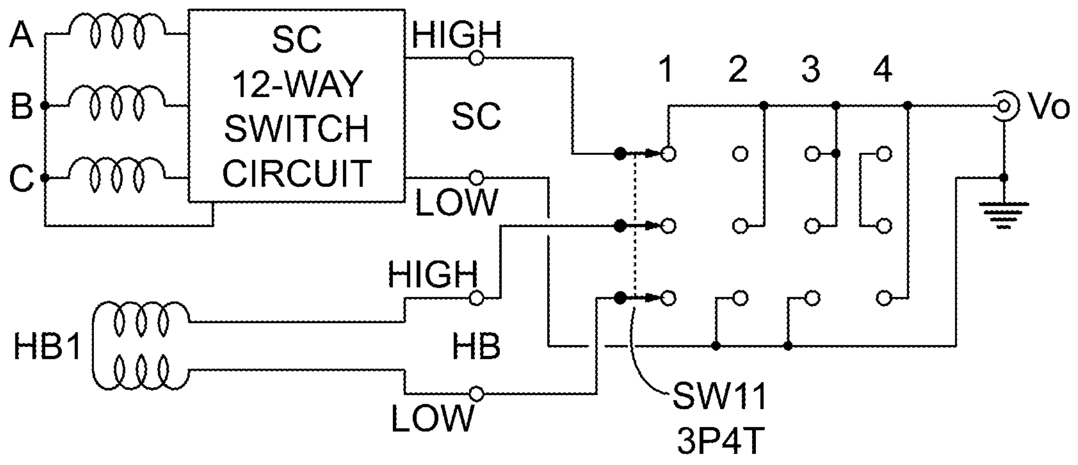
FIG. 49B shows the same pickups where the humbucker (output HB) does not have a reversing switch, that function being taken by a 3-pole 4-throw, 4-way switching module that combines it with SC, producing output Vo=SC, HB, SC+HB or SC−HB.

FIG. 49B shows a slightly different and possibly preferable circuit embodiment, leaving off the reversing switch (SW9) on the single humbucker (HB1), and moving that function to the switch (SW11) which replaces SW10. The 3-pole 4-throw switch, SW11, produces these outputs at Vo: Vo=SC (1); Vo=HB (2); Vo=SC+HB (3, parallel); and Vo=SC−HB (4, series). This circuit may be preferable because, depending on the phase cancellations between the 12 circuits of SC and the single pickup output of HB, either SC+HB and SC−HB can be wired as series or parallel connections on the switch. Also, there may be less confusion in switching. At the second throw of SW11, where Vo=HB, the switching in the 12-way SC circuit has no effect. In FIG. 49A, the reversing switch, SW9, has no effect at the first throw of SW10, when Vo=SC, and the SC switches have no effect in the third throw.

Three Matched Single-Coil Pickups and Two Humbuckers

Figure 50:
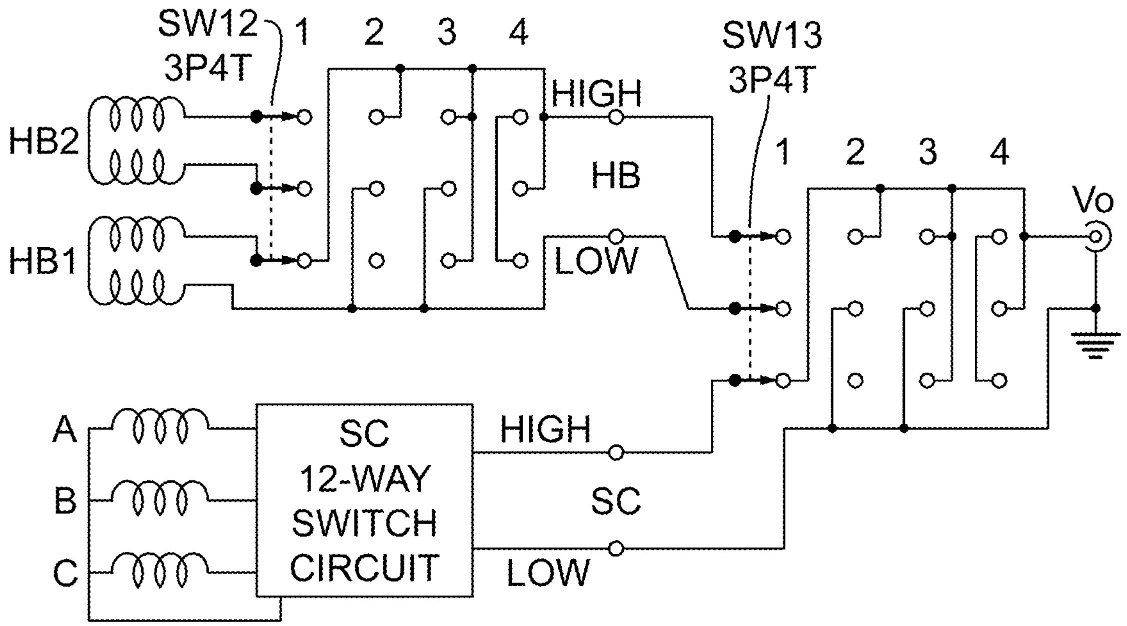
FIG. 50 shows two humbuckers connected to a 4-way switching module with output HB=HB1, HB2, HB1+HB2 or HB1−HB2, and three single-coil pickups connected to a 12-way switching module with output SC, and SC and HB connected in cascade to a second 4-way switching module, with output Vo=SC, HB, SC+HB or SC−HB.

If we use three single-coil Soapbar pickups or three Strat-type single-coil pickups, there is room to add two Hofner-style humbuckers, or two M-533 humbuckers, or two single-sized humbuckers with stacked coils. The 12-way SC circuit in FIG. 48B still applies, and a 3P4T switch like SW11 in FIG. 49B can switch two humbuckers, HB1 and HB2 to produce an output: HB=HB1 (1); HB=HB2 (2); HB=HB1+HB2 (3); and HB=HB1−HB2 (4). FIG. 50 shows this circuit, SW12. Either of HB1+HB2 and HB1−HB2 can be wired in parallel or series. Then the SC and HB outputs can be combined with another 3P4T switch (SW13), producing: Vo=SC (1); Vo=HB (2); Vo=SC+HB (3); and Vo=SC−HB (4). The pickups and components have been moved in position from those in FIG. 49B to make the wire lines flow better. Notice that on both SW12 and SW13, the LOW output of one terminal of one humbucking pickup (HB1), or the SC-LOW output, bypasses the switch to its Low output terminal. In this way, the 3P4T switch becomes a circuit module, which can be used multiple places in the system, depending on how many pickups are used. But the neither the switching order nor the series/parallel connections are set by these Figures; they must be determined in practice.

For just two humbucking pickups, there is no need for reversing switches to simulate magnet pole reversals in single-coil pickups. Phase reversing switches on HB1 and HB2 would produce in the output of the switched set HB: +HB1, −HB1, +HB2, −HB2, +HB1+HB2, +HB1−HB2, −HB1+HB2 and −HB1−HB2. In regard to the output phase of the switched set SC, SC+HB and SC−HB produce all the same combinations as would phase reversing switches on HB1 and HB2.

This system can produce 58 humbucking circuit signals at Vout. For SC alone, there are 6 humbucking circuits; for HB alone, there are 4 humbucking circuits; for SC+HB there are 24 circuits; and for SC−HB there another 24 circuits. Or 6+4+24+24=58. For the 6 non-humbucking outputs of SC, there are SC→6; SC+HB→24; and SC−HB→24; for a total of 54 circuits with possible hum. This makes a total of 112 tonal circuits from these five pickups. Adding one more humbucker adds one more 3P4T switch and raises the total number of circuits from 37 to 112, a factor of 3.03. Note that 12:37:112→1:3.08:9.33. Even with a more limited set of common-point connection circuits, which is a subset of all possible series-parallel pickup circuits, adding pickups tends to increase the number of possible circuits geometrically (also explained farther below).

Two Jazzmasters, JM1 & JM2, and One Humbucker, HB1

The switching of the Jazzmasters can be set up in two different ways: 1) connect the Jazzmasters, JM1 & JM2, together and use them as a humbucking pair, JHB, for input into a 3P4T switch (like SW12 in FIG. 50); or 2) use an additional 3P4T switch to produce the outputs, JM1, JM2, JM1+JM2 and JM1−JM2, only one of which can be humbucking. One Jazzmaster coil and magnet core can be reversed to S-up to make an in-phase humbucking pair with an N-up Jazzmaster in either circuit. Or two N-up Jazzmasters make an out-of-phase humbucking pair. If the first option is chosen, then either Vo=JHB, HB1, HB1+JHB or HB1−JHB, or Vo=HB1, JHB, HB1+JHB or HB1−JHB, giving four humbucking outputs. If the second option is chosen, then there is first a 3P4T switched single-coil output, SC=JM1, JM2, JM1+JM2 and either JM1−JM2 or JM2−JM1, depending on wiring. Then a second 3P4T switch (like SW13 in FIG. 50) produces the output, Vo=SC, HB1, SC+HB1, and SC−HB1 or HB1−SC, giving 4+1+4*1+4*1=13 outputs, of which 3 are fully humbucking. Either way, depending on the size of the humbucker, there are three ways to place one humbucker among two Jazzmasters, and sometimes enough room left over to vary positions of all three between the neck and bridge. Then, there is the possible influence of interacting magnetic fields between the pickups. This could offer a lot more variation in tone for an electric Jazz guitar.

Three Matched Single-Coil Pickups, A, B & C, and Two Matched Single-Coil Pickups, D & E, of Another Type This can work exactly the same as three single-coils and a single humbucker, producing 37 different circuits for output, if the added pair of different single-coil pickups are connected as a humbucking pair, like FIG. 49B, without switching each into the circuit separately. Otherwise, a circuit much like FIG. 50 can be used, left as an exercise for the reader. Say that the first three single-coil pickup, A, B & C, are of one type, say Soapbar pickups, and single-coil pickups D & E are of the another type, say Strat-type pickups. Let the switching circuit be the same for A, B & C as in FIG. 48B, with 6 HB mode outputs and 6 Hum mode outputs, called SC1. Let the switching circuit for pickups D & E provide outputs of SC2=D, E, D+E and D-E, where only one of D+E or D-E, depending on the poles up, can be humbucking. The other three choices are non-humbucking. Let a switching circuit like SW13 in FIG. 50 produce outputs: Vo=SC1, SC2, SC1+SC2 and SC1−SC2. Say that D and E have opposite poles up, so that D+E (either serial or parallel) is humbucking. For SC1 in HB mode, the humbucking outputs are: SC1→6, SC2→1, SC1+SC2→6*1 and SC1−SC2→6*1, or 19 outputs. For SC1 in Hum mode, the non-humbucking outputs are: SC1→6, SC2→3, SC1+SC2→6*3 and SC1−SC2→6*3, or 45 outputs, for a total of 19+45=64 outputs, the majority of which have hum. You pays your money and takes your choice.

Figure 51A:
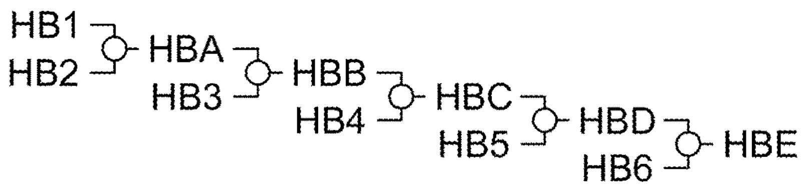
FIG. 51A shows humbuckers HB1-6 connected in cascade to each other through 4-way switching modules HBA-E, producing an output HBE with 364 different pickup circuits.

Cascading 4-Way Switching Modules for any Number of Humbuckers that Fit in the Space As FIG. 50 shows, the 3P4T switch used in SW12 and SW13 is a module that can be cascaded to any depth. FIG. 51A shows five 3P4T switches reduced to a symbol with circle and three lines, indicating that the two inputs to the left are combined to produce the output on the left. Five switches with outputs HBA, HBB, . . . , HBE combine six humbuckers, HB1, HB2, . . . , HB6. Maths 4A-4E show the resulting number of circuit combinations.

$$HBA=HB1,HB2,HB1+HB2,HB1-HB2\rightarrow 4 \quad \text{Math 4A:}$$

$$HBB=HBA,HB3,HBA+HB3,HBA-HB3\rightarrow 4+1+4\cdot 1+4\cdot 1=13 \quad \text{Math 4B:}$$

$$HBC=HBB,HB4,HBB+HB4,HBB-HB4\rightarrow 13+1+134+13\cdot 1=40 \quad \text{Math 4C:}$$

$$HBD=HBC,HB5,HBC+HB5,HBC-HB5\ 40+1+40\cdot 1+40\cdot 1=121 \quad \text{Math 4D:}$$

$$HBE=HBD,HB6,HBD+HB6,HBD-HB6\rightarrow 121+1+121\cdot 1+121\cdot 1=364 \quad \text{Math 4E:}$$

Figure 51B:
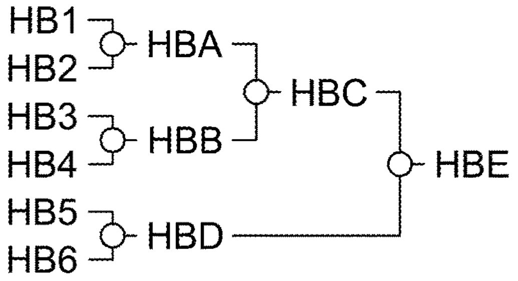
FIG. 51B shows the same pickups and switching modules connected in a tree pattern, producing exactly the same number of different outputs.

FIG. 51B shows a different embodiment, with a the tree of combinations, which produces exactly the same results at HBA, HBC and HBE, with the same number of switches, as demonstrated in Maths 5A-5E.

$$HBA=HB1,HB2,HB1+HB2,HB1-HB2\rightarrow 4 \quad \text{Math 5A:}$$

$$HBB=HB3,HB4,HB3+HB4,HB3-HB4\rightarrow 4 \quad \text{Math 5B:}$$

$$HBC=HBA,HBB,HBA+HBB,HBA-HBB\rightarrow 4+4+4\cdot 4+4\cdot 4=40 \quad \text{Math 5C:}$$

$$HBD=HB5,HB6,HB5+HB6,HB5-HB6\rightarrow 4 \quad \text{Math 5D:}$$

$$HBE=HBC,HBD,HBC+HBD,HBC-HBD\rightarrow 40+4+40\cdot 4+40\cdot 4=364 \quad \text{Math 5E:}$$

$$J\geq 2,\quad N_2=4,\quad N_{J+1}=3N_J+1;\quad N_J=4,13,40,121,364,1093,\ldots \quad \text{Math 6:}$$

Math 6 defines the number of outputs using this modular switching system for J>1 number of humbuckers. And in this case, the humbuckers, being humbuckers, don't all have to be the same type. Different types of humbuckers can be put in any position under the strings to get different tonal effects. One strategy might be to put larger humbuckers towards the neck, and smaller humbuckers near the bridge, to take advantage of the fact that virtual fret positions decrease in separation the closer they get to the bridge, indication faster changes in higher harmonics.

Figure 52:
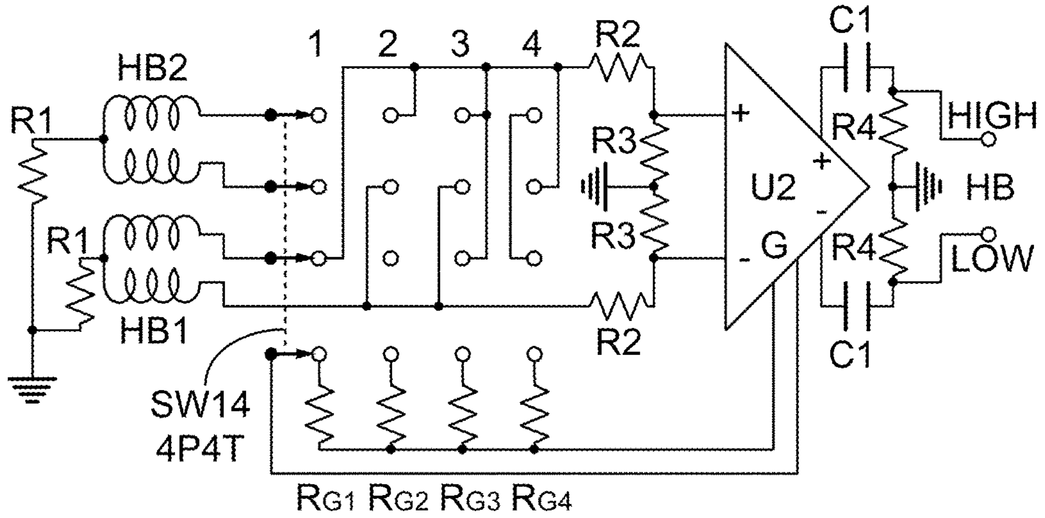
FIG. 52 shows the 4-way switching module with a 4-pole 4-throw switch and a fully differential amplifier, capable of being substituted for the previous 4-way switching modules, that allows exact output amplitude compensation for different switch output levels due to phase cancellations.

Compensating Output Amplitude for Phase Cancellations in 4-Way & 12-Way Modular Switching If the number and types of pickups and their positions under the strings are fixed, then it is possible to compensate for output amplitude variations due to phase cancellations and other causes, by adding one more pole to the switching modules. FIG. 52 shows a switching module in which switch SW12 in FIG. 50 is replaced with a 4-pole, 4-throw switch (SW14), with added circuits to adjust the output amplitude (HB). Tone-capacitor circuits have been left out. Resistors with the same designation (R1, R1; R2, R2; R3, R3; R4, R4) have the same value. The fourth pole of SW14 switches gain resistors $R_{G1}$, $R_{G2}$, $R_{G3}$ and $R_{G4}$ to adjust the gain of the fully differential powered amplifier, U2. The differential amplifier can be one of several varieties, including a single solid-state device made to be fully differential, or a combination of separate operational amplifiers (op-amps) configured to be fully differential. Single devices with a separate external gain-setting resistor tend to have a base gain of 2, which the presence of a gain resistor can increase. But as modules are cascaded, as in FIGS. 51A-B, a module gain of greater than 1 can easily cause the output signal to clip near the power supply limits, distorting the signal. Therefore the optional voltage divider made of R2 and R3 can reduce the overall gain to back to 1. The total resistance of R2+R3 should be at least ten times greater that the combined series impedance of HB1+HB2 to avoid loading effects on the tone. By intention, this circuit creates a relatively constant signal level at the output (HB), regardless of phase cancellations.

Every signal needs to have a reference to signal ground. The resistors R1 & R4 are optional DC-level bleeder resistors, of values from 1 to 10 Meg-ohms, which provide that reference with minimal effect on the signal and tone. They also imply that the active circuit component, U2, has a split power supply with equal positive and negative inputs. The circuit about U5 in FIG. 36 in U.S. Pat. No. 9,401,134 shows how to do this with one battery, using one op-amp as a ground-driver. Cascading amplifiers can also have the effect of multiplying the input DC-offset voltage of each amplifier through the subsequent amplifiers, until the signal is pushed into clipping against the power supply limits. The option DC-blocking capacitors, C1, are the common solution to this problem. When this circuit is used as the module HBC or HBE in FIG. 51B, the poles of SW14 are obviously connected to other modules, HBA & HBD for HBC and HBC and HBD for HBE, instead of humbuckers HB1 & HB2.

Clearly, the 12-way switching circuit for three matched single-coil pickups in FIG. 11 can be adapted to a differential amplifier output in the same was as FIG. 52 did for FIG. 50. For both 4-way and 12-way switching circuits with fully-differential outputs and amplitude compensation, the feedback resistors cannot be fixed until the pickup types and their positions both under the strings and in the circuit are also fixed. Therefore, the circuits may need to begin with variable gain resistors, such as 10-turn or 20-turn miniature pots. One possible way around this is to predict the output responses by testing the pickups in place by making a spectral analysis of each pickup signal, with such methods as Fast-Fourier Transforms or FFT. The inverse transforms of the combined spectra then predict the output signals, from which the necessary gain resistors can be calculated.

Humbucking Modules without Electro-Mechanical Switches

Figure 53:
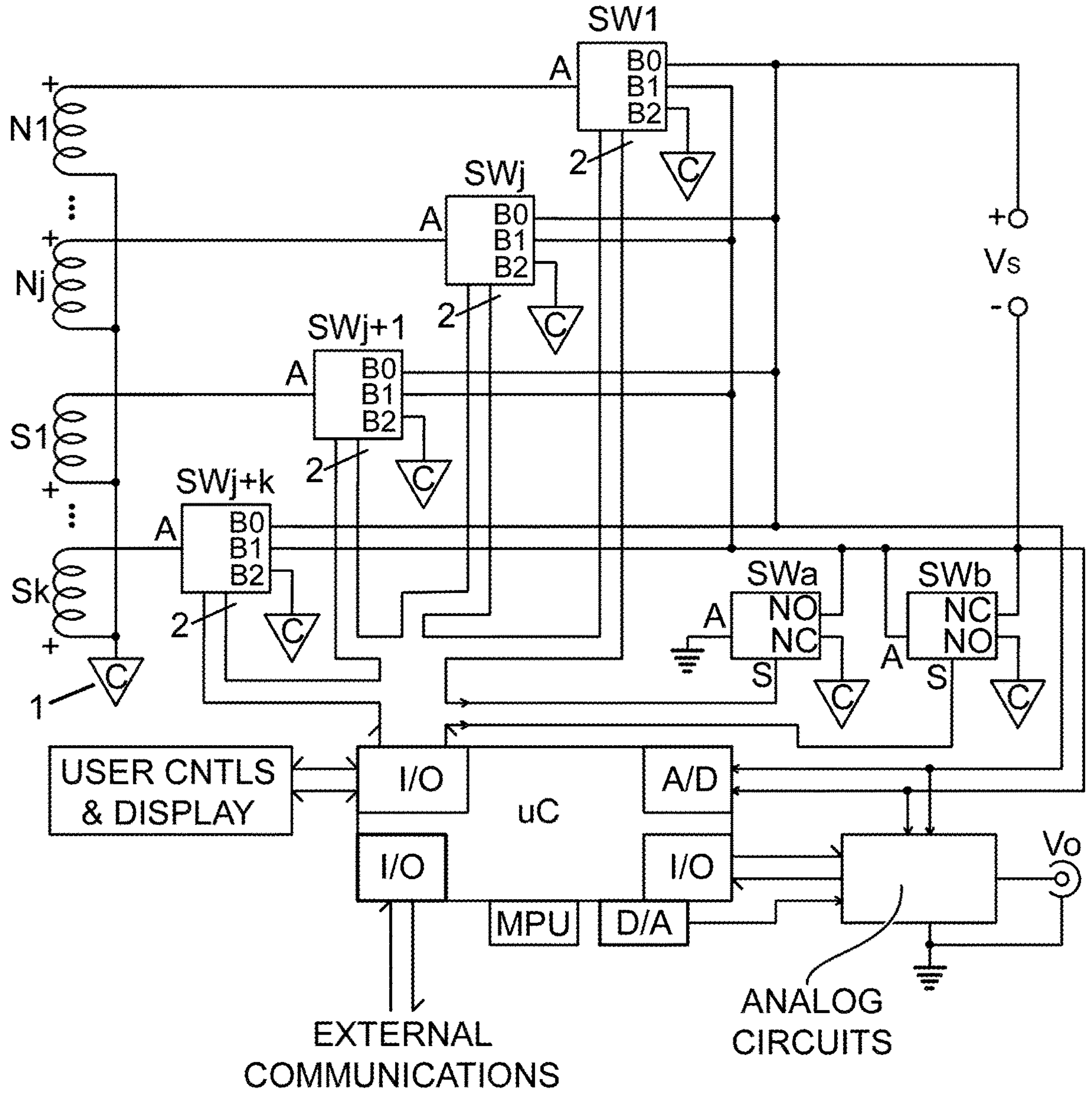
RELATED ART FIG. 53
FIG. 53 shows related art, FIG. 17 from U.S. Pat. No. 10,380,986, a programmable system for digitally switching any number of matched single-coil pickups, using the common-point connection system approach. It can be used to replace the 12-ways switching system in FIG. 11, or to use humbucking pickups of the same type, with the center tap connected to the common point (triangle-C), which effectively replaces the 4-way switching system of FIG. 52.

FIG. 53 shows related art, FIG. 17 from U.S. Pat. No. 10,380,986, a programmable system for digitally switching any number of matched single-coil pickups, using the common-point connection system approach. It can be used to replace the 12-ways switching system in FIG. 11, or to use humbucking pickups of the same type, with the center tap connected to the common point (triangle-C), which effectively replaces the 4-way switching system of FIG. 52. It can be made into cascading modules, each with a differential amplifier output, as in FIG. 52, all controlled by the same micro-controller, and cascaded, as in FIGS. 51A-B. The digitally-controlled switching circuit in FIG. 9 in U.S. Pat. No. 11,011,146 is more directly related to the 4-way humbucker switching system in FIGS. 52 and 49A, connecting humbuckers with reversing switches together. This can also be adapted to a cascading module.

Figure 54:
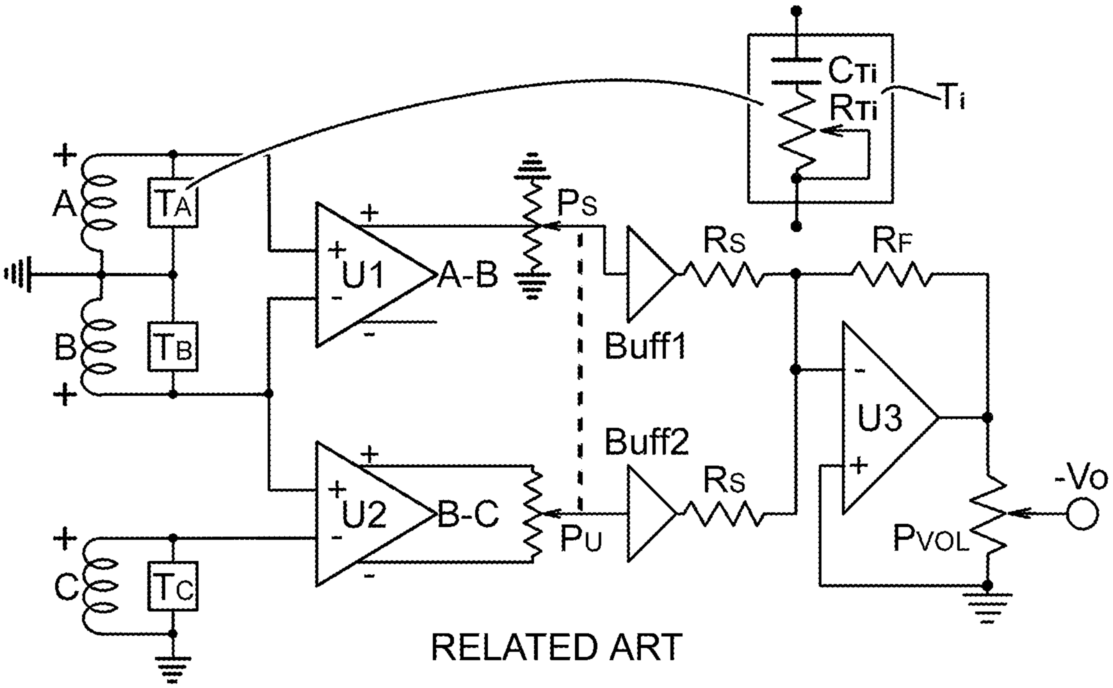
FIG. 54 shows related art, FIG. 25 from U.S. Pat. No. 11,087,731, which makes humbucking pairs of three matched single-coil pickups, and linearly combines the humbucking pair signals with sine-cosine gangs on one pot. Without gain compensation, it effectively replaces the 6-humbucking mode of the switching system in FIG. 19.

FIG. 54 shows related art, FIG. 25 from U.S. Pat. No. 11,087,731, which makes humbucking pairs of three matched single-coil pickups, A-B and B-C, with the plus signs indicating hum polarity, and linearly combines the humbucking pair signals with sine-cosine gangs on one pot. Without gain compensation, it effectively replaces the 12-way switching system in FIG. 19, but omits the 6 non-humbucking tones. It produces not only all the six switched humbucking tones in FIG. 19, but all of the continuous variations in between. Ser. No. 17,363,901 takes that farther by disclosing a method of amplitude compensation for the analog outputs corresponding to switched outputs. FIGS. 21-23 in U.S. Pat. No. 11,087,731 disclose programmable control for humbucking pair building blocks, or modules, which allows spectral analysis of signals to compensate for amplitude variations due to phase cancellations.

Figure 55:
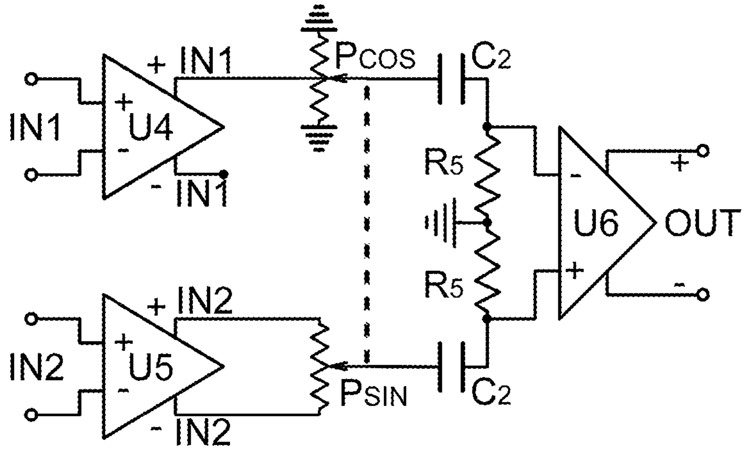
FIG. 55 shows how FIG. 54 can be adapted to an analog replacement for SW12 and SW13 in FIG. 50, to make an analog humbucking pair mixing module, which can be used in FIGS. 51A&B.

FIG. 55 shows a humbucking module, which can be used in FIGS. 51A-B, using three fully differential amplifiers, U4, U5 & U6. Differential amplifiers U4 & U5 should have very high input impedance, to avoid loading any attached pickups and thus affecting the signal amplitude and tone. They must each have gains of 2, to produce full-amplitude signals at their plus output terminals and inverted full-output signals at their minus output terminals. The output of U4, +IN1, goes to the center tap input of a half-cosine pot, $P_{COS}$, which is ganged on the same shaft with a half-sine pot, $P_{SIN}$. Over the range of the pot rotation, $P_{COS}=\cos(0)$ and $P_{SIN}=\sin(\theta)$, with $-\pi/2\leq\theta$ $\pi/2$. So the output of $P_{COS}$ is 0 to +IN1 to 0, and the output of $P_{SIN}$ is −IN2 to 0 to +IN2. The output describes a half-circle in the plane of (IN1,IN2). The optional blocking capacitors, $C_2$, and optional high-value (>450k) ground reference resistors, $R_5$, reduce any effects of input offset voltages from U4 & U5. U6 should preferably have a high input impedance, but this is less critical than for U4 & U5. The gain of U6 can be either 1, or preferably, digitally-controlled to compensate for phase cancellations between IN1 and IN2. Either way, the output produced by the gain cannot clip against the power supply levels in any of the differential amplifiers.

Figure 56A:
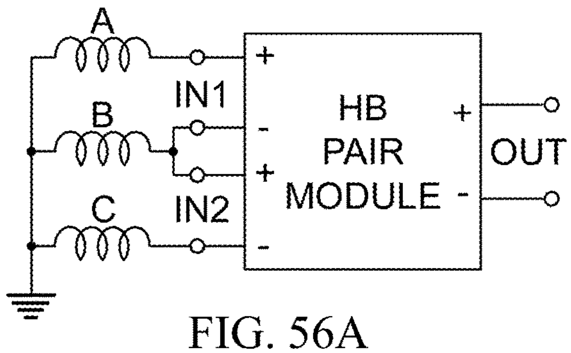
FIG. 56A shows it works with three matched single-coil pickups, A, B & C.

FIG. 56A shows how the humbucking module in FIG. 55 is used with three matched, single-coil pickups, A, B & C. With 3 matched single-coil pickups, as shown in FIG. 56A, the 6 humbucking switched tones can be produced, plus all the continuous variations in between.

Figure 56B:
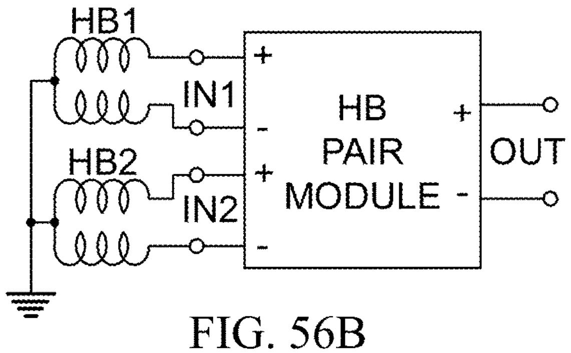
FIG. 56B shows how it works with two humbucking pickups, HB1 & HB2. The fully-differential amplifiers shown are not necessarily single chips, and can be each constructed from two or more operational amplifiers.

But the 6 non-humbucking tones will be absent. FIG. 56B shows how it is used with two humbucking pickups, HB1 & HB2. FIG. 56B can reproduce all 4 switched humbucking tones from SW12, FIG. 50, plus all the continuous variations in between. This continuous-tone humbucking module can be cascaded as in FIGS. 51A&B. Different types of humbucking pickups can be salted throughout the cascade. In doing so, the differential output of the humbucking module in FIG. 55 improves on the comparable module, or humbucking building block, disclosed in U.S. Pat. No. 11,087,731, where means of cascading modules was less clear.

Doing it without Mounting Slots

Figure 57:
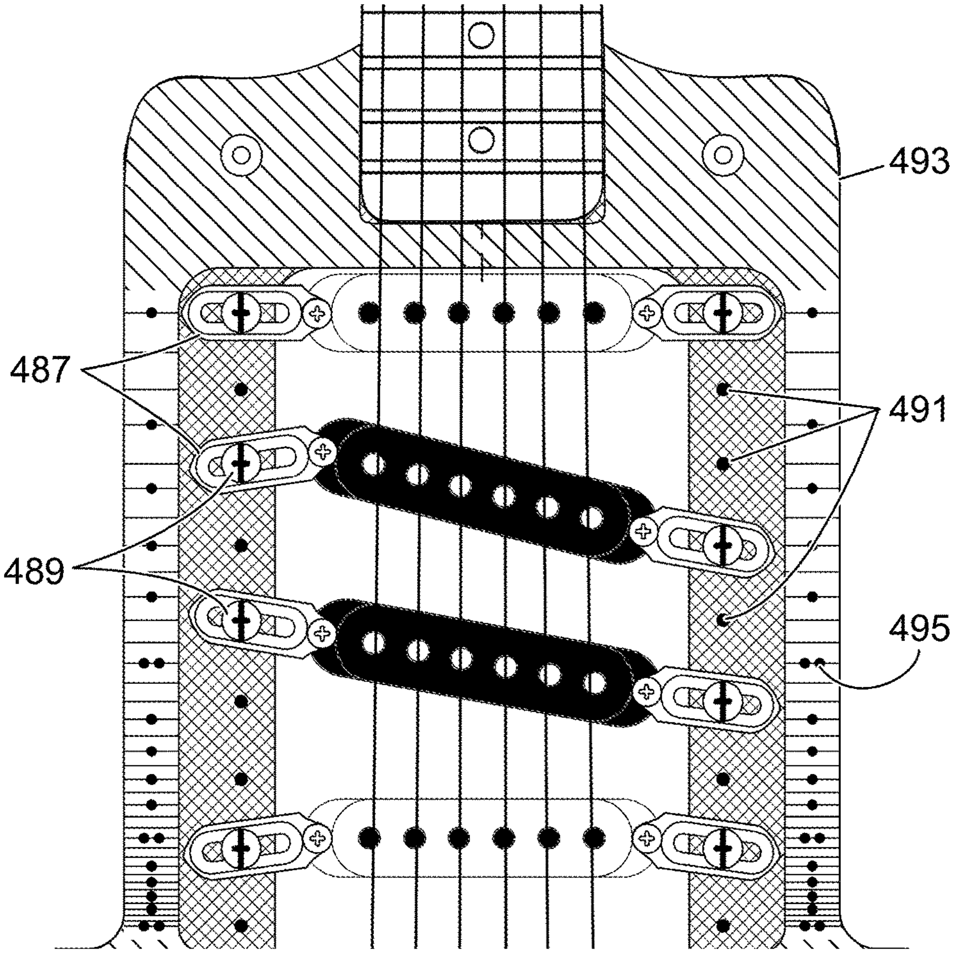
FIG. 57 RELATED ART
FIG. 57 shows related art, an excerpt of a version of FIG. 1 in U.S. Pat. No. 9,401,134, where the mounting channels with captured sliding mounting nuts, for moving pickups, have been replaced with fixed and threaded holes in the guitar body. This is comparable to having fixed and threaded holes in the top plates of this invention, instead of the mounting slots and T-nuts used in FIG. 47.

FIG. 57 shows an excerpt of a version of FIG. 1 in U.S. Pat. No. 9,401,134, disclosing a different embodiment of that invention, where the mounting channel is eliminated and the mounting plates (487) are screwed (489) directly to fixed holes (491) in a skeleton body (493), similar to the upper body profile in this invention. Note the extension of the fret scale (495) on both sides of the upper body to help with placing the pickups, and that the mounting holes (491) line up with divisions on the scale. It can be easier to adjust the pickup positions without having sliding nuts in mounting channels sliding around. In this invention, it is also possible to create a similar number (9 to 15) fixed and threaded mount points in the top plates, then screw slotted, adjustable mounting plates to them, and hang the pickups from those adjustable mounting plates. If the top plate material is tough enough, it can be threaded directly, otherwise threaded inserts, or T-nuts, can be embedded in it. The same extended fret scale (495) can be reproduced on the top plates of this invention.

Notes in Conclusion about Useful Tones

Are these greatly increased number of pickup circuit outputs necessarily going to produce tones which are all distinct and useful? No. The more pickups in the circuit, the more the tones tend to bunch at the warm end, and to be less distinguishable. Phase cancellations between the pickups will cause decreases in signal amplitude, making some tones sound weak and tinny. Further, there is no mechanical switching system that can order all the tones from warm to bright. They will be mixed. They cannot be ordered monotonically from perceived warm to bright tones without analog-digital switching and micro-processor or micro-controller programming. But with amplitude compensation for phase cancellations, it is possible that formerly weak and tinny tones may become useful as super-bright and cutting.

I hereby claim:

1. An electric stringed instrument, comprised of:

a. a body with one or more hollow spaces under removable top plates and bottom plates covering said hollow or hollows, with a system of mounting one or more types of electromagnetic pickups, mounted between said top plates and movable under the strings, in a sound hole between the neck and bridge and between said top plates, said top plates having mounting slots running in the direction from neck to bridge adjacent to said sound hole, to which said pickups are mounted by a system of adapters specific to each type of pickup, with said top plates sized near said sound hole according to each type of pickup; and b. a system of electronic circuits to choose among all the possible humbucking tones from combinations of said pickups, including some non-humbucking tones when said types of pickups include matched single-coil pickups, said circuits both including and advancing related art from the family of inventions and patents that include this invention, that said system of electronic circuits are specifically of two types with three levels of complexity, all of which can be interconnected in cascade or tree form to produce a single output, either differential or single-ended with the low terminal grounded, including:

i. a first type of circuit using switches, with:

1. a first level of complexity, which uses electro-mechanical switches to connect one or more pickups into circuits connected to an output; and
2. a second level of complexity, which include the first level and at least partially compensates for amplitude variations at the output, due to signal strength differences and phase cancellations between pickup signals; and
3. a third level of complexity, which replaces electro-mechanical switches with digitally-controlled solid state switches, including a programmable device to control them, and digitally-controlled analog circuits to provide amplitude compensation to the output, and programming to set the order of tones being switched according to some user-preferred and controllable sequence between bright and warm tones; and ii. a second type of circuit using analog circuits based on humbucking pairs, with 1. a first level of complexity, which linearly combines humbucking pair signals in a curved path through the humbucking pair signal space, which does not pass over itself or its inverse output to produce duplicate tones; and 2. a second level of complexity, which includes the first level and at least partially compensates for amplitude variations at the output, due to signal strength differences and phase cancellations between pickup signals; and 3. a third level of complexity, which replaces manual controls in the first two levels with digital switches and potentiometers, controlled by a programmable device, to automatically compensate amplitude variations at the output, and by programming to set the order of tones being switched according to some user-preferred and controllable sequence between bright and warm tones.

2. The invention as recited in claim 1, wherein the body has an internal backbone underneath, and not interfering with, said pickups, extending from the neck to the bridge, with ribs arcing away from said backbone, forming the left, right and bottom boundaries of the body, leaving hollow spaces between said ribs and said backbone, said ribs being the base upon which said removable top and bottom plates are attached by ordinary means, said backbone being of one of four types:

a. a first type of backbone with a flat bottom coinciding with the flat bottoms of said ribs, covered by a single bottom plate which fits over or into the entire bottom of said body; or b. a second type of backbone with a bottom coinciding with the bottoms of said ribs, with a reinforcement made of strong and rigid material, extending below the bottoms of said ribs, said reinforcement covering part of the width of said backbone, leaving strips on each side running from neck to bridge for the attachment of two bottom plates, each of which covers the ribs and hollows of each side of said body; or c. a third type of backbone with a reinforcement made of strong and rigid material, with a dado cut on each side of said backbone reinforcement, running from the neck towards the bridge, cut to accept as inlays the edges of each of two bottom plates, said reinforcement extending below said ribs at the right and left side bottom vertical limits of said ribs at the point farthest away from said backbone, which ribs have curvilinear wedge-shaped bottoms, where said wedge gets thicker towards said backbone and reinforcement, coincident with said reinforcement at said backbone, which bottom plates are attached by ordinary means to the hollow-side dadoes of said backbone reinforcement on one side, and to the bottoms of the curvilinear ribs, said ribs and backbone reinforcement and said bottom plates giving the back of said stringed instrument a convex shape across its width, with no protrusions uncomfortable to the body of a user; and d. a fourth type of backbone reinforcement, like the third type, but with no dado cuts, said bottom plate being a single curved piece covering the entire back of said stringed instrument, and either permanently fixed in place, as is current custom for hollow-body instruments, or removable.

3. The invention as recited in claim 1, wherein said top plates are sized to fit the widest type of pickup, in a given set of pickups with which they will be used, and each type of pickup has a specialized adapter to mate its usual mounting method with said mounting slots in said top plates, with mounting screws passing down through top washers above said top plates, then through said mounting slots, then through said adapters attached to said pickups, including:

a. for pickups normally meant to be mounted directly to a guitar body, with no mounting tabs on their ends, a non-magnetic mounting plate covering the entire bottom of said pickup, to which said pickup is mounted by its usual means, said mounting plate extending beyond the length of said pickup with one or more mounting holes at each end, aligned with said mounting slots, into which mounting screws are threaded, passing through said mounting slots, with heads above said top plates, and clamping said pickup and mounting plate to said top plate via said mounting slots by several alternative means, including:

i. a spacer of fixed height, between said mounting plate and the bottom of said top plate, with or without tabs or pegs extending into said mounting slot to keep it aligned with said slot; or ii. a spacer of fixed height, between said mounting plate and the bottom of said top plate, with tabs or pegs extending into said mounting slot to keep it aligned with said slot, with said spacer longer in the direction of said mounting slot than wide across it, so as to minimize any tilt of said pickup along said strings; or iii. one or more springs between said mounting plate and said top plate, surrounding said mounting screws, with either enough tension to keep said pickup in place against external bumps; or iv. one or more springs between said mounting plate and said top plate, surrounding said mounting screws, with said pickup fixed in place in said slot with one or more non-magnetic T-nuts in each said mounting slot, with short mounting screws passing through holes in said top washers, through said slot, and into said T-nuts, said T-nuts having a rectangular vertical extension into said slot, a flange at the bottom wider than said slot, and one or more threaded holes for said mounting screws, passing entirely through each said T-nut, so that when said short mounting screws are tightened on said T-nuts, the resulting pressure clamps said top washers to said top, removing the need for spring pressure to hold said pickups in place; or v. no spacer or spring between said mounting plate and said top plates, with said mounting plate fixed by said mounting screws and top washer directly to said top plates; and b. for pickups with mounting tabs on their ends, but non-adjustable poles, normally meant to be mounted with springs and screws to pickguards for height adjustment at each end or in a pickup ring, a non-magnetic extension mounting plate attached to said usual mounting tabs at each end of said pickups by ordinary means, which extends beyond the length of said pickup to place threaded mounting holes below said mounting slots in said top plates, each said extension mounting plate constructed specifically to fit each of said said pickups in this type, with cuts and protrusions as necessary and described in the Specification, so that the top surface of said extension mounting plate tends either: 1) to extend the top surface of said pickup mounting tab beyond said mounting tab, or 2) to support said pickup mounting tab, should it be long enough to reach under said mounting slots in said top plates, or 3) to extend far enough beyond said mounting tab as to provide sufficient surface to be in full contact with a mounting spring or spacer, and in conjunction with mounting screws at each end of said pickup with said extension mounting plates, said mounting screws passing through said top washers and said mounting slots to thread into said extension mounting plates by one of several means:

i. a first embodiment, of simply mounting said pickup directly to the bottoms of said top plates, without any spring or spacer; or ii. a second embodiment, whereby each said mounting screw passes through a fixed spacer between said bottom plates and said extension mounting plates, said spacer being of one of two types:

1. a simple spacer with no other features; or
2. a spacer with protrusions that extend up into said mounting slot, so as to keep it aligned with said mounting slot and said pickup; or
3. a spacer with protrusions that extend up into said mounting slot, so as to keep it aligned with said mounting slot and said pickup, and longer with said mounting slot than wide across it, so as to minimize any tilt of said pickup along said strings; and iii. a third embodiment, whereby said each of said mounting screws passes through a spring held by said mounting screw between said top plates and said extension mounting plates, with sufficient force of spring compression to hold said pickup in place against external bumps; and iv. a fourth embodiment, where in addition to said springs of said third embodiment, said pickup fixed in place in said slot with one or more non-magnetic T-nuts in each said mounting slot, with short mounting screws passing through holes in said top washers, through said slot, and into said T-nuts, said T-nuts having a rectangular vertical extension into said slot, a flange at the bottom wider than said slot, and one or more threaded holes for said mounting screws, passing entirely through each said T-nut, so that when said short mounting screws are tightened on said T-nuts, the resulting pressure clamps said top washers to said top, removing the need for spring pressure to hold said pickups in place; or v. a fifth embodiment, like the fourth, except that said short mounting screws in said mounting slots with said T-nuts do not pass through said top washers, but through separate smaller washers, said short mounting screws with said T-nuts and said smaller washers numbering one or more per top washer, with said flats bearing against the sides of said top washers, so that the compression of said short mounting screws and said T-nuts in said mounting slots holds said top washers, and hence said pickups in place against outside bumps; and c. for pickups with adjustable height poles and mounting tabs at each end, normally meant to be mounted either directly to a guitar body or to a pickguard or in a pickup ring, a non-magnetic extension mounting plate attached to said usual mounting tabs at each end of said pickups by ordinary means, which extends beyond the length of said pickup to place threaded mounting holes below said mounting slots in said top plates, each said extension mounting plate constructed specifically to fit each of said pickups in this type, with cuts and protrusions as necessary and described in the Specification, so that the top surface of said extension mounting plate tends either: 1) to extend the top surface of said pickup mounting tab beyond said mounting tab, or 2) to support said pickup mounting tab, should it be long enough to reach under said mounting slots in said top plates, or 3) to extend far enough beyond said mounting tab as to provide sufficient surface to be in full contact with a mounting spring or spacer, and in conjunction with mounting screws at each end of said pickup with said extension mounting plates, said mounting screws passing through said top washers and said mounting slots to thread into said extension mounting plates by one of several means:

i. a first embodiment, of simply mounting said pickup directly to the bottoms of said top plates, without any spring or spacer; or ii. a second embodiment, whereby each said mounting screw passes through a fixed spacer between said bottom plates and said extension mounting plates, said spacer being of one of two types:

1. a simple spacer with no other features; or
2. a spacer with protrusions that extend up into said mounting slot, so as to keep it aligned with said mounting slot and said pickup; or
3. a spacer with protrusions that extend up into said mounting slot, so as to keep it aligned with said mounting slot and said pickup, and longer with said mounting slot than wide across it, so as to minimize any tilt of said pickup along said strings;

d. said top washers being of one of two embodiments:

i. a flat top washer covering and overlapping said mounting slot, with protrusions down into said mounting slot, so as to maintain its alignment with said mounting slot under the torsion of a tightening mounting screw; or ii. a flat top washer covering and overlapping said mounting slot, with a vertical flange bending down into said sound hole and contacting the sound hole edge of said top plate, tending to the same length of said top washer along said mounting slot, so as to maintain its alignment with said mounting slot under the torsion of a tightening mounting screw; and e. any of said top washers being either plain or visually decorated.

4. The invention as recited in claim 1, wherein said top plates are reinforced along both sides of said mounting slots, so that the narrow bar of said top plate between said mounting slot and said sound hole is not subject to breakage for the life of said stringed instrument.

5. The invention as recited in claim 1, wherein said top plates and said pickup mounting system accommodates an improvement to the pickup mounting system in U.S. Pat. No. 9,401,134, comprised of:

a. a first embodiment of said pickup mounting plates similar to those in U.S. Pat. No. 9,401,134:

i. having a pickup mounting hole at one end to accept a pickup mounting screw, which passes through said pickup mounting hole, then through a spring or spacer, then threads into said pickup in the way in which it was normally manufactured; and ii. having one or more mounting plate slots, separate from said pickup mounting hole, intended to sit crosswise to said top plate mounting slots, at any angle tending to plus or minus twenty degrees from square, and allowing any said pickup to be mounted plus or minus at least one-half the distance between the poles of any said pickup away from centered in said sound hole; and iii. being either plain or visually decorated; and b. mounting screws which pass through one or more of said mounting plate slots, then through said top plate mounting slots, then into T-nuts, said T-nuts having a bottom flange extending beyond the width of said top plate mounting slot, a rectangular protrusion into said top plate mounting slot, and a vertical hole passing all the way through to accommodate said mounting screw, so that when said screw is tightened on said nut, the pressure and friction of said mounting plate and said T-nut on said top plate fixes said pickup mounting plate in a position on said top plate; and c. a second embodiment of said pickup mounting plates similar to those in U.S. Pat. No. 9,401,134, and to the first embodiment, wherein said top plates have no mounting slots, but instead have a number of threaded and reinforced holes at the same distance from said sound hole as said mounting slots, so that said pickup mounting plate screws pass through said pickup mounting plates and into said threaded holes in said top plates, fixing said pickups in positions on said top plates, said positions being as varied as for said first embodiment; and d. said top plates and said sound hole are sized so that any pickup in a given set of pickups intended for use with them may be placed at any height below the strings of said stringed instrument, as determined by said pickup mounting screws, at any position between the neck and bridge not occupied by other pickups, at any position across said strings, plus or minus at least one-half the distance between the poles of any said pickup, and at an angle rotation plus or minus at least twenty degrees from square across said strings, without said mounting system rubbing against the sides of said sound hole at said top plates.

6. The invention as recited in claim 1, wherein a basic common-point connection circuit module in said system of electronic circuits, having a single differential output with high and low terminals, combines the signals of three matched single-coil pickups, both the pickups and their string vibration signals designated here as A, B & C, under the convention that said vibration signals from said pickups with North-up magnetic fields are considered of positive phase, and considered of negative phase if said pickups have South-up magnetic fields, said circuit module being one of two types:

a. a first type, constructed of either electro-mechanical or analog-digital switches which has two modes of operation:

i. humbucking mode, which produces the output signals: A−B, B−C, C−A, (A+B)/2−C, (B+C)/2−A and (C+A)/2−B, or their inverses, with or without amplitude compensation for phase cancellations between signals, with or without potentiometer-capacitor tone controls, with or without ordering by tone; and ii. Non-humbucking, or hum mode, which produces the output signals: A, B, C, A+B, B+C and C+A, with or without amplitude compensation for phase cancellations between signals, with or without potentiometer-capacitor tone controls; or b. a second type, constructed of analog circuits, using fully differential amplifiers, in which the common-connection point of said pickups is grounded to signal ground, the output of said second type of module producing the differential output signal $\pm F(x)*(D-E)\pm G(x)*(E-F)$, where F(x) and G(x) are at least approximately orthogonal functions with a sum of squares of at least approximately one, $F(x)^2+G(x)^2=1$, such that F(x) goes smoothly from 0 to 1 to 0 and G(x) goes smoothly from −1 to 0 to +1 over the range of x, and where D, E & F represent A, B & C in any order without repeat, with or without amplitude compensation for phase cancellations between signals, with or without potentiometer-capacitor tone controls, with the DC offset voltages of said differential amplifiers minimized at the output, and amplitudes of said differential amplifiers set to preclude any clipping of any said signals at the limits of the power supplies at any point in said system of electronic circuits.

7. The invention as recited in claim 1, wherein a circuit module in said system of electronic circuits, used as either a pickup input or cascading element, combines two differential humbucking signals into a single differential output, said input differential humbucking signals, designated here as A and B, being any combination of: 1) a humbucking pickup, or 2) two matched single-coil pickups connected as a humbucking pair, or 3) the output of a circuit combining three matched single-coil pickups into a humbucking output, or 4) the output of another said circuit modules which combines two humbucking signals, said circuit module being of two different types:

a. a first type, constructed of either electro-mechanical or analog-digital switches, which produces at its output the humbucking signal combinations: A, B, A+B and A−B, or their inverses, with or without amplitude compensation for phase cancellations between signals, with or without potentiometer-capacitor tone controls, with or without ordering by tone; and b. a second type, constructed of analog circuits, using fully differential amplifiers, in which the common-connection point or points of any of said pickups applied to the input or inputs is or are grounded to signal ground, the output of said second type of module producing the differential output signal $\pm F(x)*A\pm G(x)*B$, where F(x) and G(x) are at least approximately orthogonal functions with a sum of squares of at least approximately one, $F(x)^2+G(x)^2=1$, such that F(x) goes smoothly from 0 to 1 to 0 and G(x) goes smoothly from −1 to 0 to +1 over the range of x, with or without amplitude compensation for phase cancellations between signals, with or without potentiometer-capacitor tone controls, with the DC offset voltages of said differential amplifiers minimized at the output, and amplitudes of said differential amplifiers set to preclude any clipping of any said signals at the limits of the power supplies at any point in said system of electronic circuits.

8. The invention as cited in claim 1, wherein a signal combining module has two differential inputs, designated here as A and B, which are combined as specified in FIG. 49A, producing a single differential output with high and low terminals, where one or both of said A or B has a phase reversing switch between it and said module differential input, with the low terminals of A and B connected together at the low output of said differential output, and the high terminals of said A and B connected together in a 3-way switch, producing the differential outputs A, B and A+B.

* * * * *